(12) United States Patent
Kim et al.

(10) Patent No.: US 10,110,974 B2
(45) Date of Patent: Oct. 23, 2018

(54) ACCESSORY HAVING A COMMUNICATION FUNCTION FOR INTERNET OF THINGS

(71) Applicant: LG ELECTRONICS INC., Seoul (KR)

(72) Inventors: Dooyul Kim, Seoul (KR); Kyeonggyu Goo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/605,083

(22) Filed: May 25, 2017

(65) Prior Publication Data

US 2017/0347168 A1 Nov. 30, 2017

Related U.S. Application Data

(63) Continuation of application No. PCT/KR2016/007314, filed on Jul. 6, 2016.

(60) Provisional application No. 62/341,566, filed on May 25, 2016.

(30) Foreign Application Priority Data

Sep. 7, 2016 (KR) .................. 10-2016-0115247

(51) Int. Cl.
*H04B 10/114* (2013.01)
*H04Q 1/02* (2006.01)
*G08C 23/04* (2006.01)

(52) U.S. Cl.
CPC .............. *H04Q 1/02* (2013.01); *G08C 23/04* (2013.01); *H04B 10/114* (2013.01)

(58) Field of Classification Search
CPC .................................................. H04B 10/114
See application file for complete search history.

(56) References Cited

U.S. PATENT DOCUMENTS

| 4,974,698 | A | 12/1990 | Smith |
| 5,504,502 | A | 4/1996 | Arita et al. |
| 6,790,400 | B1 | 9/2004 | Muller |
| 7,429,707 | B2 | 9/2008 | Yanai et al. |
| D632,265 | S | 2/2011 | Choi et al. |

(Continued)

OTHER PUBLICATIONS

U.S. Office Action in U.S. Appl. No. 15/604,836, dated Jan. 29, 2018, 24 pages.

(Continued)

*Primary Examiner* — Shi K Li
(74) *Attorney, Agent, or Firm* — Fish & Richardson P.C.

(57) ABSTRACT

An accessory includes a main body that includes a communication module that is configured to communicate with a predetermined network, and a container including a main body-coupling portion that is located at an upper portion of the container and configured to separably couple to the main body, the container being made of a material that is able to be injection-molded. The container includes an outer portion that is exposed to an outside of the container based on the main body being coupled to the container, and an inner portion that is recessed downward to thereby define the main body-coupling portion, the inner portion including a bottom portion that defines a bottom surface of the inner portion, and an inclined portion that extends upward from a circumference of the bottom surface and outward with respect to a central axis passing through the container in a vertical direction.

19 Claims, 46 Drawing Sheets

(56) References Cited

U.S. PATENT DOCUMENTS

| | | |
|---|---|---|
| 8,003,886 B1 | 8/2011 | Rintz |
| D687,009 S | 7/2013 | Song et al. |
| D700,904 S | 3/2014 | Miller et al. |
| 9,036,858 B1 | 1/2015 | Reeves et al. |
| 9,131,301 B2 | 5/2015 | Tsai et al. |
| D743,819 S | 11/2015 | Golnik et al. |
| D746,166 S | 12/2015 | Li |
| D747,984 S | 1/2016 | Zhao et al. |
| 9,304,736 B1 | 3/2016 | Whiteley et al. |
| 9,453,655 B2 | 9/2016 | Bruck et al. |
| D784,963 S | 4/2017 | Saule et al. |
| 9,633,197 B2 | 4/2017 | Lakshmanan et al. |
| 9,641,919 B1 | 5/2017 | Poole et al. |
| 9,659,577 B1 | 5/2017 | Langhammer |
| 9,791,839 B2 | 10/2017 | Matsuoka et al. |
| 9,830,005 B2 | 11/2017 | Sakaguchi et al. |
| 9,843,851 B2 | 12/2017 | Chamberlin et al. |
| 9,851,728 B2 | 12/2017 | Matsuoka et al. |
| 9,857,961 B2 | 1/2018 | Fadell et al. |
| 2006/0182299 A1 | 8/2006 | Whitehouse et al. |
| 2006/0250762 A1 | 11/2006 | Yang et al. |
| 2011/0148812 A1 | 6/2011 | Hente |
| 2011/0303520 A1 | 12/2011 | Burnel et al. |
| 2012/0035020 A1 | 2/2012 | Kamm |
| 2012/0051015 A1 | 3/2012 | Dabov et al. |
| 2012/0075407 A1* | 3/2012 | Wessling ............... H04N 7/142 348/14.08 |
| 2012/0242526 A1* | 9/2012 | Perez .................... G08C 17/02 341/176 |
| 2013/0001971 A1 | 1/2013 | Stein |
| 2013/0338839 A1 | 12/2013 | Rogers et al. |
| 2014/0049886 A1 | 2/2014 | Lee et al. |
| 2014/0086431 A1 | 4/2014 | Martin et al. |
| 2014/0110237 A1 | 4/2014 | Enomoto et al. |
| 2014/0139047 A1 | 5/2014 | Haines et al. |
| 2014/0219491 A1 | 8/2014 | Ludlum et al. |
| 2015/0104042 A1 | 4/2015 | Ito |
| 2015/0136572 A1 | 5/2015 | Liu et al. |
| 2015/0201255 A1 | 7/2015 | Porter |
| 2015/0264461 A1 | 9/2015 | Hovanky et al. |
| 2015/0334480 A1 | 11/2015 | Yang et al. |
| 2015/0334859 A1 | 11/2015 | Lee et al. |
| 2016/0071440 A1 | 3/2016 | Hibbert |
| 2016/0173977 A1 | 6/2016 | Lim et al. |
| 2016/0259376 A1 | 9/2016 | Christfort |
| 2016/0335423 A1 | 11/2016 | Beals |
| 2016/0345086 A1 | 11/2016 | Chamberlin et al. |
| 2017/0006374 A1 | 1/2017 | Song et al. |
| 2017/0259983 A1 | 1/2017 | Tolman et al. |
| 2017/0163437 A1* | 6/2017 | Yang ................. H04L 12/2816 |
| 2017/0180850 A1 | 6/2017 | Hsu et al. |
| 2017/0242412 A1 | 8/2017 | Kim |
| 2017/0288447 A1 | 10/2017 | Guibene et al. |
| 2017/0330429 A1 | 11/2017 | Tak et al. |
| 2017/0345420 A1 | 11/2017 | Barnett, Jr. |
| 2018/0052218 A1 | 2/2018 | Meadow |

OTHER PUBLICATIONS

U.S. Office Action in U.S. Appl. No. 15/604,902, dated Dec. 29, 2017, 16 pages.

U.S. Office Action in U.S. Appl. No. 15/604,975, dated Jan. 30, 2018, 21 pages.

U.S. Office Action in U.S. Appl. No. 15/605,041, dated Feb. 23, 2018, 11 pages.

U.S. Office Action in U.S. Appl. No. 15/605,159, dated Mar. 12, 2018, 9 pages.

U.S. Office Action in U.S. Appl. No. 15/605,075, dated Mar. 12, 2018, 9 pages.

U.S. Office Action in U.S. Appl. No. 15/605,066, dated May 23, 2018, 10 pages.

U.S. Office Action in U.S. Appl. No. 15/605,019, dated Mar. 8, 2018, 8 pages.

* cited by examiner

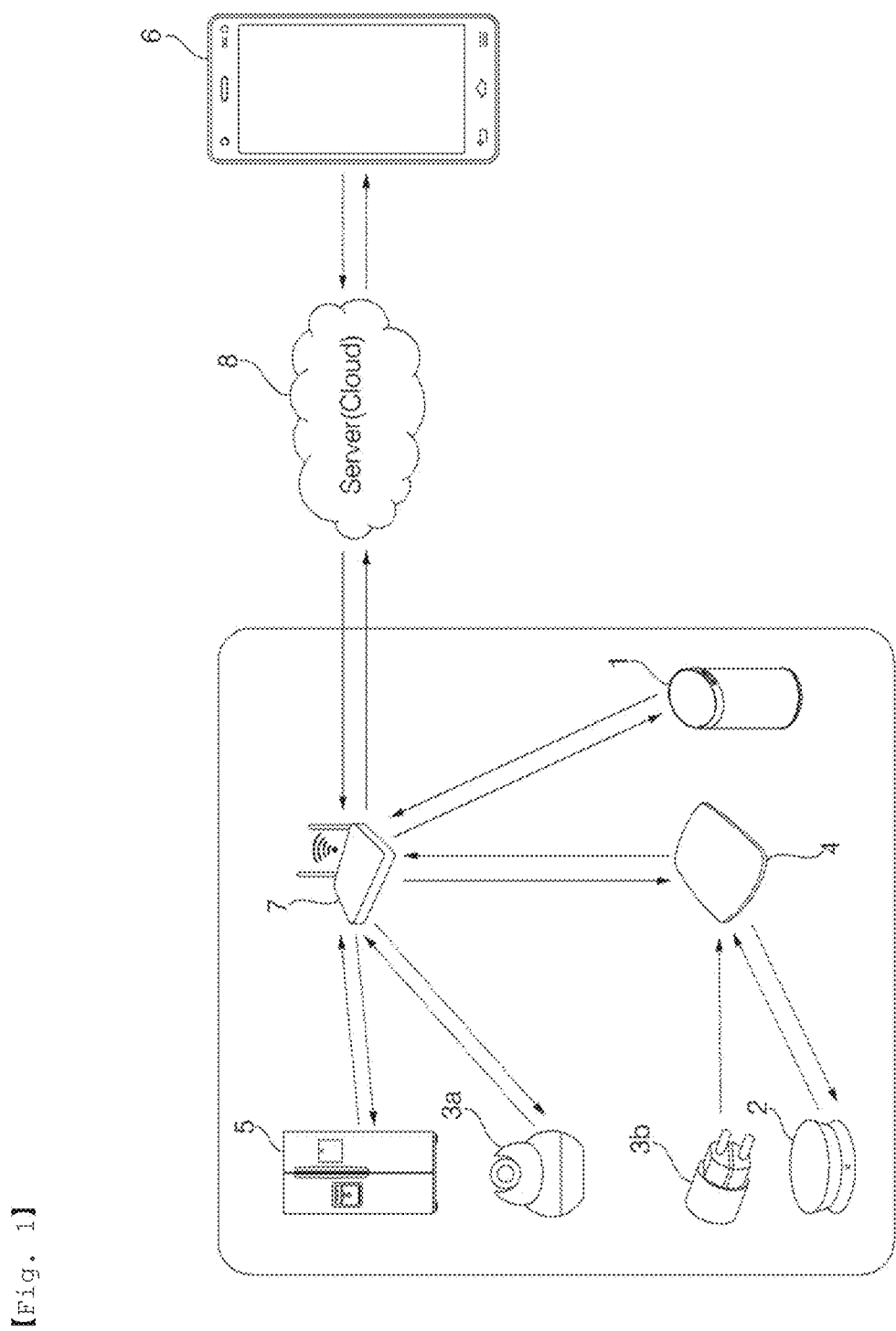

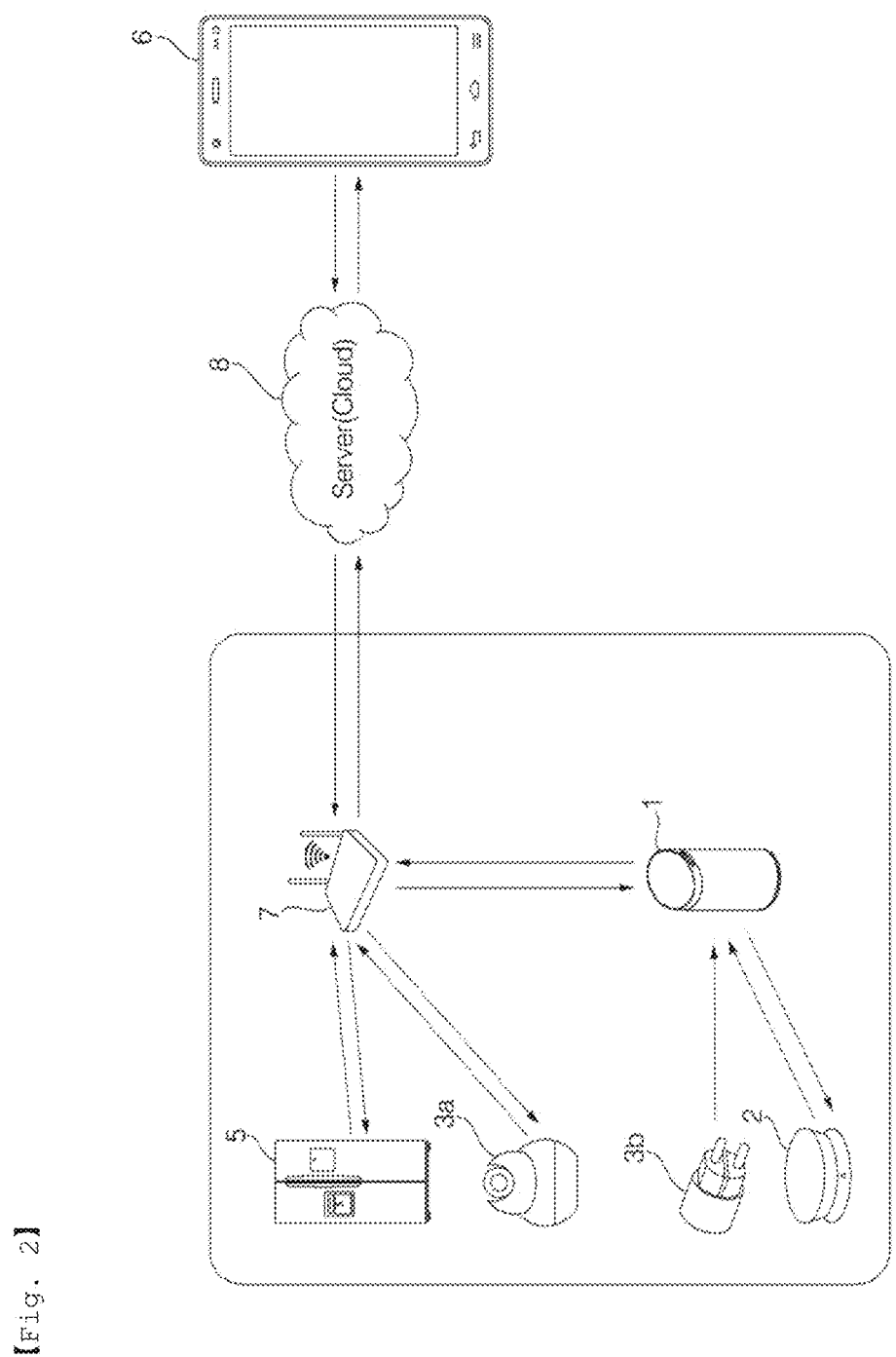

[Fig. 3]
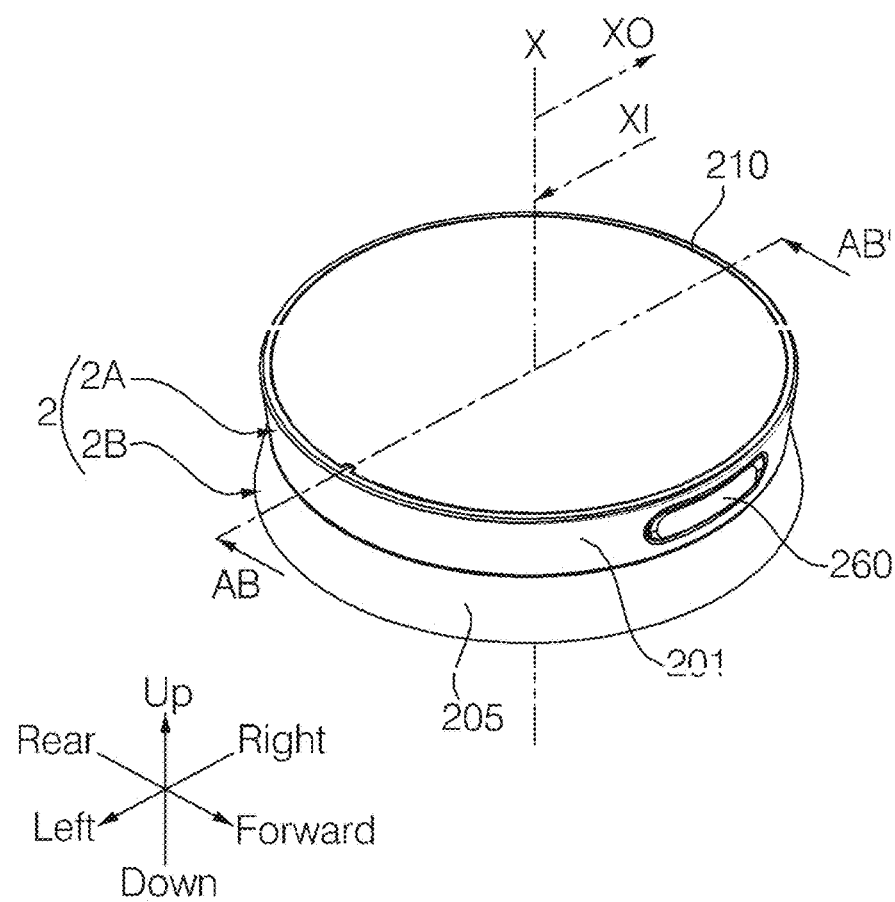

[Fig. 4]
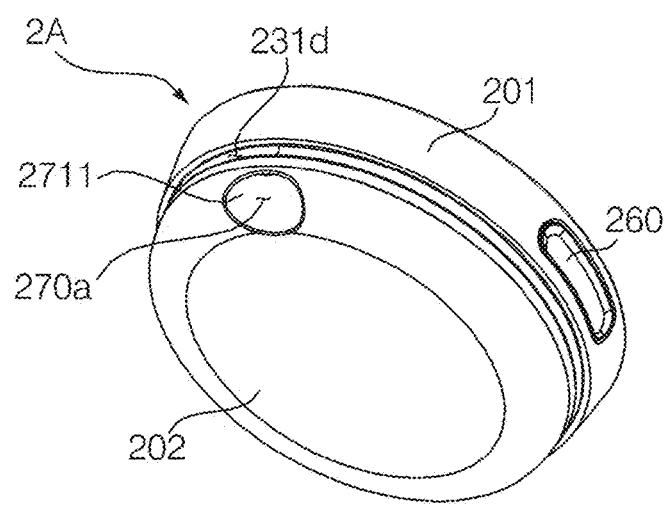
[Fig. 5]
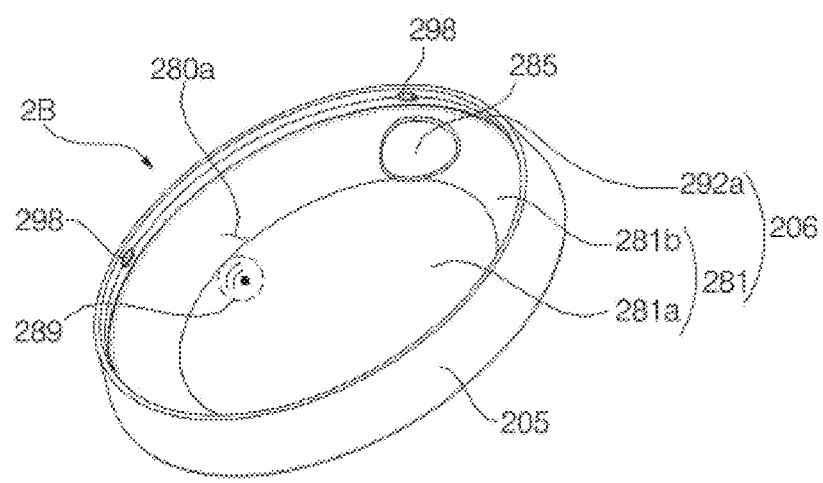

[Fig. 7]
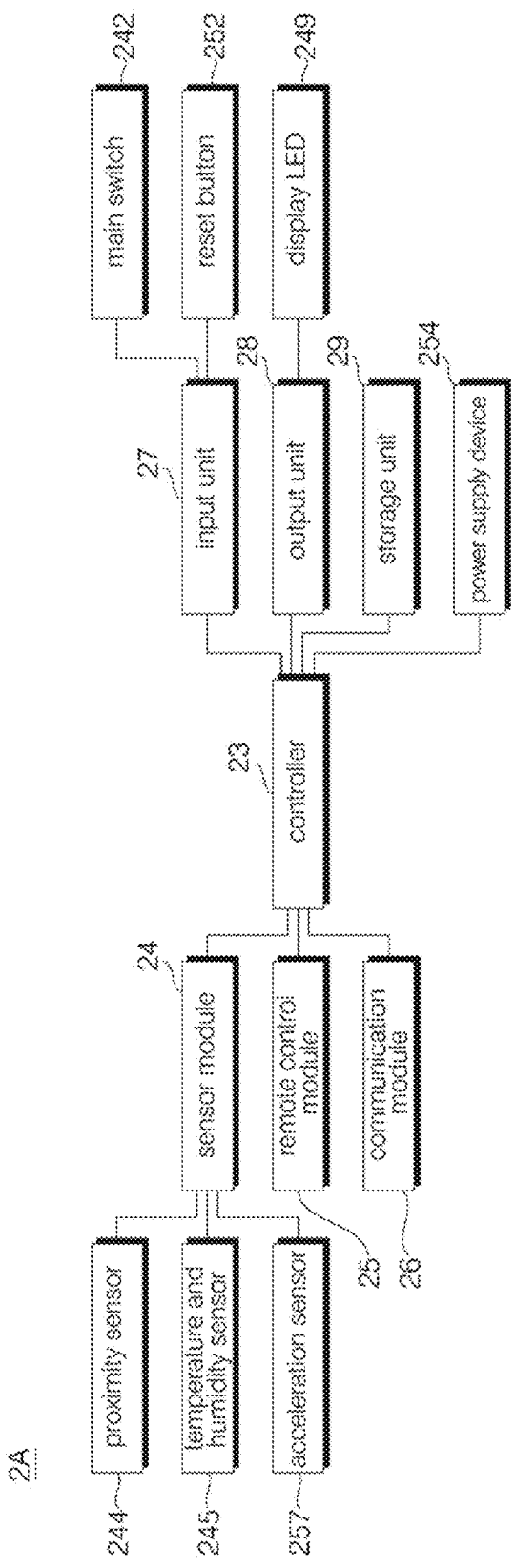

[Fig. 8]
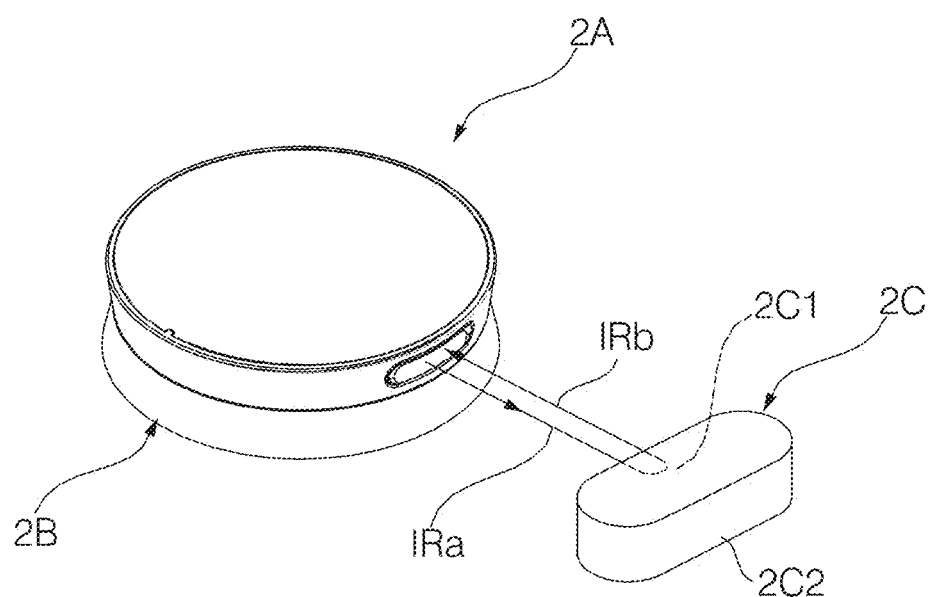

[Fig. 9]
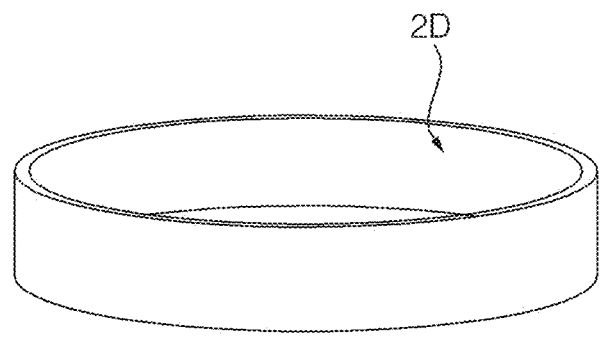
[Fig. 10]
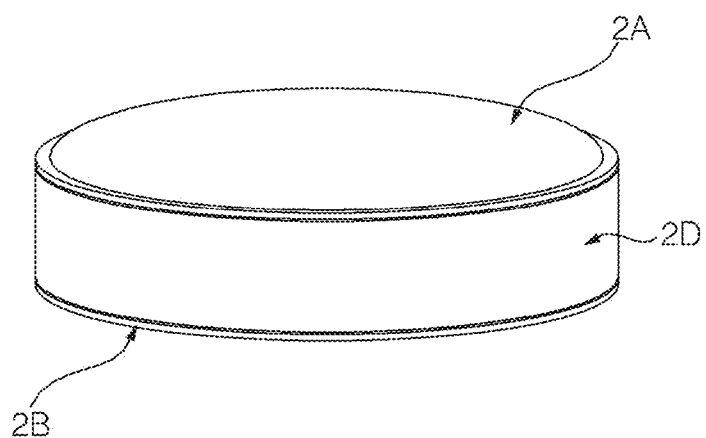

[Fig. 11]
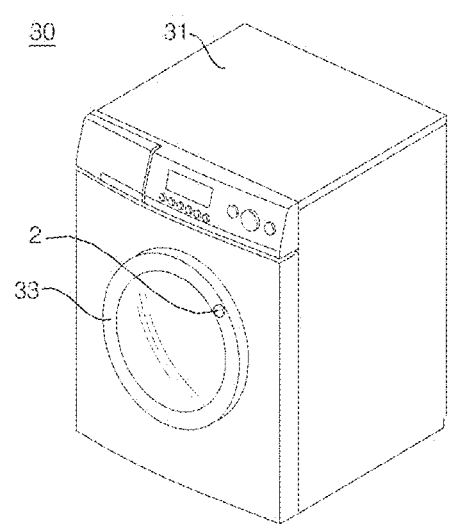
[Fig. 12]
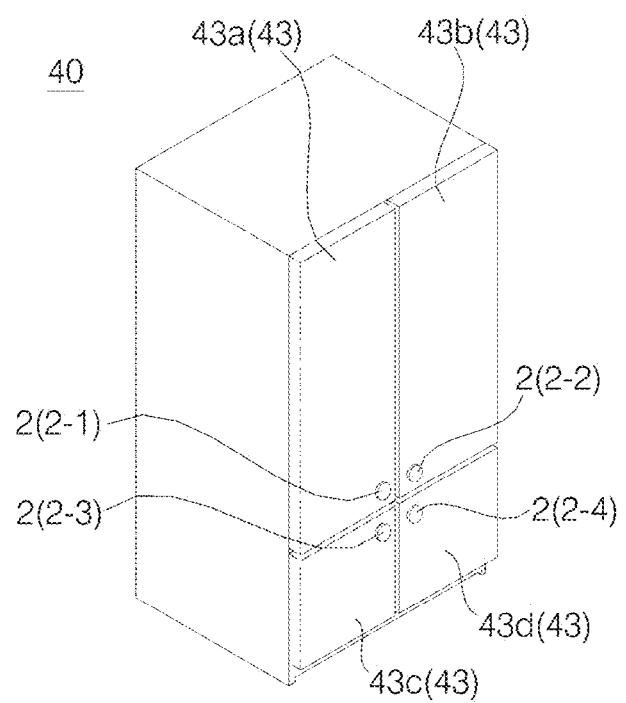

[Fig. 13]
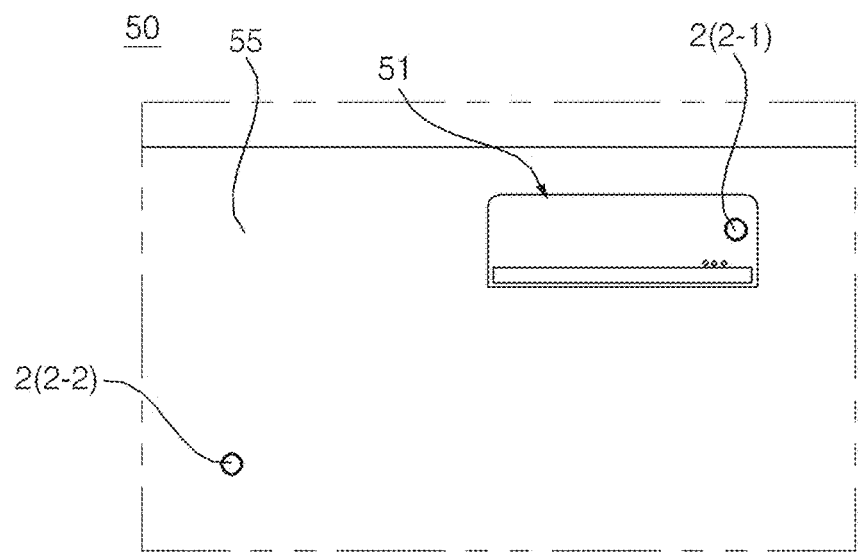
[Fig. 14]
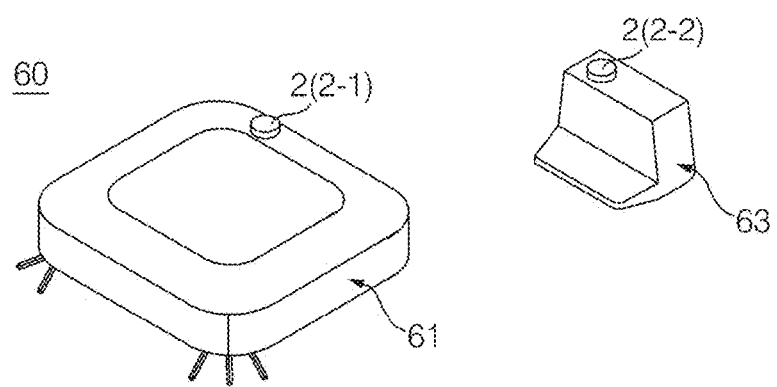

[Fig. 15]
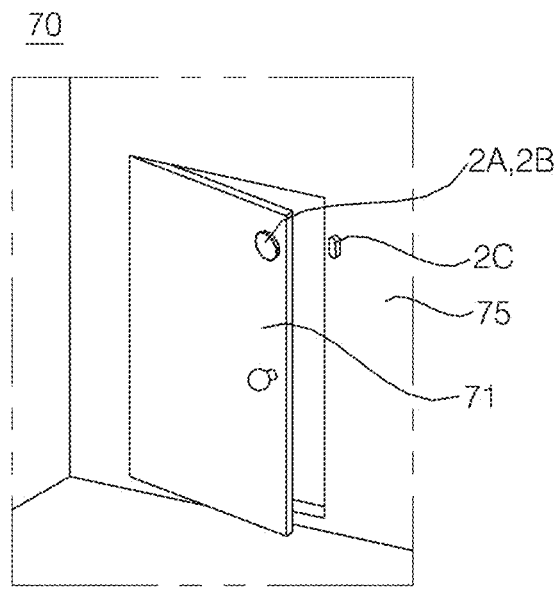
[Fig. 16]
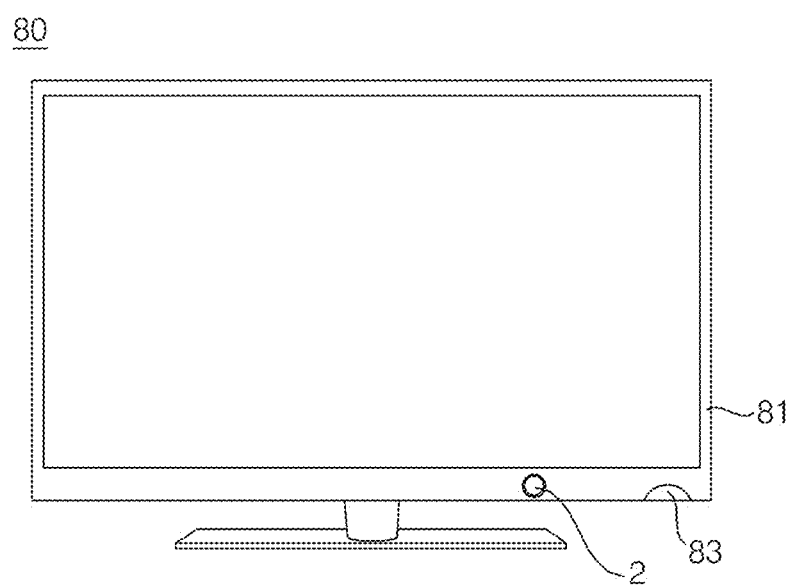

[Fig. 17]
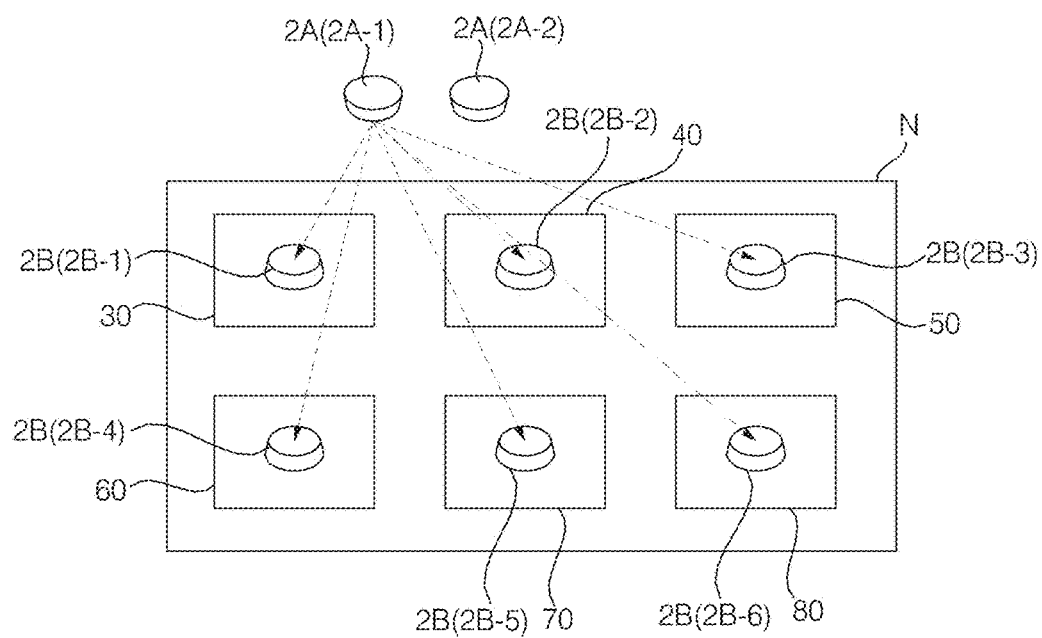

[Fig. 18]
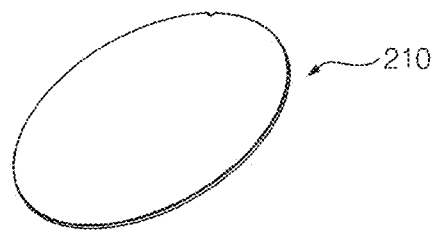
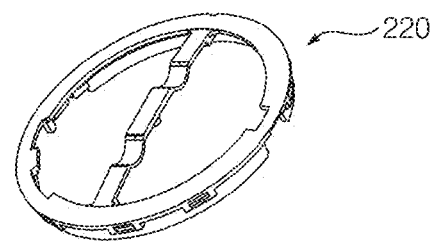
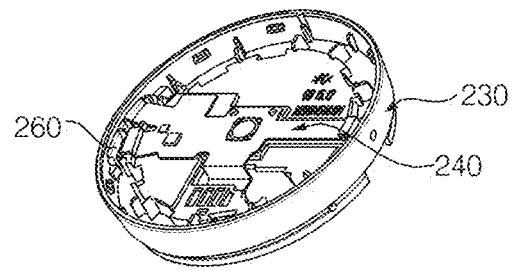
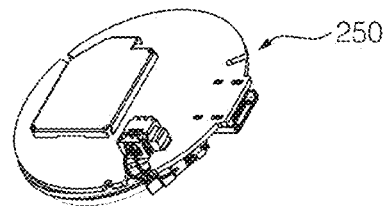
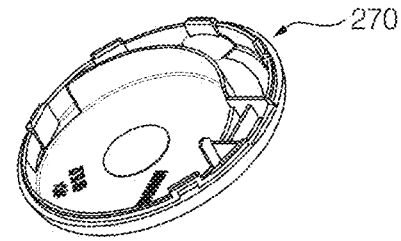

[Fig. 19]
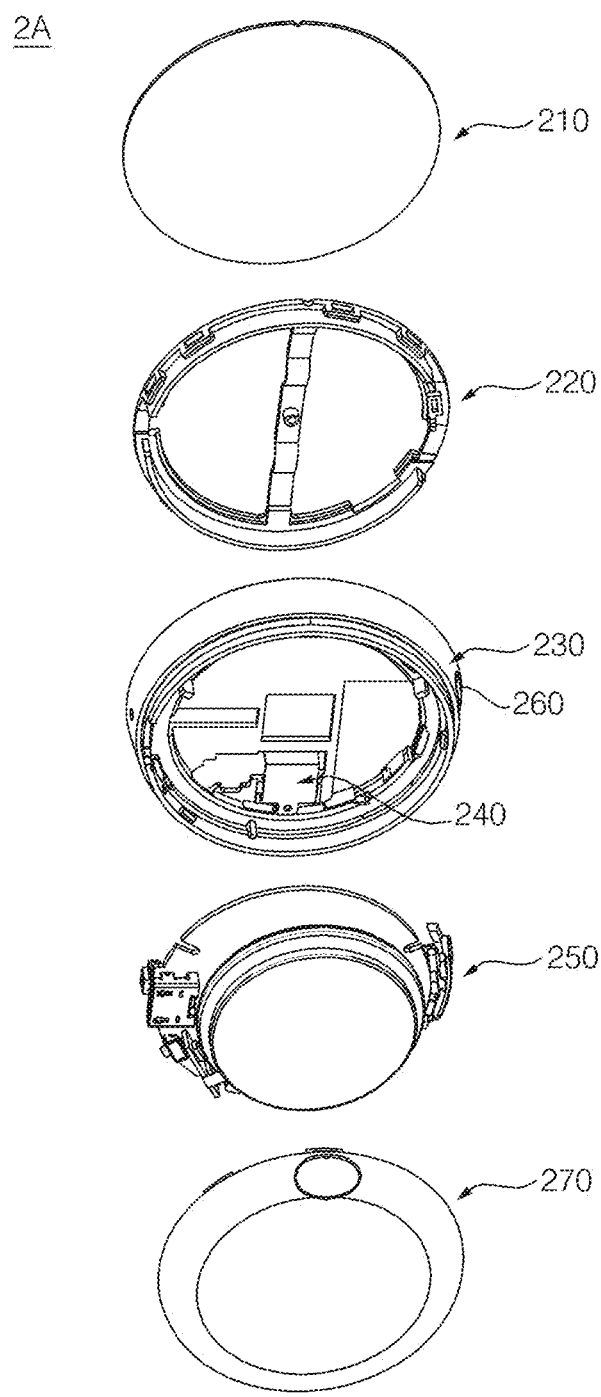

[Fig. 20]
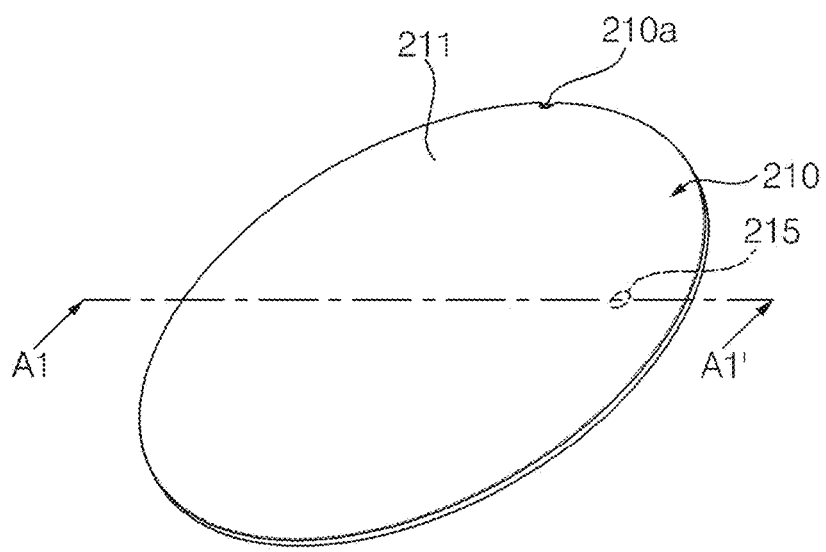
[Fig. 21]
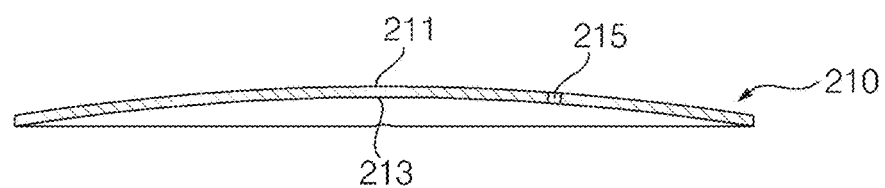

[Fig. 22]
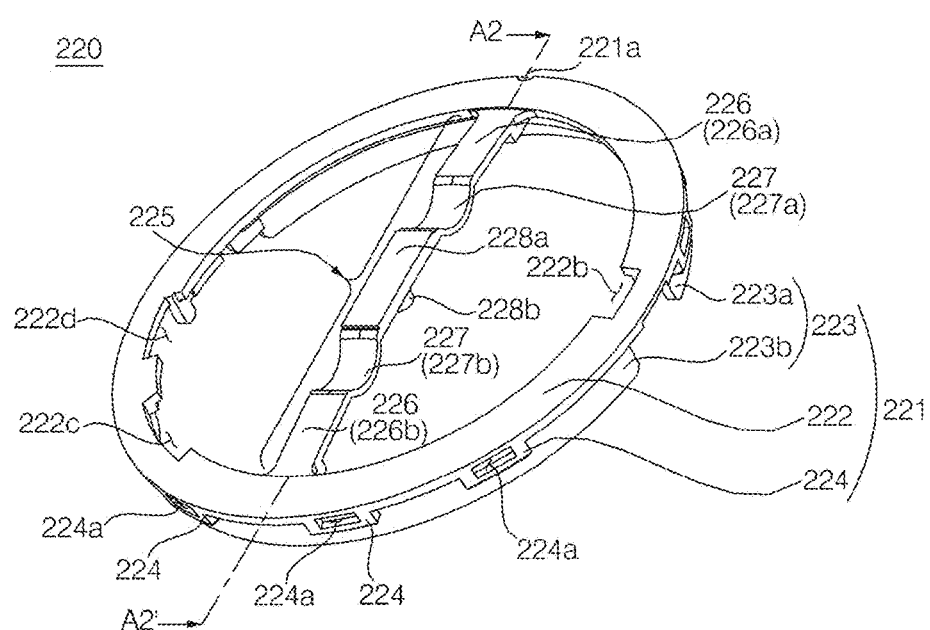

[Fig. 23]
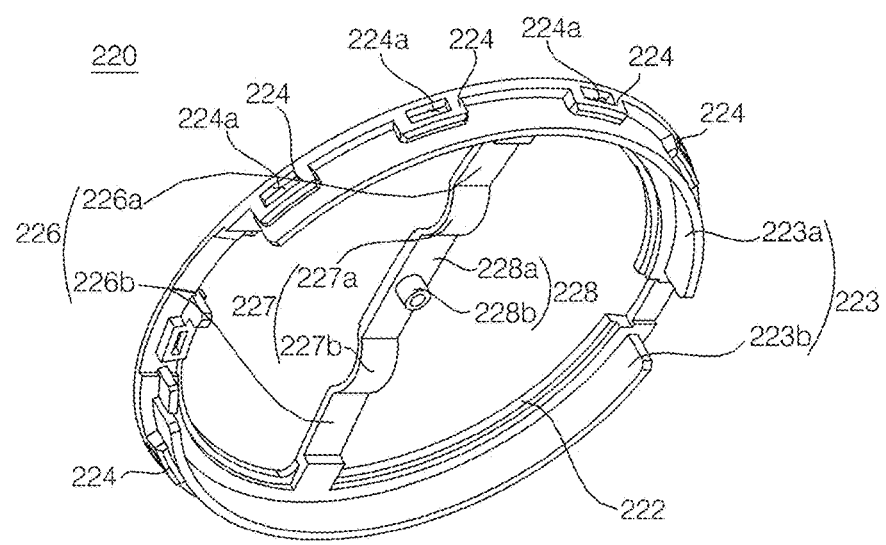
[Fig. 24]
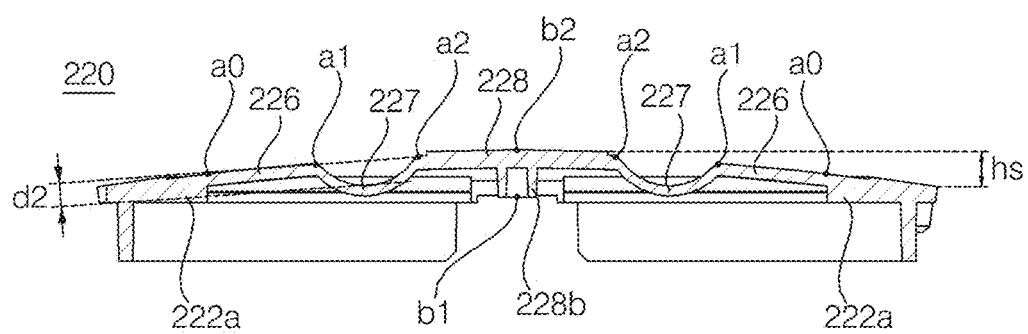

[Fig. 25]
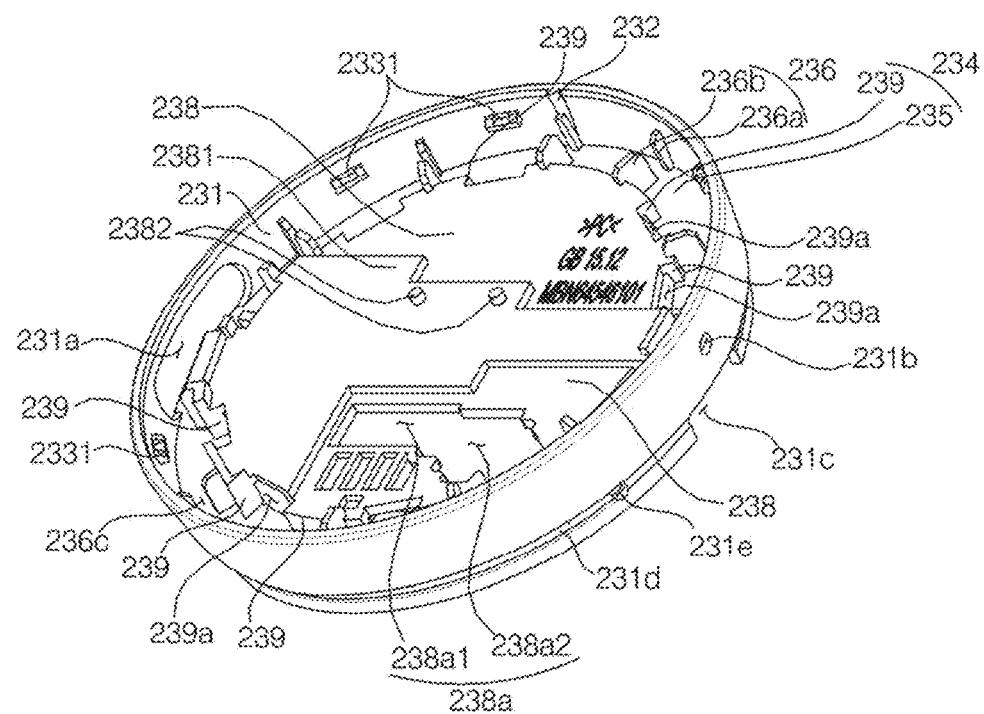

[Fig. 26]
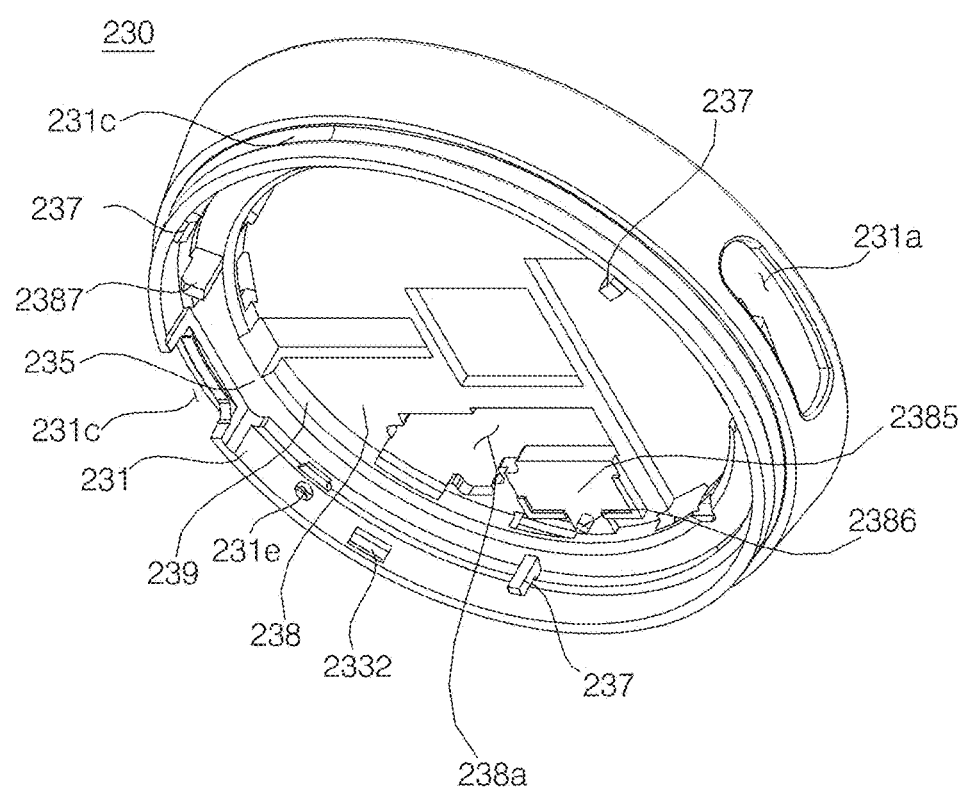

[Fig. 27]
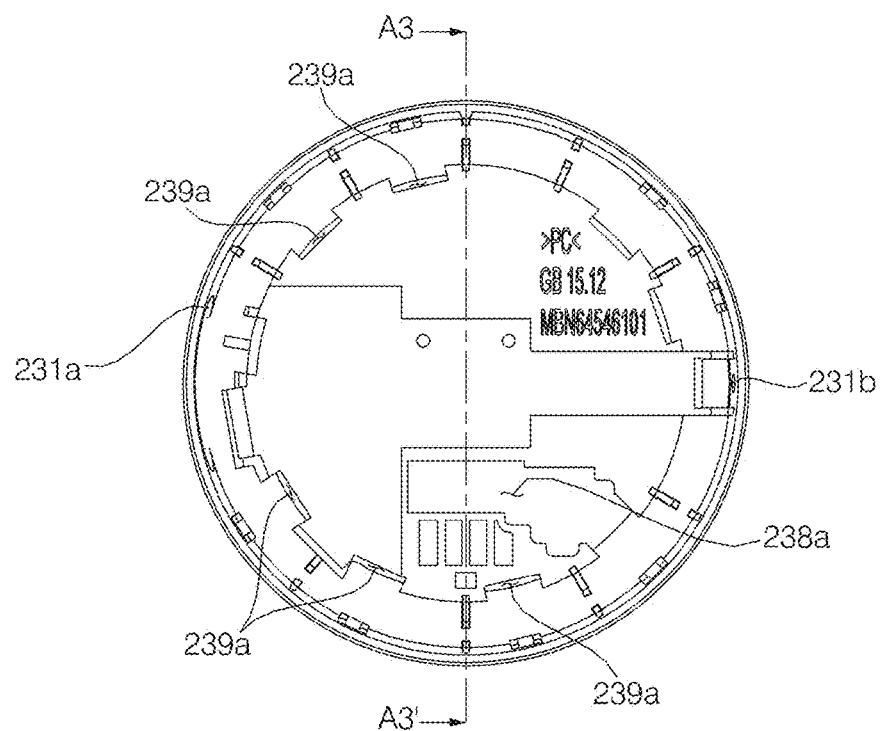
[Fig. 28]
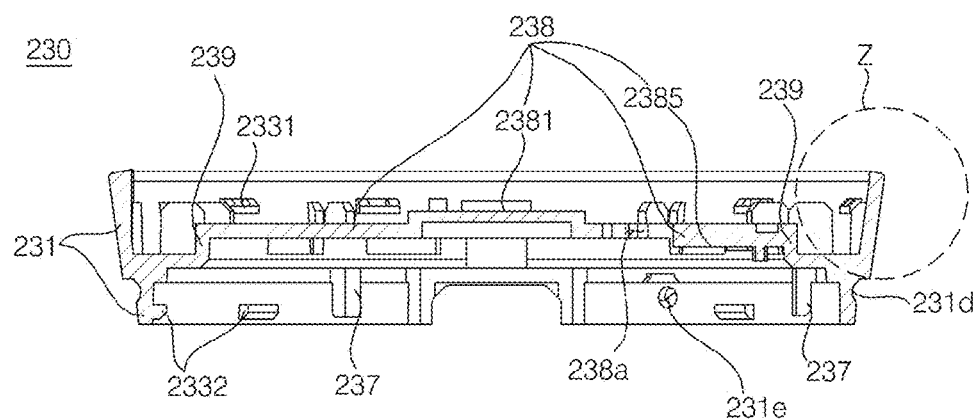

[Fig. 29]
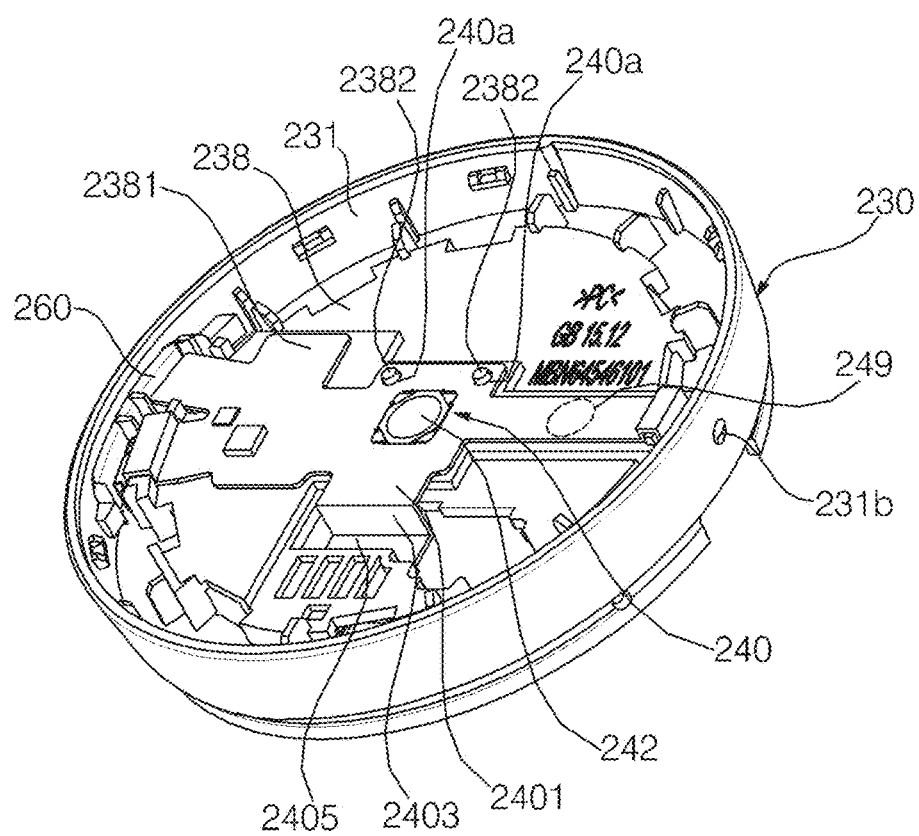

[Fig. 30]
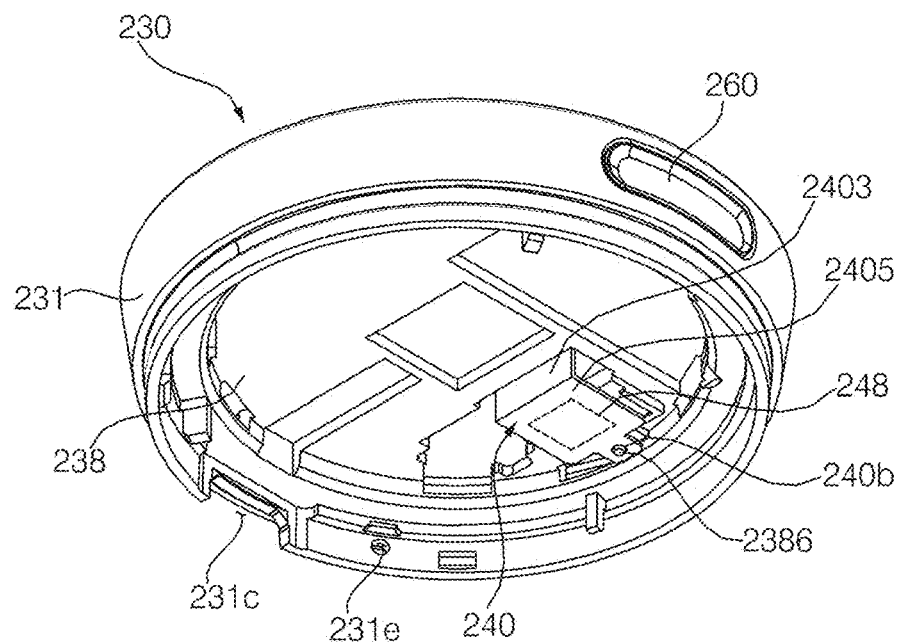
[Fig. 31]
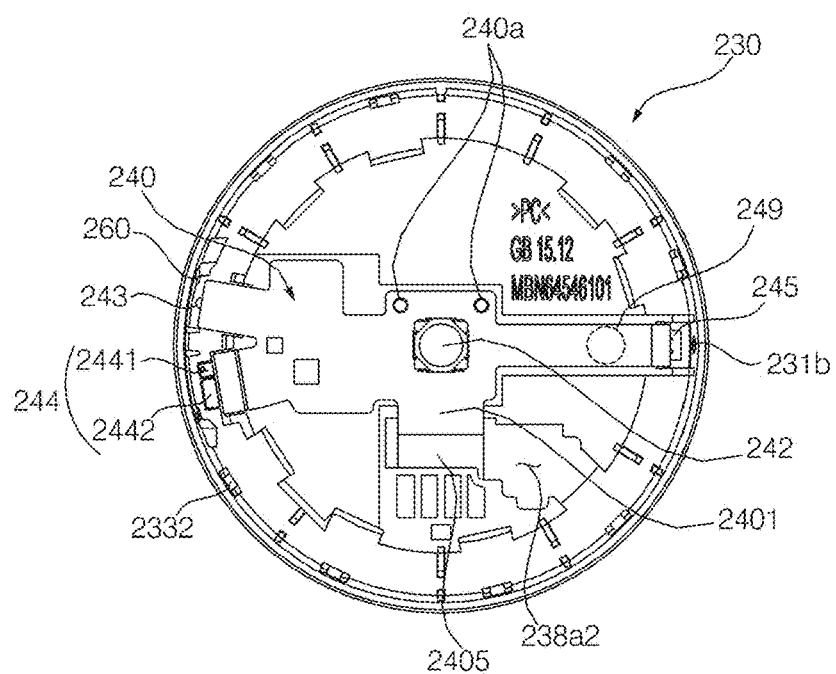

[Fig. 32]
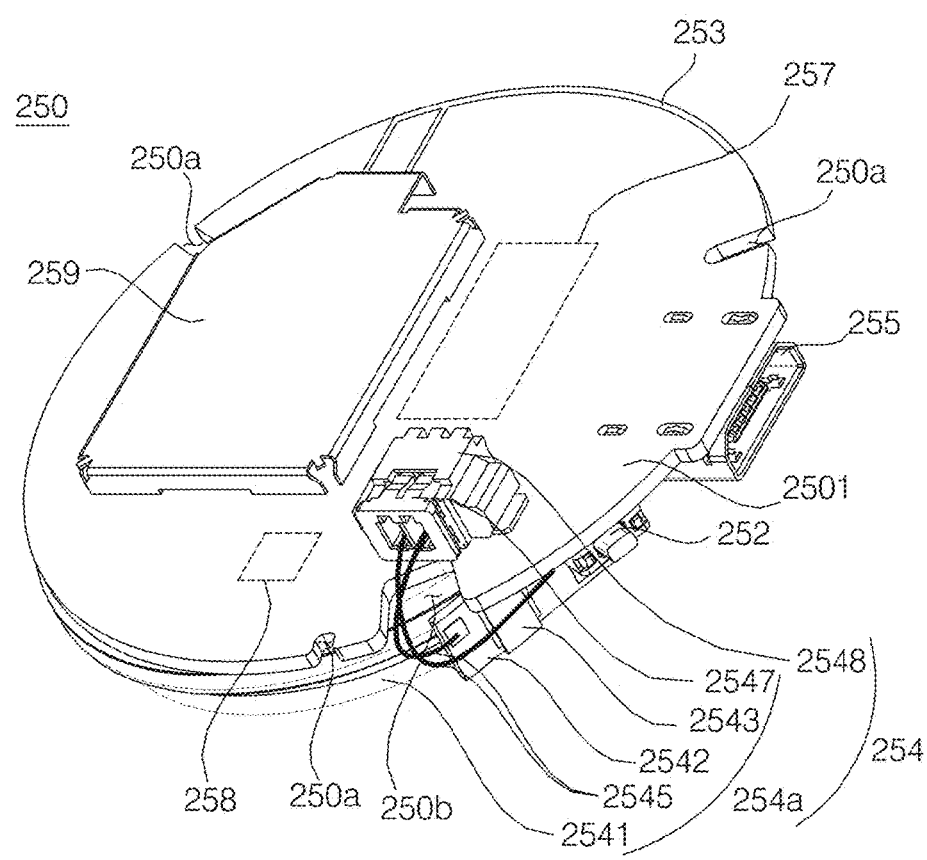

[Fig. 33]
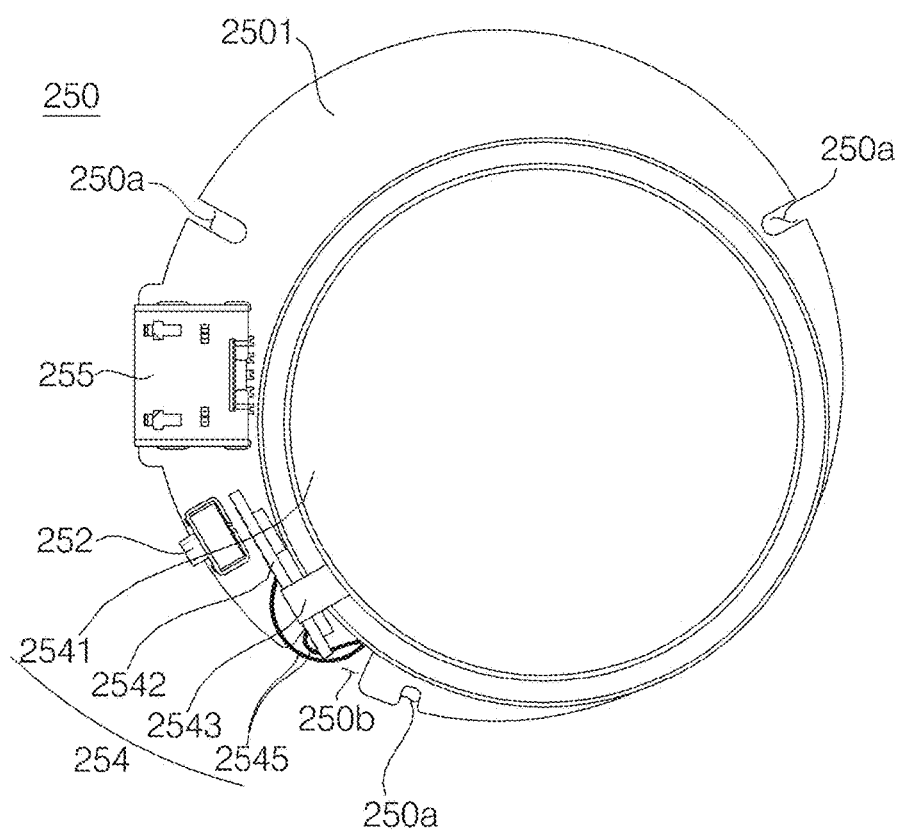

[Fig. 34]
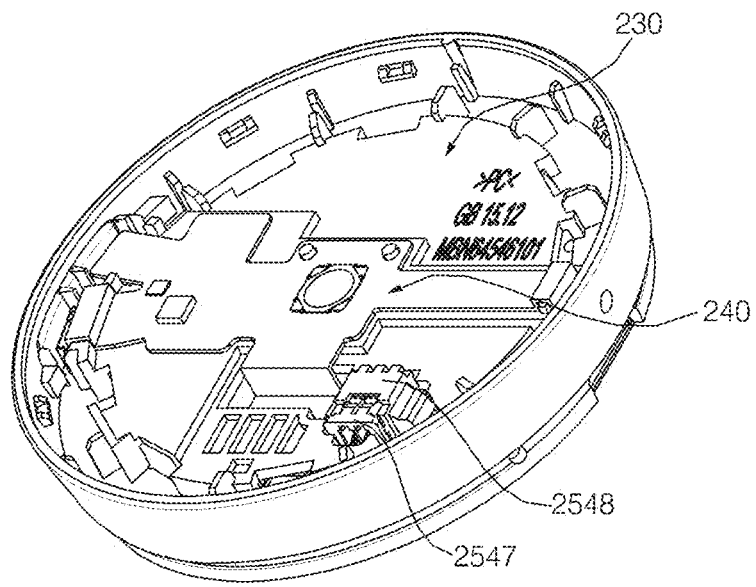
[Fig. 35]
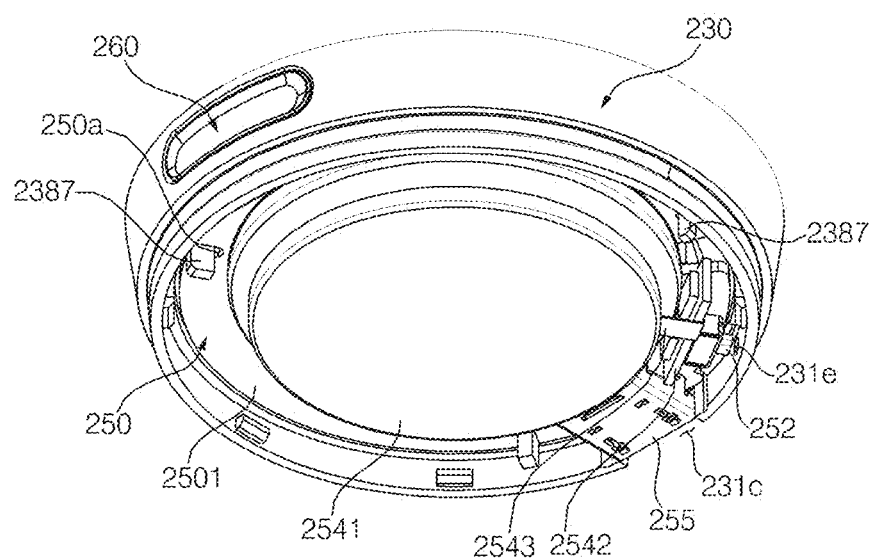

[Fig. 36]
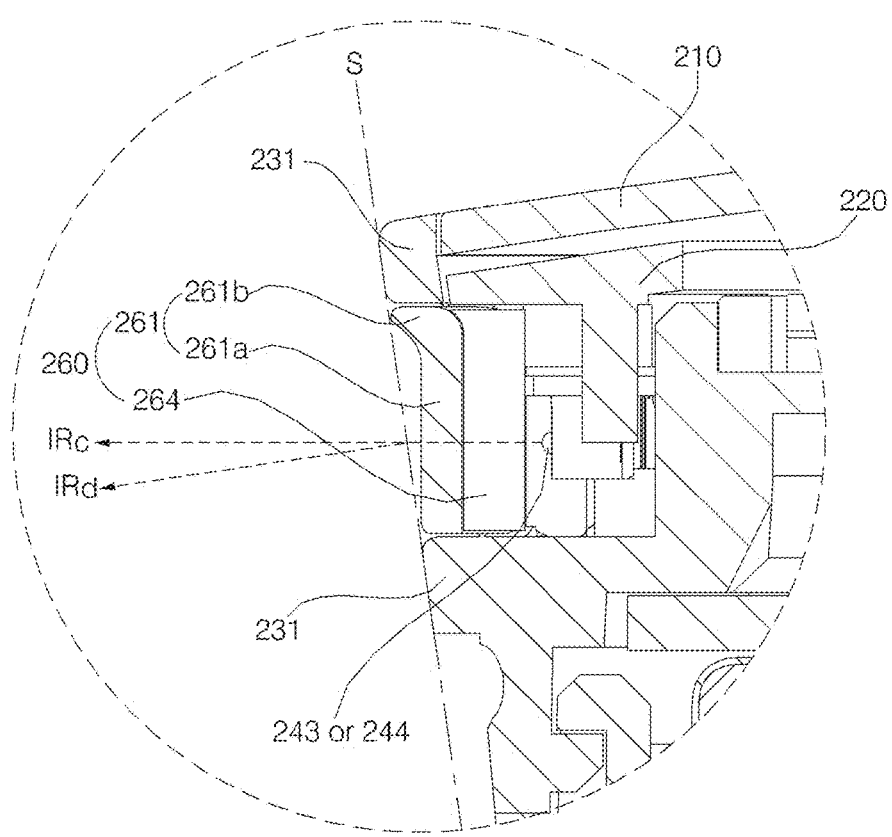

[Fig. 37]
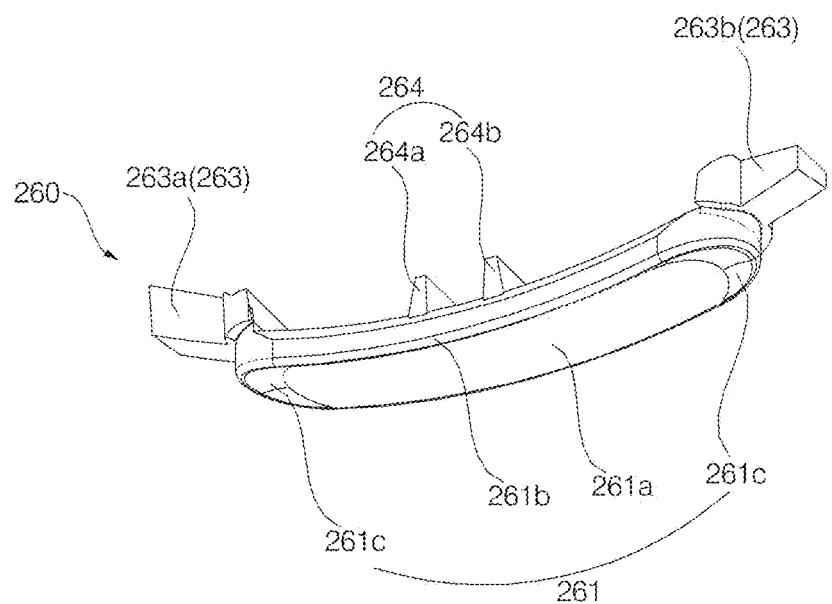
[Fig. 38]
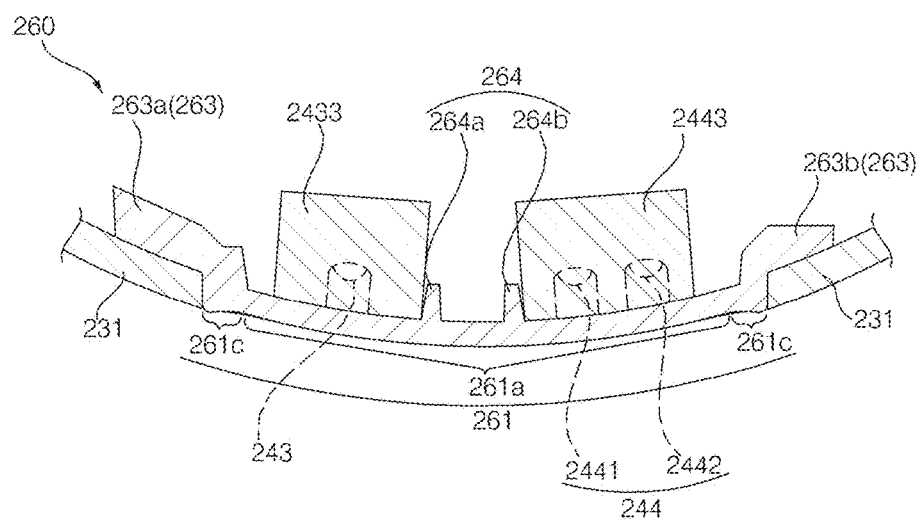

[Fig. 39]
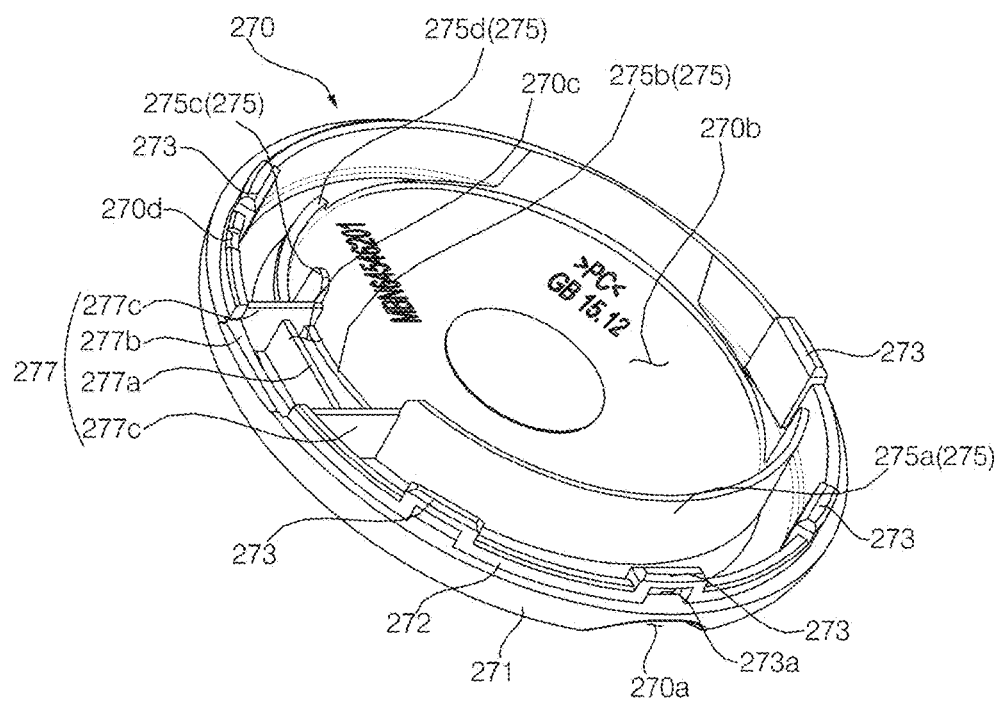

[Fig. 40]
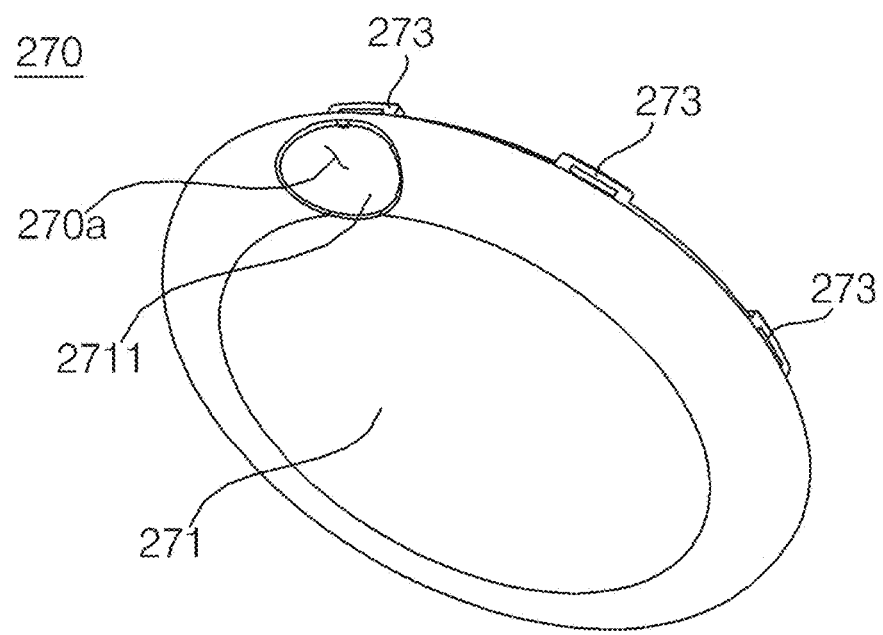

[Fig. 41]
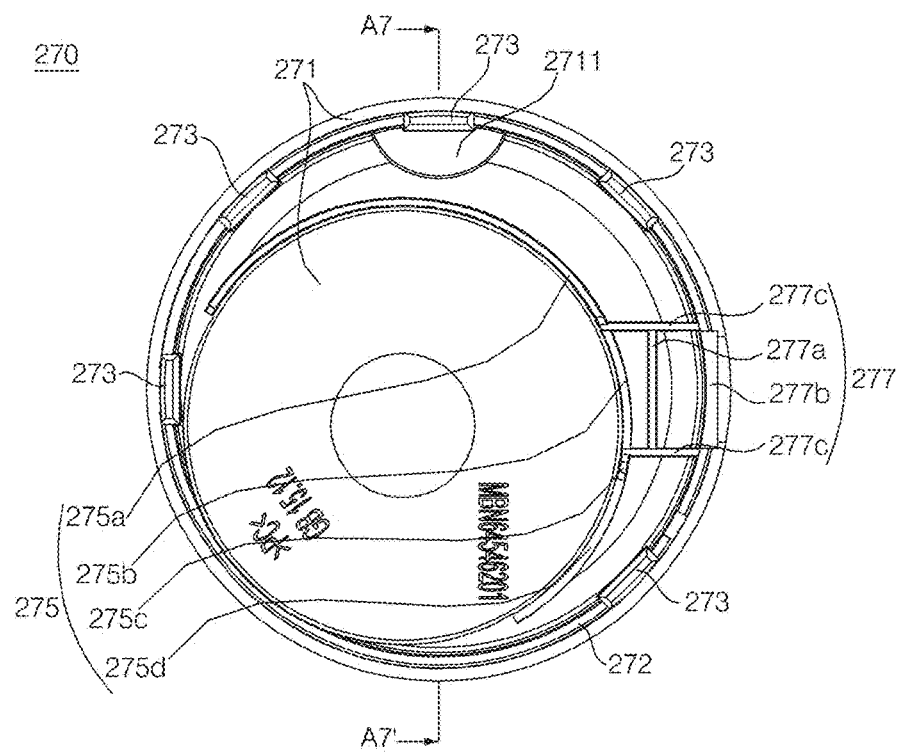
[Fig. 42]
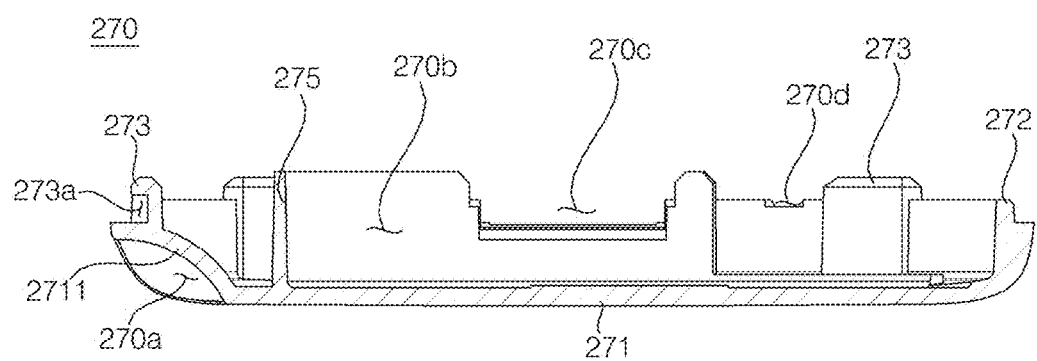

[Fig. 43]
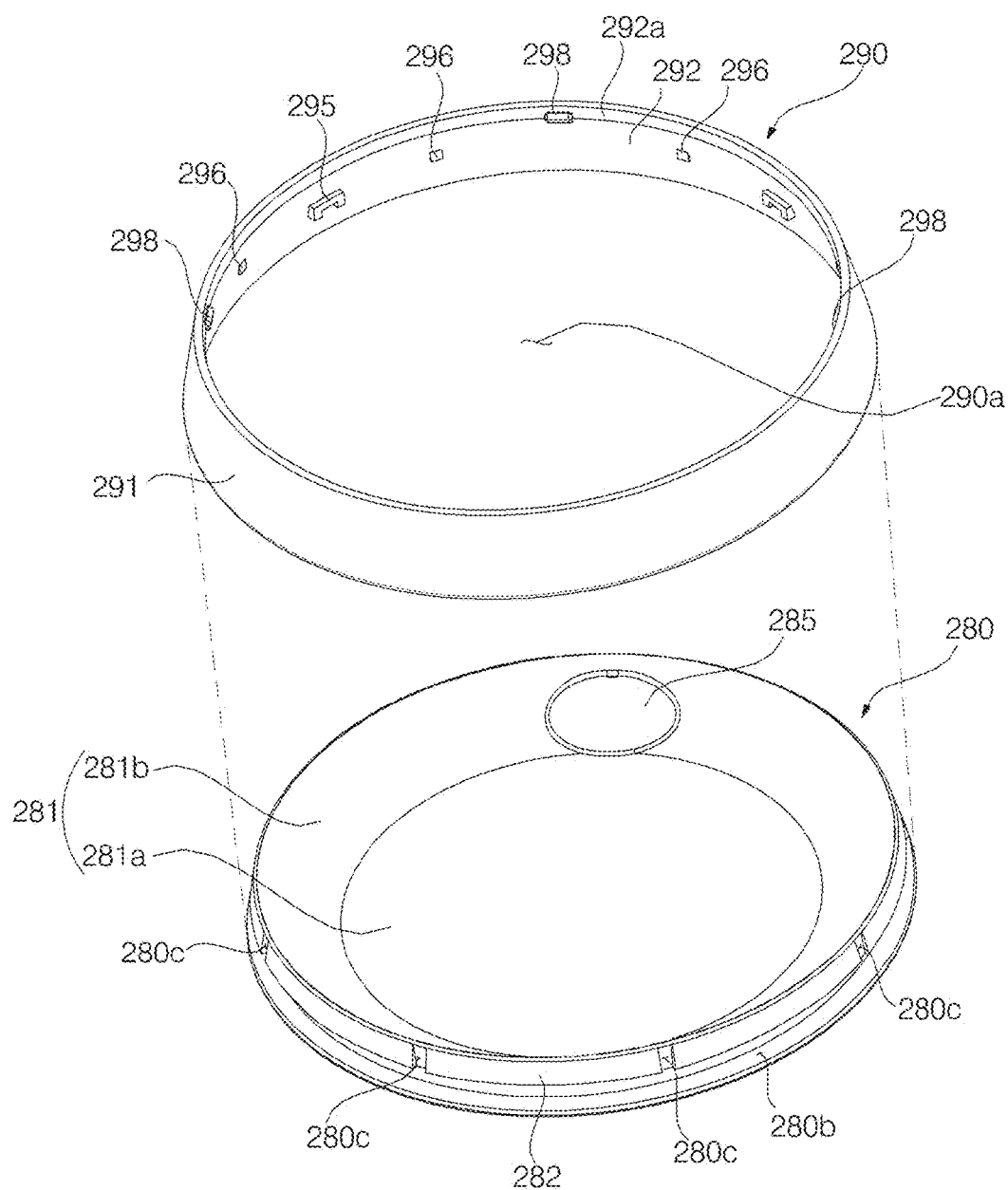

[Fig. 44]
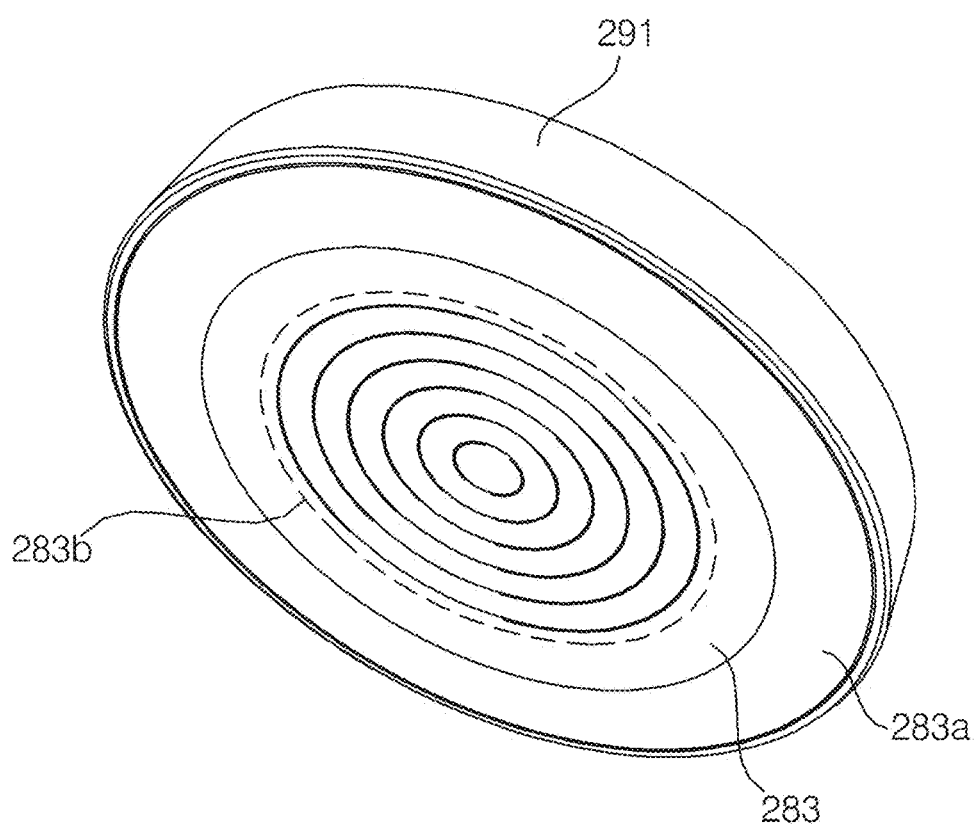

[Fig. 45]
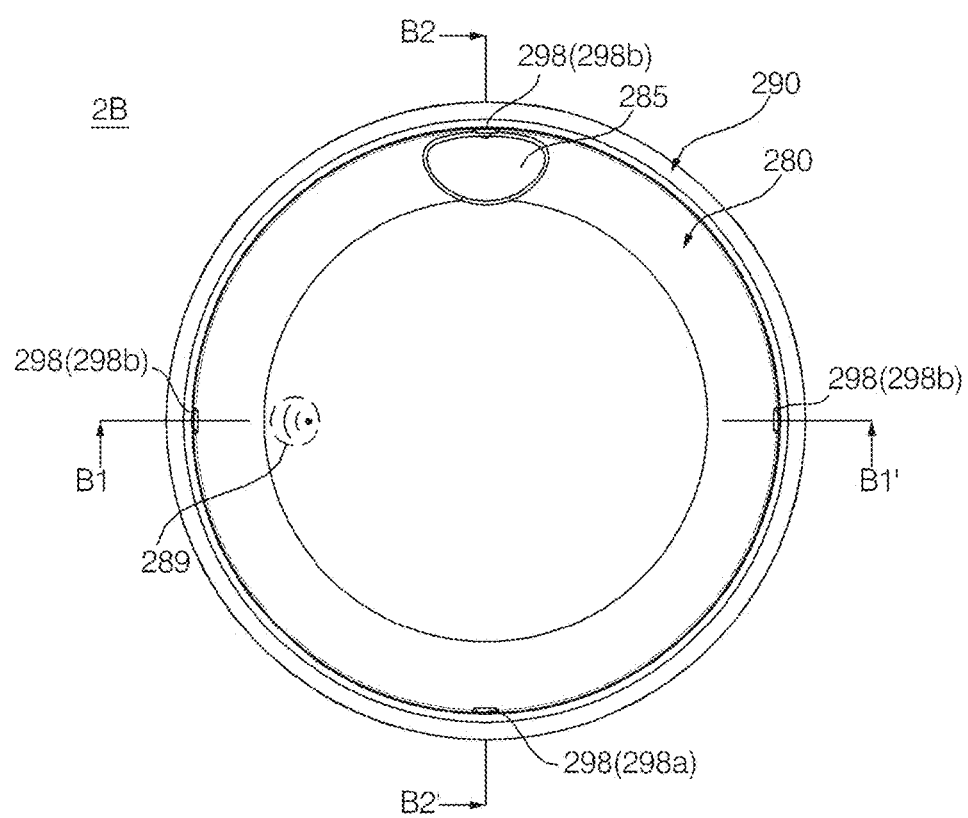

[Fig. 46A]
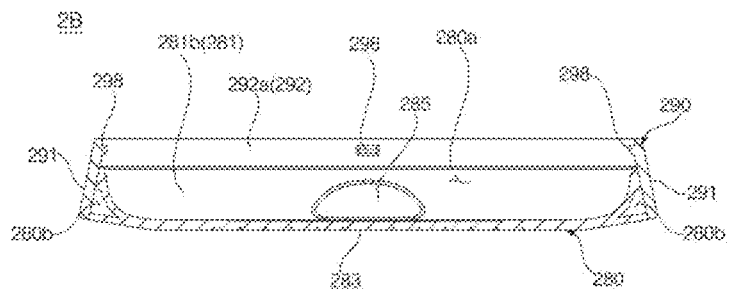
[Fig. 46B]
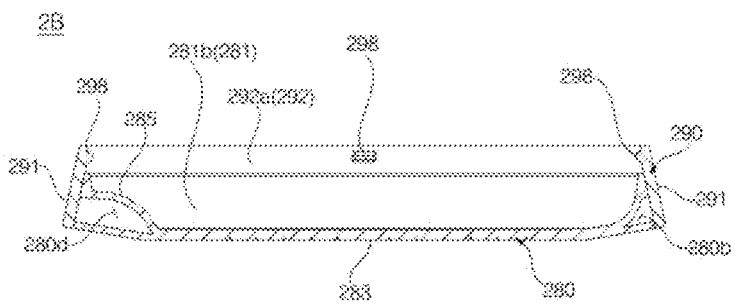
[Fig. 46C]
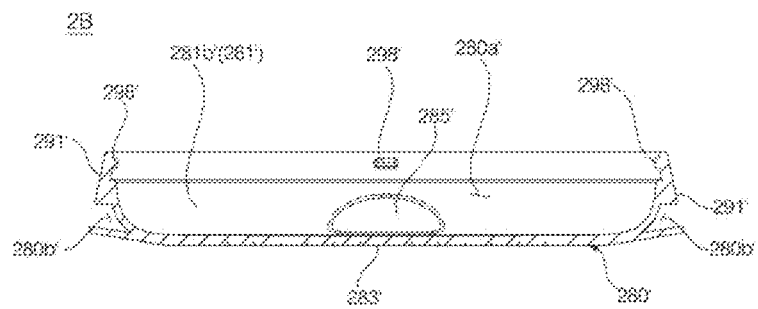
[Fig. 46D]
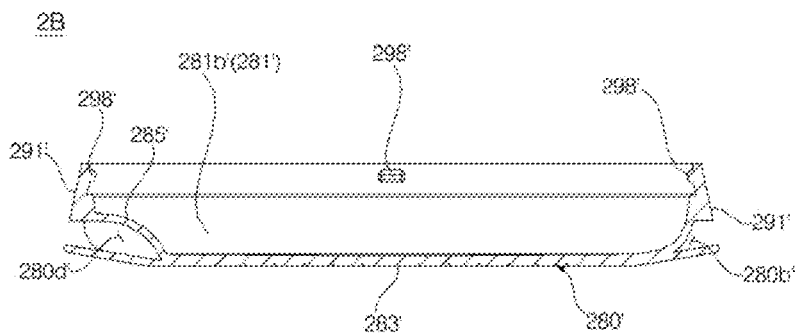

[Fig. 47]
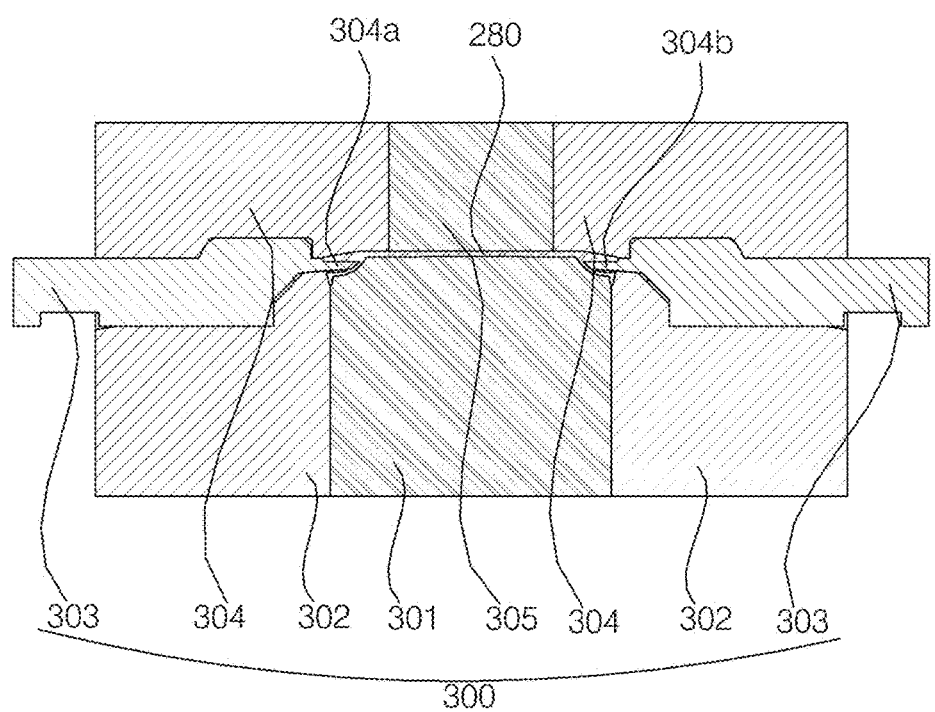

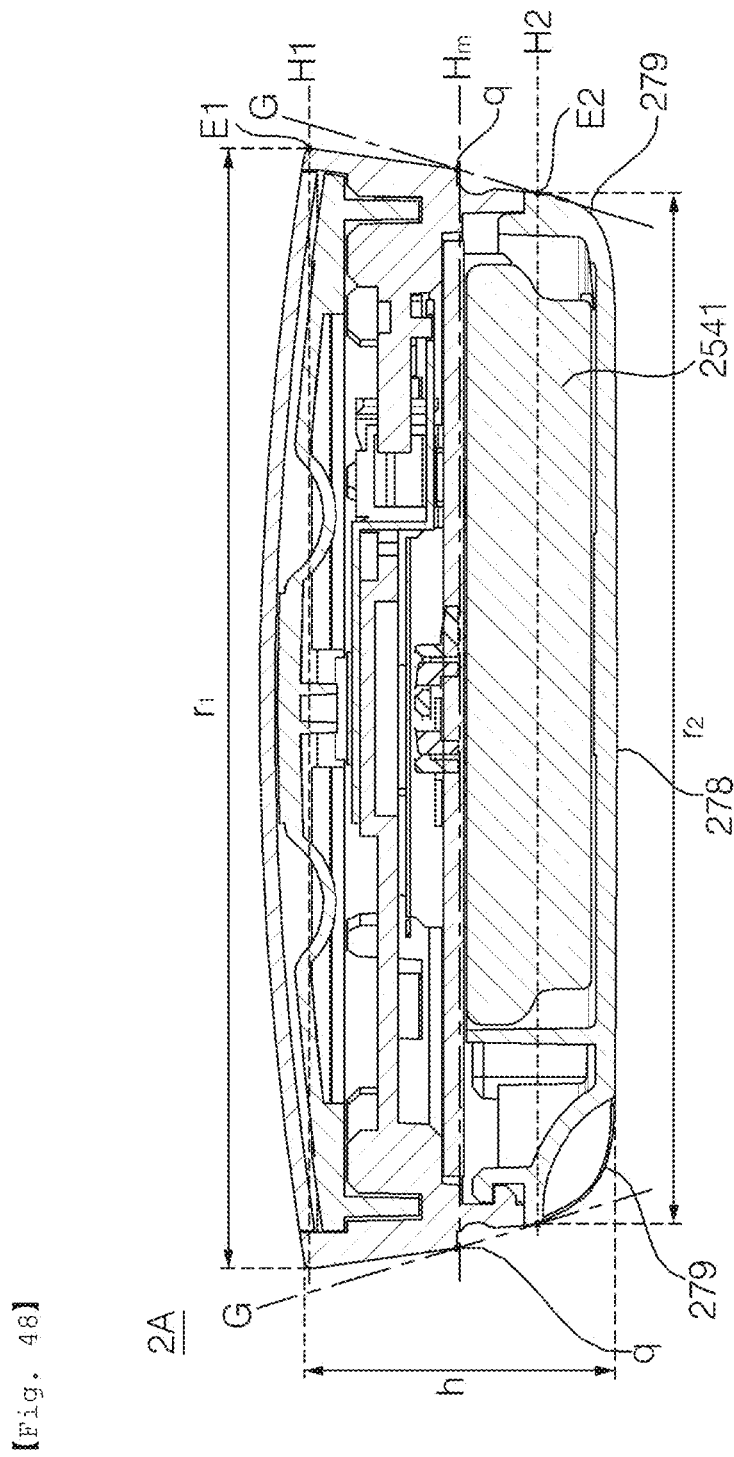

[Fig. 49]
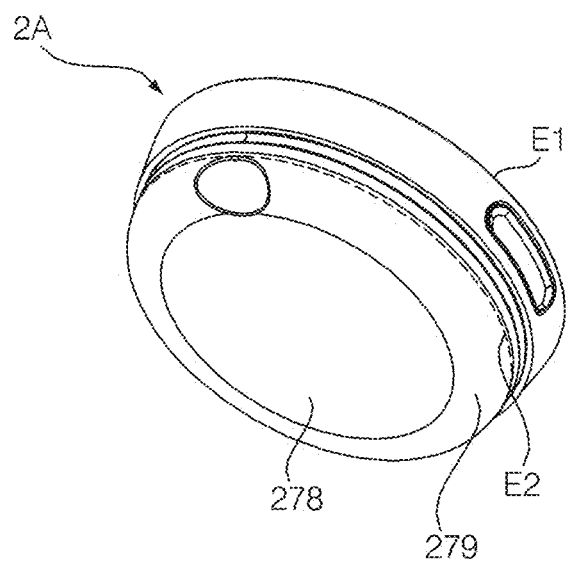
[Fig. 50]
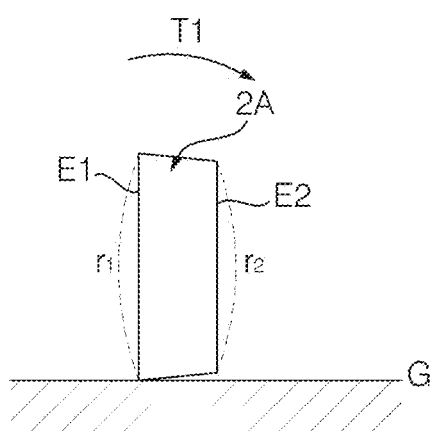

[Fig. 51]
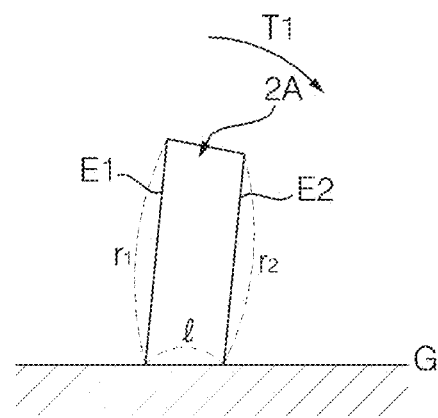
[Fig. 52]
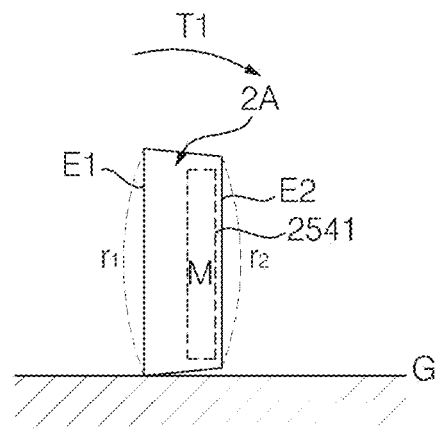

[Fig. 53]
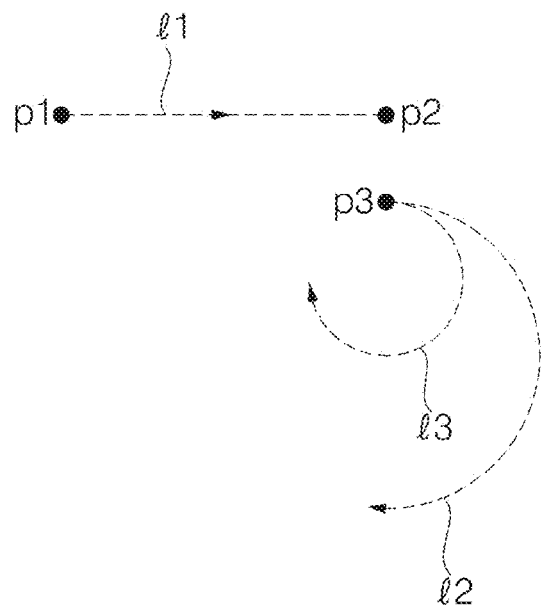
[Fig. 54]
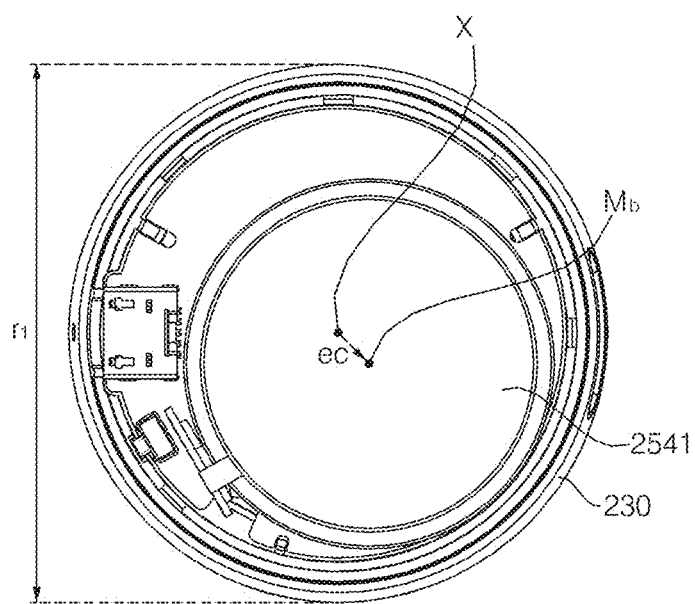

[Fig. 55A]
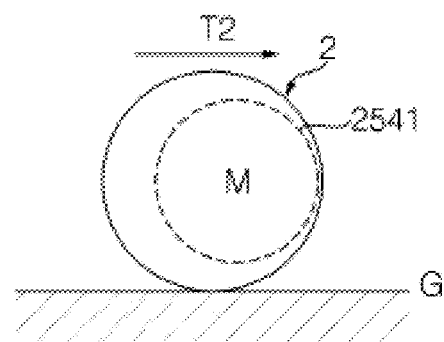
[Fig. 55B]
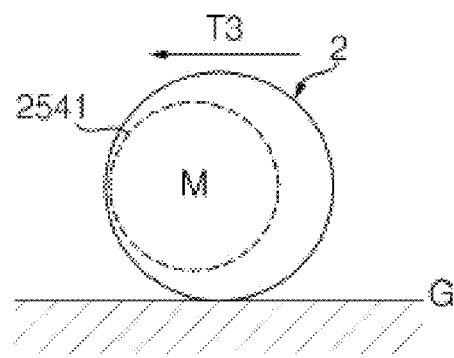

[Fig. 57]
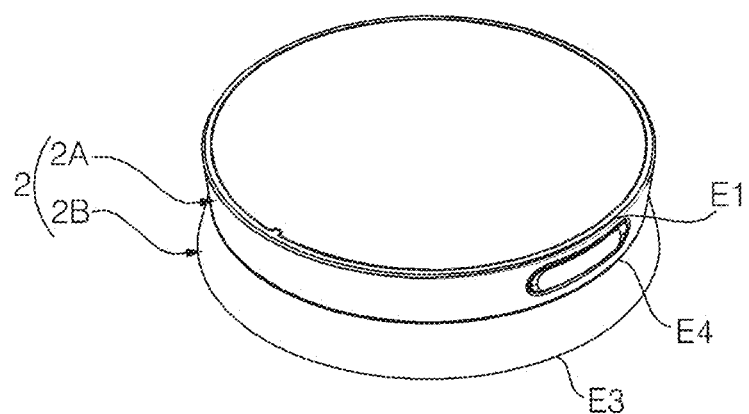
[Fig. 58]
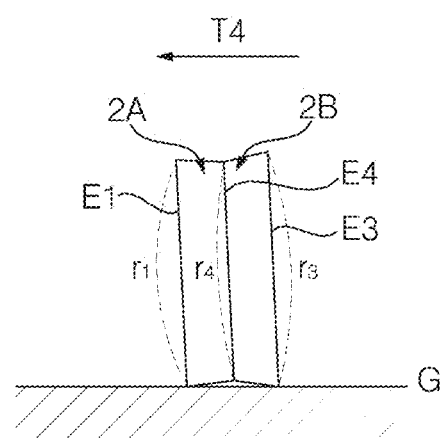

[Fig. 59]
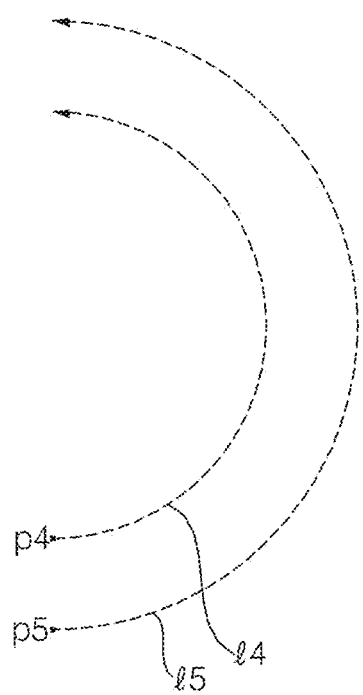

[Fig. 60A]
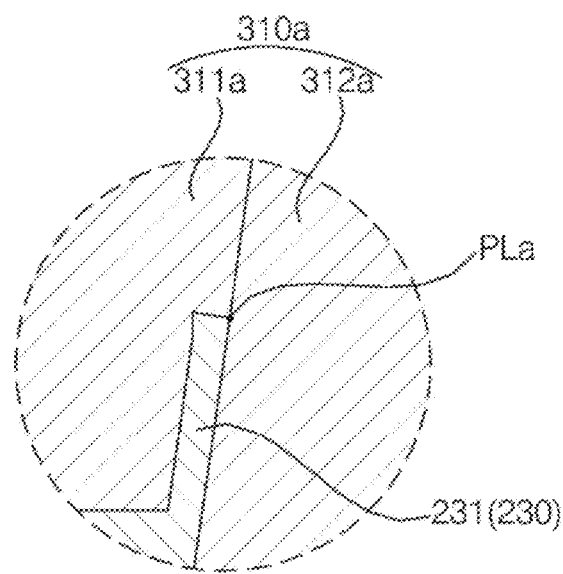
[Fig. 60B]
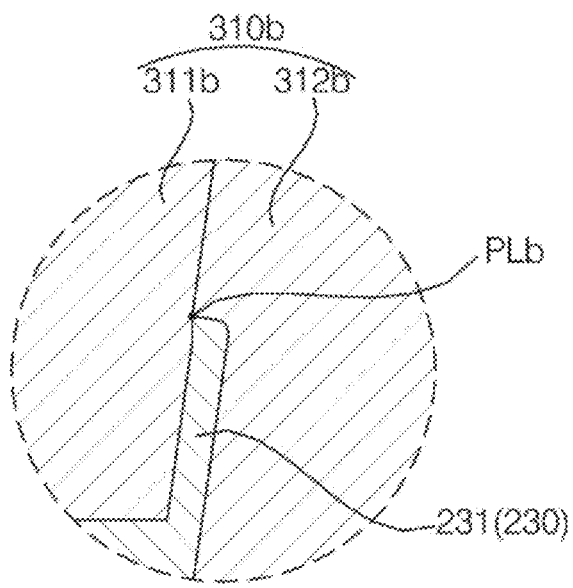

[Fig. 61]
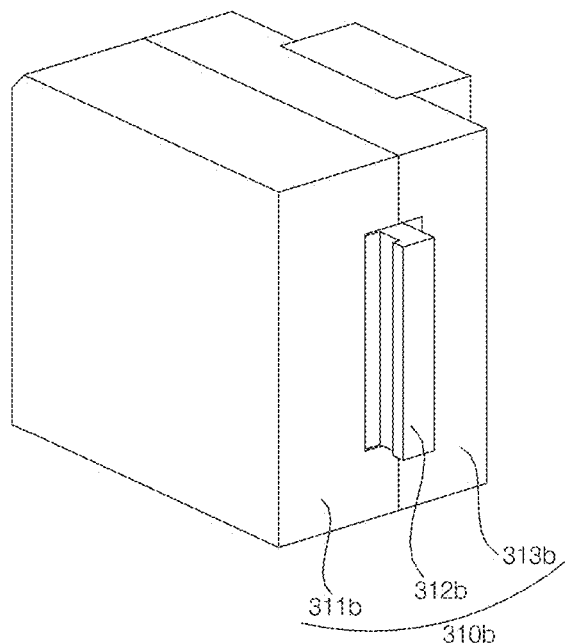
[Fig. 62]
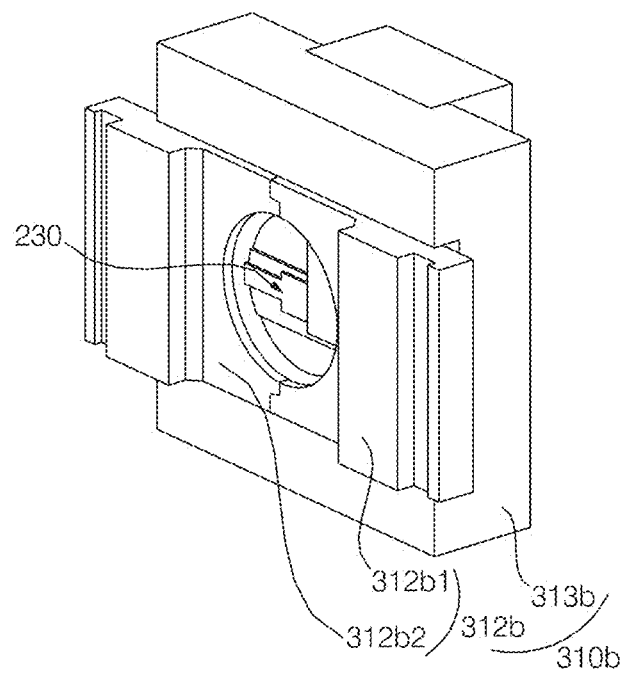

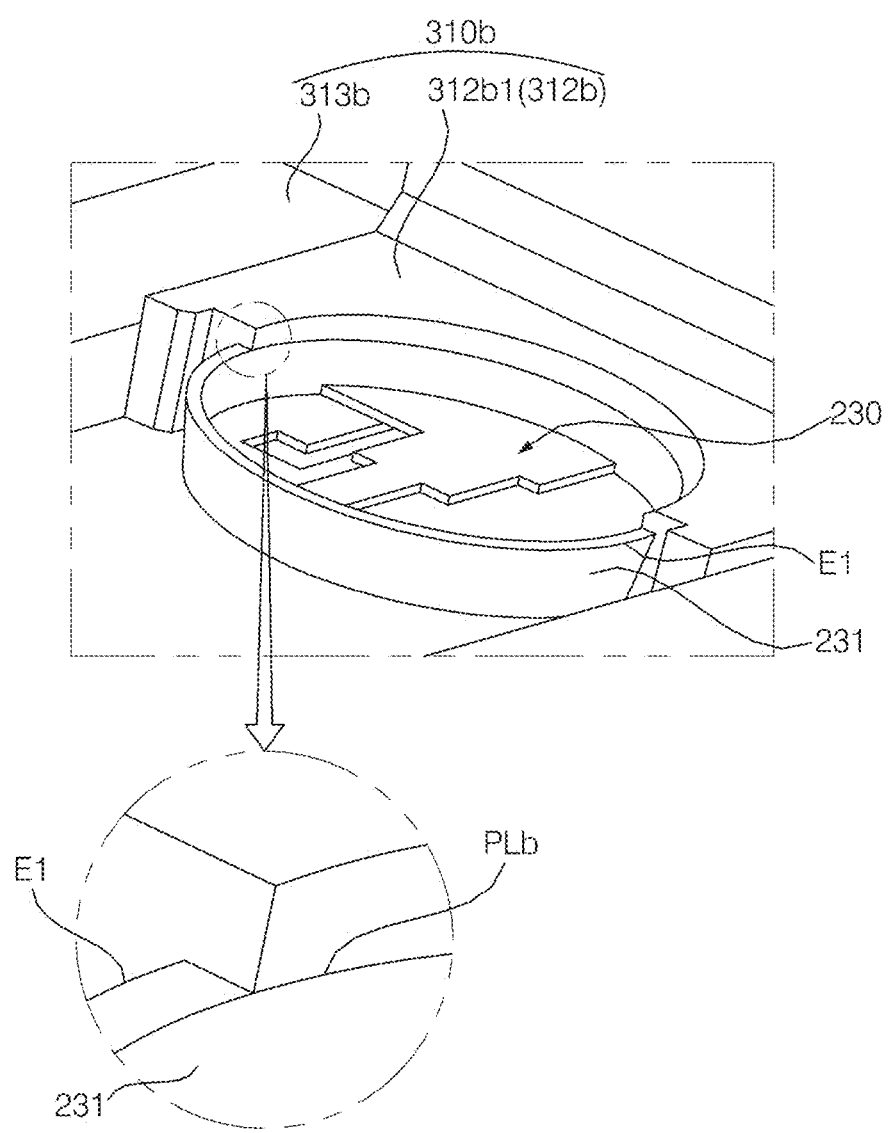
[Fig. 63]

ACCESSORY HAVING A COMMUNICATION FUNCTION FOR INTERNET OF THINGS

CROSS REFERENCE TO RELATED APPLICATIONS

This application claims the benefit of an earlier filing date and right of priority to U.S. Provisional application No. 62/341,566 filed on May 25, 2016, PCT Application No. PCT/KR2016/007314 filed on Jul. 6, 2016, and Korean Patent Application No. 10-2016-0115247 filed on Sep. 7, 2016, the disclosures of which are incorporated herein by reference.

FIELD

The present disclosure relates to an accessory having a communication function, and more particularly to an accessory for communication including a communication module for transmitting and receiving a signal over a predetermined network and an apparatus and method for manufacturing the same.

BACKGROUND

The Internet of Things (IoT) is intelligent technology and service for interconnecting things over the Internet to perform information communication between people and things and between things. For example, "information communication between things" means that apparatuses connected to the Internet transmit, receive, and process information without the intervention of people.

"Sensing technology" for sensing the surrounding circumstances (things or environments) to acquire information, "network technology" for interconnecting things to the Internet, and "service interface technology" for processing and providing information have been proposed as technologies for realizing the Internet of Things.

In the sensing technology, at least one selected from among environment sensors (e.g., a barometer, a hygrometer, a thermometer, a radioactivity sensor, a heat sensor, and a gas sensor), chemical sensors (e.g., an electronic nose, a health care sensor, and a biometric sensor), a proximity sensor, an illumination sensor, an acceleration sensor, a magnetic sensor, a gravity sensor, a gyroscope sensor, a motion sensor, an RGB sensor, an infrared (IR) sensor, an ultrasonic sensor, a remote sensor, an SAR, a radar, and optical sensors (e.g., a video sensor and an image sensor) may be included.

"Network technology" means interconnecting personal computers (PCs), various kinds of equipment and facilities, and portable terminals using various wired and/or wireless technologies. Ethernet, PLC, IEEE 1394, Home PNA, etc. are used as the wired technologies. IEEE 802.11. WLAN, IEEE 802.15 WPAN, UWB, Wi-Fi, ZigBee, Z-wave, Bluetooth, etc. are used as the wireless technologies. In some example, a server for collecting various kinds of information and transmitting and receiving various kinds of signals may be included in the network.

The network environment may be applied to various spatial or service-dimensional concepts as well as homes and offices.

Various apparatuses having a function for transmitting and receiving information about apparatuses over networks have been developed. Particularly, in the home networking field, home electric appliances equipped with the Internet of Things function have been developed.

In some examples, apparatuses may include various kinds of input units. For example, a switch, among the input units, is pushed when vertical pressure is applied thereto. After the switch is pushed, it may be necessary to return the switch to the original state thereof. In order to generate restoring force to return the switch to the original state thereof, an elastic member, such as a spring, may be used.

SUMMARY

One way to implement a technology based on the Internet of Things (IoT) may be to replace conventional electric home appliances having no IoT functions with new electric home appliances having IoT functions and to reconfigure environments such that the Internet of Things is made possible. However, the replacement of electric home appliances is too heavy a burden for users. In the case in which conventional electric home appliances having no IoT functions are not replaced with new electric home appliances having IoT functions, it may not be possible to use IoT technology. As a result, it may be difficult to easily and rapidly popularize IoT technology. It is a first object of the present disclosure to provide an accessory that is capable of enabling the realization of IoT functions without replacing conventional electric home appliances or reconfiguring environments.

To date, products having IoT functions have been based on individual standards proposed by manufacturers who manufacture the products having IoT functions, rather than based on unified standards. For this reason, the products are not compatible with each other, with the result that it is difficult to realize an IoT environment. It is a second object of the present disclosure to provide an accessory that is capable of enabling the realization of a desired IoT environment even in the case in which products having different IoT standards are used.

It is a third object of the present disclosure to provide an accessory the position of which can be easily changed as needed.

It is a fourth object of the present disclosure to provide a structure that a user can smoothly couple and separate detachable parts to and from each other.

In the case in which a synthetic resin is injection-molded using a mold (e.g., an injection-molding machine), if a material to be injection-molded is too thick, injection defects, such as burrs, may occur on the surface of the injection-molded product due to the difference in cooling speed between the inside and the outside of the material to be injection-molded. It is a fifth object of the present disclosure to provide a structure that may considerably reduce the occurrence of injection defects.

The accessory may be configured to have a structure in which all surfaces of the container are visible. As a result, a recessed structure provided to prevent the occurrence of injection defects is exposed outward, with the result that the accessory has a less aesthetically pleasing appearance, whereby the marketability of the accessory is lowered. It is a sixth object of the present disclosure to realize an accessory having a smooth appearance without the occurrence of injection defects, thereby solving this problem.

It is a seventh object of the present disclosure to use the recessed structure as a structure for coupling parts to be injection-molded.

According to one aspect of the subject matter described in this application, an accessory includes a main body that includes a communication module that is configured to communicate with a predetermined network, and a container including a main body-coupling portion that is located at an upper portion of the container and configured to separably couple to the main body, the container being made of a material that is able to be injection-molded. The container includes an outer portion that is exposed to an outside of the container based on the main body being coupled to the container, and an inner portion that is recessed downward to thereby define the main body-coupling portion, the inner portion including a bottom portion that defines a bottom surface of the inner portion, and an inclined portion that extends upward from a circumference of the bottom surface and outward with respect to a central axis passing through the container in a vertical direction.

Implementations according to this aspect may include one or more of following features. The outer portion may include an outward surface that is located radially outward from the central axis, the outward surface defining a catching recess that is located at a lower portion of the outward surface and depressed radially inward toward the central axis. In some examples, the outward surface may include an inclined surface that slopes with respect to the central axis, the outward surface becoming closer to the central axis in an upward direction.

In some implementations, the inclined portion of the inner portion may have a first section connected to the bottom surface and a second section extending radially outward from the first section, and an inclination angle of the second section with respect to the bottom surface may be greater than an inclination angle of the first section. The container may further include a container body that defines the bottom portion and the inclined portion, and a container side member that defines an outward surface. In some cases, the container body may include a contact surface that is oriented radially outward and contacts the container side member.

In some implementations, the contact surface may define a catching recess that is depressed radially inward toward the inclined portion. In some examples, both of the catching recess and the inclined portion are disposed in a horizontal imaginary plane parallel with the bottom surface. The outward surface may include an inclined surface that slopes with respect to the central axis, the outward surface becoming closer to the central axis in an upward direction. In some examples, the container side member may include an inward surface opposite the outward surface, the inward surface being oriented radially inward toward the central axis, and the container side member may have a uniform thickness between the outward surface and the inward surface.

In some implementations, the container side member may include an inward surface opposite the outward surface, the inward surface being oriented radially inward toward the central axis, and the inward surface may include an inclined surface that slopes with respect to the central axis, the inward surface becoming closer to the central axis in an upward direction. In some examples, the contact surface of the container body may contact the inward surface of the container side member, and the catching recess may be defined at a lower part of the contact surface.

In some implementations, the container side member may include an inward surface opposite the outward surface, the inward surface being oriented radially inward toward the central axis, and the container side member may include a couple hook located on the inward surface, the couple hook being configured to be inserted into the catching recess of the container body. In some examples, the inclined portion may extend in a circumferential direction, and the catching recess may extend in the circumferential direction.

In some implementations, the main body may include an attachment-detachment groove. The container side member may include an inward surface opposite the outward surface, the inward surface being oriented radially inward toward the central axis. The container may further include an attachment-detachment protrusion that protrudes from the inward surface and that is located vertically above the inclined portion, the attachment-detachment protrusion being configured to be inserted into the attachment-detachment groove based on the main body being coupled to the container.

In some implementations, the container side member may have a central opening that receives the container body based on the container body coupling to the container side member. The contact surface of the container body may define a guide recess that extends vertically, and the container side member includes a guide protrusion that protrudes from the inward surface, the guide protrusion being configured to be inserted into the guide recess.

According to another aspect of the subject matter described in this application, an accessory includes: a main body that includes a communication module that is configured to communicate with a predetermined network; and a container including a main body-coupling portion that is located at an upper portion of the container and configured to separably couple to the main body, the container being made of a material that is able to be injection-molded.

The container includes: an inner portion that is depressed downward, the inner portion defining the main body-coupling portion and a bottom portion thereof; and an outer portion that is exposed outward based on the main body being coupled to the container. The outer portion includes an outward surface that is oriented radially outward from a central axis passing through the container in a vertical direction and that includes an inclined surface that slopes with respect to the central axis, the inclined surface becoming closer to the central axis in an upward direction. The container further includes: a container body that defines the bottom portion of the inner portion, the container body including a contact surface facing radially outward and a catching recess depressed radially inward from a lower portion of the contact surface; and a container side member that defines the outward surface, the contact surface of the container body contacting the container side member.

Implementations according to this aspect may include one or more of following features. The container side member may include an inward surface opposite the outer surface, the inward surface being oriented inward toward the central axis and contacting the contact surface of the container body. In some implementations, the container side member may have a uniform thickness between the outward surface and the inward surface.

BRIEF DESCRIPTION OF THE DRAWINGS

FIG. 1 is a view showing an example network system.

FIG. 2 is a view showing another example network system.

FIG. 3 is a perspective view showing an accessory including an example main body and an example container are coupled to each other.

FIG. 4 is a perspective view showing the main body of FIG. 3 at a different angle.

FIG. 5 is a perspective view showing the container of FIG. 3 at a different angle.

FIG. 7 is a block diagram showing example functions of an implementation of the main body of FIG. 3.

FIG. 8 is a perspective view showing an example use of an example reflector.

FIG. 9 is a perspective view showing an example waterproof member.

FIG. 10 is a perspective view showing an example use of the waterproof member of FIG. 9.

FIGS. 11 to 16 are views showing use examples of the accessory of FIG. 3.

FIG. 17 is a conceptual view showing an example use in which the main body is selectively attached to a plurality of containers in the state in which the containers are attached at a plurality of positions.

FIG. 18 is an exploded perspective view showing the main body shown in FIG. 4.

FIG. 19 is an exploded perspective view showing FIG. 18 at a different angle.

FIG. 20 is a perspective view showing an example switch panel of FIG. 18.

FIG. 21 is a sectional view taken along line A1-A1' of FIG. 20.

FIG. 22 is a perspective view showing an example switch operation unit of FIG. 18.

FIG. 23 is a perspective view showing the switch operation unit of FIG. 22 at a different angle.

FIG. 24 is a sectional view taken along line A2-A2' of FIG. 23.

FIG. 25 is a perspective view showing an example side case of FIG. 18 in the state in which printed circuit boards (PCBs) are not coupled to the side case, but an example transmission member is coupled to the side case.

FIG. 26 is a perspective view showing the side case of FIG. 25 at a different angle.

FIG. 27 is an elevation view showing the side case of FIG. 25 when viewed from above.

FIG. 28 is a sectional view taken along line A3-A3' of FIG. 27.

FIG. 29 is a perspective view showing the state in which the upper PCB is coupled to the side case of FIG. 25.

FIG. 30 is a perspective view showing the side case and the upper PCB of FIG. 29 at a different angle.

FIG. 31 is an elevation view showing the side case and the upper PCB of FIG. 29 when viewed from above.

FIG. 32 is a perspective view showing the lower PCB of FIG. 18.

FIG. 33 is an elevation view showing the lower PCB of FIG. 32 when viewed from below.

FIG. 34 is a perspective view showing the state in which the lower PCB is coupled to the side case and the upper PCB of FIG. 29.

FIG. 35 is a perspective view showing the side case, the upper PCB, and the lower PCB of FIG. 34 at a different angle.

FIG. 36 is a vertical sectional view showing the main body of FIG. 3, showing the section of the transmission member.

FIG. 37 is a perspective view showing the transmission member of FIG. 18.

FIG. 38 is a horizontal sectional view showing the transmission member of FIG. 18.

FIG. 39 is a perspective view showing an example bottom case of FIG. 18.

FIG. 40 is a perspective view showing the bottom case of FIG. 39 at a different angle.

FIG. 41 is an elevation view showing the bottom case of FIG. 39 when viewed from above.

FIG. 42 is a sectional view taken along line A7-A7' of FIG. 41.

FIG. 43 is an exploded perspective view showing the container shown in FIG. 5.

FIG. 44 is a perspective view showing the container of FIG. 5 at a different angle.

FIG. 45 is an elevation view showing the container of FIG. 5 when viewed from above.

FIGS. 46A and 46B are sectional views of the container of FIG. 45.

FIG. 46A is a sectional view taken along line B1-B1'.

FIG. 46B is a sectional view taken along line B2-B2'.

FIGS. 46C and 46D are sectional views of another example of the container of FIG. 45.

FIG. 46C is a sectional view taken along line B1-B1'.

FIG. 46D is a sectional view taken along line B2-B2'.

FIG. 47 is a vertical sectional view showing an injection-molding machine (mold) used in a process in which an example container body of FIG. 43 is injection-molded using the injection-molding machine.

FIG. 48 is a sectional view showing the main body of FIG. 6 without the container.

FIG. 49 is a perspective view showing an example upper edge and an example lower edge of the main body of FIG. 48.

FIGS. 50 to 52 are conceptual views showing an example direction in which the main body of FIG. 48 is overturned when the main body rolls on a horizontal plane when viewed from side.

FIG. 50 is a view showing the state in which only the upper edge of the main body contacts the ground.

FIG. 51 is a view showing the state in which the lower edge of the main body contacts the ground.

FIG. 52 is a view showing the position of an example battery in FIG. 50.

FIG. 53 is a conceptual view showing example imaginary tracks formed by the upper edge and the lower edge of the main body on the horizontal plane when the main body is overturned while rolling along the horizontal plane.

FIG. 54 is an elevation view showing the main body of FIG. 4 without the bottom case, when viewed from below.

FIGS. 55A and 55B are conceptual views showing example directions of torque applied to the main body depending on the eccentric position of the battery when the main body rolls on the ground.

FIG. 57 is a view showing the upper edge of the main body, an example lower edge of the container, and an example upper edge of the container in the accessories of FIG. 56.

FIG. 58 is a conceptual view showing the direction in which the accessories of FIG. 57 are turned when the accessories roll on the horizontal plane when viewed from side.

FIG. 59 is a conceptual view showing imaginary tracks formed by the upper edge of the main body and the lower edge of the container on the horizontal plane when the accessories are turned while rolling along the horizontal plane.

FIGS. 60A and 60B are vertical sectional views showing example injection-molding machines (molds) used in a process in which the side case of FIG. 28 is injection-molded using the injection-molding machines, showing part Z in an enlarged state.

FIG. 60A shows an example parting line of one injection-molding machine on an outer corner of the upper end of the side member.

FIG. 60B shows another example parting line of another injection-molding machine on an inner corner of the upper end of the side member.

FIG. 61 is a perspective view showing the injection-molding machine used in a process in which the side case of FIG. 60B is injection-molded using the injection-molding machine.

FIG. 62 is a perspective view showing the injection-molding machine of FIG. 61 without an upper injection-molding unit.

FIG. 63 is a perspective view showing the injection-molding machine of FIG. 62 with one of the side injection-molding units removed.

DETAILED DESCRIPTION

Figure 6:
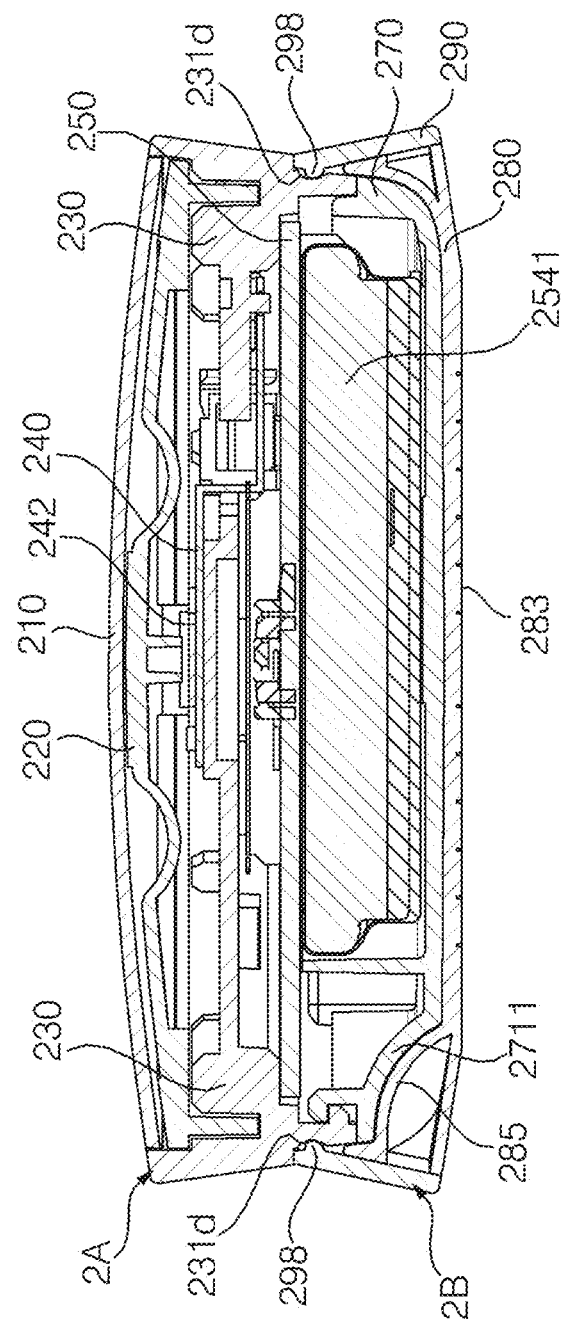
FIG. 6 is a sectional view taken along line AB-AB' of FIG. 3.

In the following description, the terms "front," "rear," "left," "right," "upper," and "lower," which indicate directions, are defined as shown in FIG. 3. However, these definitions are given only for clear understanding of the present disclosure, and the directions may be differently defined depending on the circumstances.

In FIG. 3, a central axis X refers to an imaginary vertical axis passing through the center of an example accessory 2A and 2B, a direction that becomes distant from the central axis X is defined as a direction XO outward from the axis, a direction that becomes close to the central axis X is defined as a direction XI inward toward the axis, and a direction that rotates about the central axis X is defined as a circumferential direction. However, these definitions are given only for clear understanding of the present disclosure, and the directions may be differently defined depending on the circumstances.

In some implementations, an example network may include an example accessory 2 having a communication function and a hub 1 communicating with the accessory 2. Hereinafter, a home network will be described as an example of the network. However, the present disclosure is not limited thereto.

FIG. 1 is a view showing an example home network system.

Referring to FIG. 1, the home network system may include example accessories 2, 3*a*, and 3*b*, a gateway 4, an example access point 7, and an example hub 1, which may transmit information to each other through a wired or wireless network. In some implementations, the home network system may further include a server 8 and a terminal 6.

In some implementations, the network may be configured based on Wi-Fi, Ethernet, ZigBee, Z-wave, or Bluetooth. The accessories 2, 3*a*, and 3*b*, the gateway 4, the access point 7, and the hub 1 may have communication modules that can access the network according to a predetermined protocol.

The communication modules included in the respective devices 2, 3*a*, 3*b*, 4, 7, and 1 constituting the network system are set based on the configuration of the network. Each device may include a plurality of communication modules based on the communication scheme between the devices and the network and between the devices.

The accessories 2, 3*a*, and 3*b* each may include at least one communication module for access to the network. The communication module communicates with a predetermined network. The communication of the communication module with the predetermined network means that the communication module communicates with at least one of the gateway 4, the access point 7, the hub 1, the server 8, and the terminal 6, which constitute the network.

In some implementations, the accessories 2, 3*a*, and 3*b* may each include an example sensor module for sensing the surrounding circumstances. The accessories 2, 3*a*, and 3*b* may each include a control module that exhibits a specific function affecting the surrounding circumstances. The accessories 2, 3*a*, and 3*b* may each include a remote control module 25 for transmitting an optical signal (e.g., an infrared signal) for controlling predetermined surrounding apparatuses.

The accessories 2, 3*a*, and 3*b* including the sensor modules may each be a device including an atmosphere sensor, a humidity sensor, a temperature sensor, a radioactivity sensor, a heat sensor, a gas sensor, an air quality sensor, an electronic nose sensor, a health care sensor, a biometric sensor, a sleep sensor (e.g., a sensor for sensing snoring, sleep apnea, and tossing of a user while the user sleeps in the state in which the sensor is attached to the pajamas or underwear of the user), a proximity sensor, an illumination sensor, an acceleration sensor, a magnetic sensor, a gravity sensor, a gyroscope sensor, a motion sensor, an RGB sensor, an infrared (IR) sensor, an ultrasonic sensor, a remote sensor, an SAR, a radar, or an optical sensor (e.g., a video sensor or an image sensor).

The accessories 2, 3*a*, and 3*b* including the control modules may each be an example smart light for controlling lighting, a smart plug for controlling the application and intensity of electric power, a smart temperature controller for controlling whether or not to operate a boiler or an air conditioner and the operation level of the boiler or the air conditioner, or a smart gas lock for controlling whether or not to interrupt gas.

The accessories 2, 3*a*, and 3*b* including the remote control modules may each be a device including an infrared LED for transmitting an infrared (IR) signal to a remote-controllable electric home appliance.

The accessories 2, 3*a*, and 3*b* may be configured to have predetermined purposes so as to exhibit predetermined performance. For example, the accessory 3*a* may be an image camera, and the accessory 3*b* may be a smart plug.

In some implementations, the accessory 2 may be configured so as to be installed at a position desired by a user. In some implementations, the accessory 2 may be configured to be used for various purposes. For example, the accessory 2 may be attached to an external object, such as an electric home appliance, a door, a window, or a wall. Detailed use examples of the accessory 2 will be described hereinafter.

The gateway 4 enables one or more accessories 2 and 3*b* to communicate with the access point 7. The gateway 4 communicates with the accessory 2 in a wireless fashion. The gateway 4 communicates with the access point 7 in a wired or wireless fashion. For example, the communication between the gateway 4 and the access point 7 may be based on Ethernet or Wi-Fi.

The access point 7 may be connected to the server 8 through wired or wireless communication. The server 8 may be accessible over the Internet. Various terminals 6 connected to the Internet may communicate with the server 8. For example, the terminal 6 may be a personal computer (PC) or a mobile terminal such as a smart phone.

The accessories 2 and 3*b* may be configured to communicate with the gateway 4. In another example, the accessory 3a may be configured to communicate with the access point 7 directly, rather than via the gateway 4.

The access point 7 may be configured to communicate with the accessory 3a or with another device 5 including a communication module directly, rather than via the gateway 4. The devices 5 and 3a may each include a Wi-Fi communication module, through which the devices 5 and 3a can communicate with the access point 7 directly, rather than via the gateway 4.

The hub 1 may be connected to the access point 7 through wired communication (e.g., Ethernet) or wireless communication (e.g., Wi-Fi). Communication between the hub 1 and the accessories 2 and 3b may be performed via the gateway 4 and the access point 7. In another example, communication between the hub 1 and the accessory 3a or the device 5 may be performed via the access point 7.

For example, signals from the accessories 2 and 3b may be transmitted to the hub 1 via the gateway 4 and the access point 7 in turn, and a signal from the hub 1 may be transmitted to the accessories 2 and 3b via the access point 7 and the gateway 4 in turn. In another example, a signal from the accessory 3a or the device 5 may be transmitted to the hub 1 via the access point 7, and a signal from the hub 1 may be transmitted to the accessory 3a or the device 5 via the access point 7.

For example, information acquired by a sensor module 24 of each of the accessories 2, 3a, and 3b may be transmitted to the server 8, the terminal 6, or the hub 1 over the network. In some implementations, a signal for controlling the sensor module, the control module, or the remote control module from the server 8, the terminal 6, or the hub 1 may be transmitted to the accessory 2. The signals are transmitted via the gateway 4 and/or the access point 7.

Communication between the accessories 2, 3a, and 3b and the hub 1 may be performed based only on the gateway 4 and the access point 7. For example, even in the case in which the home network is not connected to an external communication network such as the Internet, communication between the accessories 2, 3a, and 3b and the hub 1 may still be performed.

In the case in which the hub 1 is connected to the server 8 via the access point 7, information transmitted from the hub 1 or the accessory 2 may be stored in the server 8. The information stored in the server 8 may be received by the terminal 6 connected to the server 8.

In some implementations, information transmitted from the terminal 7 may be transmitted to the hub 1 or the accessory 2 via the server 8. A smart phone, which is a terminal that has been widely used in recent years, provides a graphic-based user interface (UI). Consequently, the accessory 2 may be controlled, or information received from the accessory 2 may be processed and displayed through the UI. In some implementations, an application installed in the smart phone may be updated so as to extend the range of functions that can be performed by the accessory 2.

In some implementations, the terminal 6 and the hub 1 may communicate with each other directly without the involvement of the server 8. For example, the terminal 6 and the hub 1 may communicate with each other directly via Bluetooth.

In some implementations, the accessory 2 may be controlled or information received from the accessory 2 may be processed and displayed using only the hub 1 without using the terminal 6. To this end, the hub 1 may include an input unit for receiving a command for controlling the accessory 2 and a visual or auditory output means (e.g., a display or a speaker) for displaying the process information. The input unit of the hub 1 may include various buttons, a touch-type display, or a microphone. In the case in which the hub includes a microphone, the controller of the hub may recognize the user's voice input through the microphone and extract a command therefrom.

FIG. 2 is a view showing another example home network system.

The home network system is substantially identical to the home network system according to the previous implementation except that the gateway 4 is not provided, and the hub 1 also performs the functions that the gateway 4 performs.

Referring to FIGS. 3 to 10, an example accessory 2 may include a main body 2A having a communication module 26 for communicating with a predetermined network and a container 2B having a main body-coupling portion 280a to which the main body 2A is detachably attached. In the case in which the main body 2A includes a proximity sensor 244, the accessory 2 may further include a reflector 2C for reflecting an optical signal (e.g., an infrared signal) transmitted by a proximity signal light-emitting unit 2441 of the proximity sensor 244. The accessory 2 may further include a waterproof member 2D separably detached to an apparatus to which the main body 2A and the container 2B are coupled.

The main body 2A, the container 2B, the reflector 2C, and the waterproof member 2D are separate members, which may be variably combined depending on the purpose desired by a user. The main body 2A, the container 2B, the reflector 2C, and the waterproof member 2D may be provided in different numbers.

The functional configuration of the main body 2A will be described with reference to FIG. 7. The main body 2A may include a controller 23 for controlling at least one function of the main body 2A. Of course, the controller 23 may be provided in the server 8, the terminal 6, or the hub 1. Even in this case, the present disclosure may be implemented over a network.

The main body 2A may include a sensor module 24 for sensing predetermined surrounding circumstances. The "predetermined surrounding circumstances" means information which can be determined based on the type of the sensor provided in the main body 2A, which is information about the surroundings of the main body 2A or information about a specific direction relative to the main body 2A.

In some implementations, the sensor module 24 may include a plurality of example sensors for sensing different kinds of targets. The targets may include atmosphere, temperature and humidity, radioactivity, heat, gas, air quality, electronic elements, various biometric elements, various sleep elements, proximity, illumination, acceleration, magnetism, gravity, motion, infrared (IR) light, ultrasonic waves, video, and images that can be sensed by the sensors.

In this implementation, the sensor module 24 may include an example proximity sensor 244 for sensing the proximity of the main body 2A to an external object in a specific direction. The sensor module 24 may include a temperature and humidity sensor 245. In this specification, the temperature and humidity sensor 245 may be any one selected from among a temperature sensor, a humidity sensor, and a temperature and humidity sensor. The sensor module 24 may include an acceleration sensor 257 for sensing the movement or vibration of the main body 2A.

The main body 2A may include a remote control module 25 for transmitting an optical signal for controlling predetermined surrounding apparatuses. The "predetermined surrounding apparatuses" may be predetermined remote-controllable apparatuses. For example, the predetermined surrounding apparatuses may include a washing machine, a refrigerator, an air conditioner, a robot cleaner, and a TV that can be controlled by a remote controller.

The remote control module 25 includes a control signal light-emitting unit 243 for emitting a predetermined optical signal, for controlling a predetermined surrounding apparatus, in a specific direction from the main body 2A. For example, the control signal light-emitting unit 243 may be an LED for emitting infrared light.

The main body 2A may include at least one selected from between the sensor module 24 and the remote control module 25. The main body 2A may include both the sensor module 24 and the remote control module 25. In this case, a user may use the main body 2A more flexibly when required.

The main body 2A may include a communication module 26 for communicating with a predetermined network. The communication module 26 may be changed depending on the communication scheme of a device with which the communication module 26 will communicate directly. Information acquired by the sensor module 24 may be transmitted over the network through the communication module 26. The main body 2A may receive information over the network through the communication module 26, and the sensor module 24, the remote control module 25, an output unit 28, or a storage unit 29, may be controlled based on the received information.

The main body 2A may include an input unit 27 for allowing a user to input a command directly, rather than via the communication module 26.

The input unit 27 may be a power switch for turning ON/OFF the main body 2A.

The input unit 27 may include a main switch 242 for setting the functions of the main body 2A, pairing of the main body 2A with a predetermined network, or pairing of the main body 2A with the terminal 6 or the hub 1. The main body 2A may be preset such that various commands are input to the main body 2A through a combination of the time for which the main switch 242 is pushed and/or the number of times the main switch 242 is pushed in succession.

The input unit 27 may include a reset button 252 for resetting the preset functions of the main body 2A. Previous pairing settings or information stored in the storage unit 29 may be reset by pushing the reset button 252.

The main body 2A may include a storage unit 29 for storing information acquired by the sensor module 24. The storage unit 29 may store information received through the communication module 26 over the network N. The storage unit 29 may store commands from the input unit 27.

The main body 2A may include a power supply device 254 for supplying power to the components of the main body 2A. The power supply device 254 may include a battery 2541. The battery 2541 may be provided for the purpose of charging.

The controller 23 may receive control information from the input unit 27. The controller 23 may control the output unit 28 to output predetermined information.

The controller 23 may control the communication module 26. The controller 23 may control the communication module 26 based on the control information received from the input unit 27. The controller 23 may perform control such that information received through the communication module 26 over the network is stored in the storage unit 29. The controller 23 may perform control such that information stored in the storage unit 29 is transmitted through the communication module 26 over the network.

The controller 23 may control whether or not to operate the sensor module 24. The controller 23 may control whether or not to operate the sensor module 24 based on the control information received through the communication module 26 over the network. The controller 23 may control the sensor module 24 based on the control information received from the input unit 27. The controller 23 may control the sensor module 24 based on the control information stored in the storage unit 29. The controller 23 may perform control such that information about the surrounding circumstances, sensed by the sensor module 24, is stored in the storage unit 29. The controller 23 may perform control such that the information about the surrounding circumstances, sensed by the sensor module 24, is transmitted through the communication module 26 over the network.

The controller 23 may control whether or not to transmit the information about the surrounding circumstances over the network. The information about the surrounding circumstances is predetermined information sensed under predetermined surrounding circumstances. The controller 23 may control whether or not the sensor module 24 is to sense information about the surrounding circumstances. Even when the sensor module 24 senses information about the surrounding circumstances, the controller 23 may control whether or not to transmit the sensed information about the surrounding circumstances over the network.

The controller 23 may perform control such that the type of the target transmitted over the network is changed. For example, the controller 23 may perform control such that a state change is performed from a first state in which a first target (e.g., proximity information) is sensed and information about the first target is transmitted over the network to a second state in which a second target (e.g., temperature and humidity) is sensed and information about the second target is transmitted over the network. In another example, the controller 23 may perform control such that a state change is performed from a third state in which a first target and a second target are sensed and only information about the first target is transmitted over the network to a fourth state in which a first target and a second target are sensed and only information about the second target is transmitted over the network.

In some implementations, the controller 23 may control whether or not to operate the remote control module 25. The controller 23 may control whether or not to operate the remote control module 25 based on control information received through the communication module 26 over the network. The controller 23 may control the remote control module 25 based on the control information received from the input unit 27. The controller 23 may control the remote control module 25 based on the control information stored in the storage unit 29.

The controller 23 may control whether or not to operate the remote control module 25. The controller 23 may perform control so as to change whether or not to operate the remote control module 25. For example, the controller 23 may perform control such that a state change is performed from a fifth state, in which the remote control module 25 is not operated, to a sixth state, in which the remote control module 25 is operated.

In the above description, the terms "first state," "second state," "third state," "fourth state," "fifth state," and "sixth state" are used only to avoid confusion between designated objects, and do not indicate the sequence or importance of the states.

Referring to FIGS. 3 to 6, the main body 2A and the container 2B are separably coupled to each other. The main body-coupling portion 280a may protrude such that a portion of the main body 2A is coupled to the main body-coupling portion 280a. In this implementation, the main body-coupling portion 280a is a depressed receiving space. The main body-coupling portion 280a may be provided in the upper side of the container 2B.

The main body 2A includes an exposed portion 201, which is exposed in the state in which the main body 2A is coupled to the container 2B, and an insertion portion 202, which is received in the main body-coupling portion 280a.

The exposed portion 201 is formed at the upper side of the main body 2A. The exposed portion 201 includes a side surface exposed in a direction XO outward from the axis and a top surface exposed to the upper side.

In some implementations, a switch panel 210, an opening 231b (e.g., a sensor hole) or a transmission member 260 for the sensor module 24, or a transmission member 260 for the remote control module 25 is disposed in the exposed portion 201. Even in the state in which the main body 2A is coupled to the container 2B, a user may contact the switch panel 210 of the main body 2A. Even in the state in which the main body 2A is coupled to the container 2B, the sensor module 24 or the remote control module 25 may be operated smoothly.

In this implementation, the transmission member 260 and/or the sensor hole 231b is formed at the side surface of the exposed portion 201. The transmission member 260 and the sensor hole 231b may be disposed in opposite directions. The transmission member 260 may be disposed at the front surface of the exposed portion 201, and the sensor hole 231b may be disposed at the rear surface of the exposed portion 201. In some implementations, the switch panel 210 may be disposed at the top surface of the exposed portion 201. A user may push the switch panel 210 downward from above.

The side surface of the exposed portion 201 may be an inclined surface that becomes gradually closer to the central axis X in the downward direction. The side surface of the exposed portion 201 may be an inclined surface that becomes gradually further away from the central axis X in the upward direction. The side surface of the exposed portion 201 may be a truncated conical surface. A side member 231 of a side case 230, a description of which will follow, defines the side surface of the exposed portion 201.

In some implementations, an example upper edge E1 of the main body 2A may be formed in a circular shape having a predetermined upper diameter. The upper edge E1 of the main body 2A may define the upper edge E1 of the exposed portion 201.

When the main body 2A is coupled to the container 2B, the lower end of the exposed portion 201 may contact the upper end of the container 2B. The lower end of the exposed portion 201 may contact the upper end of the main body-coupling portion 280a. The lower edge of the exposed portion 201 may be circular. The diameter of the lower edge of the exposed portion 201 may be smaller than the upper diameter.

The side surface of the exposed portion 201 includes an inclined surface, constituted by a set of lines interconnecting the upper edge of the exposed portion 201 and the lower edge of the exposed portion 201 by the shortest route. The side surface of the exposed portion 201 is an inclined surface that is oblique relative to the vertical direction, in which the upper edge of the exposed portion 201 and the lower edge of the exposed portion 201 are connected to each other.

The top surface of the exposed portion 201 may be dome-shaped. The top surface of the exposed portion 201 may include an upper side surface of the switch panel 210. The switch panel 210 may be formed in a circular shape having a diameter less than the upper diameter when viewed from above. For example, the side surface of the exposed portion 201 may be defined by a wall having a predetermined thickness, and the switch panel 210 may be disposed in a space surrounded by the side surface of the exposed portion 201, which is defined in a direction XI inward toward the axis at the upper end of the exposed portion 201. The switch panel 210 may be coupled to a switch operation unit 220, a description of which will follow, such that the switch panel 210 is movable upward and downward.

The insertion portion 202 is formed at the lower part of the main body 2A. The insertion portion 202 includes a side surface exposed in the direction XO outward from the axis and a lower surface exposed to the lower side.

The insertion portion 202 is received in the main body-coupling portion 280a such that the main body 2A and the container 2B are coupled to each other. The insertion portion 202 may be inserted into the main body-coupling portion 280a from above the container 2B.

The main body 2A may include a battery 2541 for charging. In this case, the main body 2A is provided with a charging terminal 255. The charging terminal 255 may be formed at the side surface of the insertion portion 202. The accessory 2 is configured such that the charging terminal 255 connected to the battery 2541 is exposed when the main body 2A is separated from the container 2B.

The main body 2A may include a reset button 252. The main body 2A is configured such that the reset button 252 is exposed when the main body 2A is separated from the container 2B.

The insertion portion 202 may be provided with a direction-setting recess 270a, a description of which will follow. The direction-setting recess 270a is formed in one side of the lower edge of the insertion portion 202. The direction-setting recess 270a is defined by a depression 2711 in the insertion portion 202.

In some implementations, the insertion portion 202 may be provided with an attachment-detachment groove 231d, a description of which will follow. The attachment-detachment groove 231d extends along the circumference of the insertion portion 202 in the circumferential direction. The attachment-detachment groove 231d may extend in a circular shape. The attachment-detachment groove 231d is formed in the side surface of the insertion portion 202 in the direction XO outward from the axis. The attachment-detachment groove 231d is depressed in the direction XI inward toward the axis.

In this implementation, the charging terminal 255 is formed at the lower side of the sensor hole 231b. The reset button 252 may be formed on the surface in which the attachment-detachment groove 231d is formed.

The edge of the main body-coupling portion 280a may be circular, and the insertion portion 202, which is inserted into the main body-coupling portion 280a, may be generally cylindrical. The side surface of the insertion portion 202 in the direction XO outward from the axis and the lower surface of the insertion portion 202 in the downward direction are connected to each other in a round shape. The direction-setting recess 270a is formed in one side of the round portion of the side surface and the lower surface of the insertion portion 202.

The lower surface of the insertion portion 202 defines the lower surface of the main body 2A. The lower surface of the main body 2A has an area less than the area defined by the upper edge of the main body 2A. The lower surface of the main body 2A is configured to overlap the area defined by the upper edge of the main body 2A when viewed from below.

In some implementations, the lower surface of the main body 2A may be generally circular. The diameter of the lower surface of the main body 2A may be smaller than the upper diameter of the main body 2A.

The side surface of the insertion portion 202 may include an inclined surface, which is inclined in the same direction as the side surface of the exposed portion 201. The side surface of the insertion portion 202 may be a truncated conical surface.

The side surface of the main body 2A in the direction XO outward from the axis includes the side surface of the exposed portion 201 and the side surface of the insertion portion 202. The side surface of the main body 2A may include a partially stepped portion. The side surface of the main body 2A may include a surface having a recess.

The container 2B includes an outer portion 205, which is exposed outward when the main body 2A is coupled to the container 2B, and an inner portion 206, which defines the main body-coupling portion 280a.

The inner portion 206 of the container 2B may be depressed. The inner portion 206 of the container 2B may be depressed downward. The inner portion 206 may be depressed downward from the upper middle of the container 2B.

The inner portion 206 includes an example inner surface 281 of a container body 280 and an example inwardly exposed surface 292a of a container side member 290. The inner surface 281 includes a bottom portion 281a, which defines the bottom of the main body-coupling portion 280a and an inclined portion 281b, which is inclined upward from the bottom portion 281a in the direction XO outward from the axis. The inclined portion 281b may be formed such that the inclination of the inclined portion 281b becomes steeper from the bottom portion 281a in the direction XO outward from the axis. For example, the inclined portion of the inner portion may have a first section connected to the bottom surface and a second section extending radially outward from the first section, and an inclination angle of the second section with respect to the bottom surface may be greater than an inclination angle of the first section.

In some implementations, the bottom portion 281a may be circular when viewed from above. The inclined portion 281b may extend such that the inclination of the inclined portion 281b becomes steeper in the direction XO outward from the axis. The inwardly exposed surface 292a may be disposed at the upper side of the inclined portion 281b. The inwardly exposed surface 292a may be formed further inward than the inclined portion 281b in the direction XO outward from the axis. The inwardly exposed surface 292a may be formed at a position further away from the central axis X than the inclined portion 281b.

The inner portion 206 of the container 2B may be provided with a direction-setting protrusion 285, which is engaged into the direction-setting recess 270a. The direction-setting protrusion 285 is disposed at a position distant from the central axis X. The direction-setting protrusion 285 is defined by a portion of the inclined portion 281b that protrudes.

The inner portion 206 of the container 2B may be provided with an attachment-detachment protrusion 298, which is inserted into the attachment-detachment groove 231d when the main body 2A is coupled to the container 2B. The attachment-detachment protrusion 298 may be disposed at the upper circumference of the inner portion 206. The attachment-detachment protrusion 298 is disposed at the upper side of the inclined portion 281b. The attachment-detachment protrusion 298 may extend along the circumference of the inner portion 206. In this implementation, a plurality of attachment-detachment protrusions 298 is disposed along the circumference of the inner portion 206 in the state of being spaced apart from each other. The attachment-detachment protrusions 298 may be arranged at uniform intervals. The attachment-detachment protrusions 298 are formed on the surface of the inner portion 206 in the direction XI inward toward the axis. The attachment-detachment protrusions 298 protrude in the direction XI inward toward the axis. The attachment-detachment protrusions 298 may be formed on the inwardly exposed surface 292a.

The outer portion 205 includes a side surface in the direction XO outward from the axis and a bottom surface in the downward direction. The side surface of the outer portion 205 may be an outward surface 291, a description of which will follow.

The outward surface 291 may define an inclined surface that becomes gradually closer to the central axis X in the upward direction. The outward surface 291 may be a truncated conical surface. The outward surface 291 may be located radially outward from the central axis.

The upper edge of the container 2B may be an upper edge of the outer portion 205, and the lower edge of the container 2B may be a lower edge of the outer portion 205. The lower edge of the container 2B may be formed in a circular shape having a predetermined lower diameter.

When the main body 2A is coupled to the container 2B, the upper end of the outer portion 205 contacts the lower end of the exposed portion 201 of the main body 2A. The lower edge of the exposed portion 201 may be circular. The upper edge of the outer portion 205 may be circular. The upper edge of the outer portion 205 may be formed in a circular shape having an upper diameter less than the lower diameter of the container 2B.

The lower edge of the container 2B may be formed in a circular shape having a predetermined lower diameter different from the upper diameter of the main body 2A. The lower diameter of the container 2B may be greater than the upper diameter of the main body 2A.

In some implementations, the outward surface 291 may be constituted by a set of lines interconnecting the upper edge of the outer portion 205 and the lower edge of the outer portion 205 by the shortest route. The side surface of the outer portion 205 is an inclined surface that is oblique relative to the vertical direction in which the upper edge of the container 2B and the lower edge of the container 2B are connected to each other.

When viewed from below, the middle part of the bottom surface of the outer portion 205 may be a horizontal surface 283, and the edge part of the bottom surface of the outer portion 205 may be an inclined surface 283a. The inclined surface 283a is formed such that the height of the inclined surface 283a is gradually increased in the direction XO outward from the axis. That is, when the bottom surface of the outer portion 205 contacts an external plane, only the horizontal surface 283 of the bottom surface of the outer portion 205 contacts the external plane.

The container 2B includes an external coupling portion 283. The horizontal surface 283 includes an external coupling portion 283, which is formed so as to be attached to an external object. The external coupling portion 283 is provided at the lower side of the container 2B. The external coupling portion 283 may be attached to one surface of an external object. The external coupling portion 283 is attached to an external object, such as the surface of an external apparatus, a wall, a door, a window, or a ceiling, to support the container 2B or the accessory 2, to which the container 2B and the main body 2A are coupled. The external coupling portion 283 may include a sticker or a material having attachment force. The external coupling portion 283 may be attached to one surface of an external object such that the external coupling portion 283 can be detached from the external object.

The remote control module 25 includes a control signal light-emitting unit 243 for emitting an optical signal in a specific direction from the main body 2A. In the case in which the main body 2A includes the control signal light-emitting unit 243, the container 2B includes a direction-setting portion for guiding the main body 2A such that the specific direction is set to a predetermined direction when the container 2B is attached to an external object.

The sensor module 24 may include a proximity sensor 244 for sensing the proximity of the main body 2A to an external object in a specific direction. The container 2B includes a direction-setting portion for guiding the main body 2A such that the specific direction is set to a predetermined direction when the container 2B is attached to an external object.

For example, the specific direction is set when the container 2B is attached to an external object, and even in the case in which the main body 2A is separated from the container 2B and is then coupled to the container 2B again, the specific direction of the control signal light-emitting unit 243 or the proximity sensor 244 is uniformly set by the direction-setting portion.

When the main body 2A is coupled to the container 2B, the direction-setting portion sets the direction in which the main body 2A is disposed relative to the container 2B. For example, when the main body 2A is coupled to the container 2B, the direction-setting portion sets the direction in which the main body 2A is disposed relative to the container 2B in the specific direction.

The container 2B may include a direction-indicating portion 289 for visually indicating the specific direction. The direction-indicating portion 289 may be formed at the inner portion 206 of the container 2B. The direction-indicating portion 289 may be a printed mark, a relief mark, or an intaglio mark. The direction-indicating portion 289, the direction-setting portion 285 and 270a, and the proximity sensor 244 are disposed such that the direction indicated by the direction-indicating portion 289 becomes the specific direction. In some implementations, the direction-indicating portion 289, the direction-setting portion 285 and 270a, and the control signal light-emitting unit 243 are disposed such that the direction indicated by the direction-indicating portion 289 becomes the specific direction.

Even when the container 2B, to which the main body 2A is not coupled, is attached to an external object, the user may preset the specific direction through the direction-indicating portion 289. In the case in which the container 2B is attached to an external object in the direction indicated by the direction-indicating portion 289, the specific direction is set to the direction indicated by the direction-indicating portion 289 when the main body 2A is coupled to the container 2B.

The direction-setting portion includes a direction-setting protrusion 285 and a direction-setting recess 270a. The main body 2A includes one selected from between the direction-setting protrusion 285 and the direction-setting recess 270a, and the container 2B includes the other selected from between the direction-setting protrusion 285 and the direction-setting recess 270a. In the state in which the specific direction is set to the predetermined direction, the direction-setting protrusion 285 is engaged into the direction-setting recess 270a. In this implementation, the direction-setting protrusion 285 is formed on the container 2B, and the direction-setting recess 270a is formed in the main body 2A.

The direction-setting protrusion 285 may be dome-shaped.

The attachment-detachment groove 231d is formed in one selected from between the main body 2A and the container 2B, and the attachment-detachment protrusions 298 are formed on the other selected from between the main body 2A and the container 2B.

The attachment-detachment groove 231d is formed in one of the main body 2A and the container 2B in which the direction-setting recess 270a is formed, and the attachment-detachment protrusions 298 are formed on the other of the main body 2A and the container 2B on which the direction-setting protrusion 285 is formed. In this implementation, the attachment-detachment protrusions 298 are formed on the container 2B, and the attachment-detachment groove 231d is formed in the main body 2A.

When the main body 2A is coupled to the container 2B, the attachment-detachment protrusions 298 are inserted into the attachment-detachment groove 231d. When the main body 2A is coupled to the container 2B, the attachment-detachment protrusions 298 are inserted into the attachment-detachment groove 231d such that the main body 2A is fixed to the container 2B.

The attachment-detachment groove 231d extends in the circumferential direction. The attachment-detachment groove 231d may extend in a circular shape. In the case in which the attachment-detachment groove 231d is formed in the main body 2A, the attachment-detachment groove 231d extends along the outer circumference of the main body 2A so as to be depressed in the direction XI inward toward the axis. In the case in which the attachment-detachment groove is formed in the container 2B, the attachment-detachment groove extends along the inner circumference of the container 2B so as to be depressed in the direction XO outward from the axis.

In the case in which the attachment-detachment groove 231d extends in the circumferential direction and the direction-setting protrusion 285 is not provided, the main body 2A is movable relative to the container 2B in the state in which the main body 2A is coupled to the container 2B. In the case in which the direction-setting protrusion 285 is provided, the main body 2A is movable relative to the container 2B in the state in which the main body 2A is incompletely coupled to the container 2B, a detailed description of which will follow.

The direction-setting protrusion 285 is disposed so as to be eccentric from the central axis X in one direction (e.g., in the direction XO outward from the axis). In this case, the attachment-detachment protrusions 298 include a first attachment-detachment protrusion 298a disposed opposite to the direction-setting protrusion 285 about the central axis X (see FIG. 45). Even when the insertion portion 202 of the main body 2A and the inner surface of the inner portion 206 of the container 2B are spaced apart from each other by the direction-setting protrusion 285 in the state in which the direction-setting protrusion 285 is not engaged into the direction-setting recess 270a, therefore, the first attachment-detachment protrusion 298a may be inserted into the attachment-detachment groove 231d. The first attachment-detachment protrusion 298a, inserted into the attachment-detachment groove 231d, is movable along the attachment-detachment groove 231d. As the first attachment-detachment protrusion 298a is moved along the attachment-detachment groove 231d, the main body 2A is rotated in the state in which the main body 2A is not completely coupled to the container 2B. As the first attachment-detachment protrusion 298a is moved along the attachment-detachment groove 231d, the main body 2A is rotated relative to the container 2B until the direction-setting protrusion 285 is engaged into the direction-setting recess 270a.

For example, in the state in which until the direction-setting protrusion 285 is not engaged into the direction-setting recess 270a, the first attachment-detachment protrusion 298a may be inserted into the attachment-detachment groove 231d such that the first attachment-detachment protrusion 298a can slide in the circumferential direction. When the first attachment-detachment protrusion 298a slides along the circular attachment-detachment groove 231d, the main body 2A may be rotated in the state of being inclined with respect to the container 2B.

The attachment-detachment protrusions 298 include a second attachment-detachment protrusion 298b, which can be inserted into the attachment-detachment groove 231d only in the state in which the direction-setting protrusion 285 is engaged into the direction-setting recess 270a. When the main body 2A is pushed downward at the position at which the direction-setting protrusion 285 is engaged into the direction-setting recess 270a after the first attachment-detachment protrusion 298a slides along the circular attachment-detachment groove 231d, the second attachment-detachment protrusion 298b is engaged into the attachment-detachment groove 231d. The main body 2A is fixed to the container 2B by the second attachment-detachment protrusion 298b in the state in which the direction-setting protrusion 285 is engaged into the direction-setting recess 270a.

In some implementations, a plurality of second attachment-detachment protrusions 298b may be arranged in the circumferential direction at intervals. The second attachment-detachment protrusions 298b may be arranged at uniform intervals. One of the second attachment-detachment protrusions 298b may be disposed at the same side as the direction-setting protrusion 285 with respect to the central axis X.

In this implementation, the direction-setting protrusion 285 is disposed at the left side, the first attachment-detachment protrusion 298a is disposed at the right side, and the second attachment-detachment protrusions 298b are disposed at the left side, the front side, and the rear side. A larger number of second attachment-detachment protrusions 298b than the number of second attachment-detachment protrusions 298b may be provided.

Each of the attachment-detachment protrusions 298 may be hook-shaped. The vertical length of each of the attachment-detachment protrusions 298 may be greater than the circumferential length of each of the attachment-detachment protrusions 298.

Referring to FIG. 8, the proximity sensor 244 may include a proximity signal light-emitting unit 2441 for emitting a predetermined optical signal Ira in the specific direction and a proximity signal light-receiving unit 2442 for receiving an optical signal Irb reflected in the specific direction (See FIG. 31). The accessory 2 may further include a reflector 2C for reflecting the emitted optical signal Ira.

The reflector 2C includes a reflective surface 2C1 for reflecting the emitted optical signal Ira and an attachment surface 2C2 configured to be attachable to an external object. The reflective surface 2C1 of the reflector 2C may be formed of a material exhibiting high reflectance. The attachment surface 2C2 of the reflector 2C may be detachably attached to one surface of an external object.

In some implementations, the optical signal Ira emitted by the proximity signal light-emitting unit 2441 may be infrared light. The proximity signal light-receiving unit 2442 may sense the intensity of the optical signal Irb reflected by the reflector or the external object to determine whether the accessory 2 has approached the external object or the reflector.

In the case in which it is sensed whether the door 71 is open or closed using the proximity sensor 244, the reflector 2C may also be used, which will be described with reference to FIG. 15.

Referring to FIGS. 9 and 10, the accessory 2 includes a detachable waterproof member 2D for sealing a boundary between the main body 2A and the container 2B in the state in which the main body 2A is coupled to the container 2B. The waterproof member 2D may be used in the case in which the accessory 2 is placed in an environment having high humidity or in an environment in which the accessory 2 easily contacts water.

The waterproof member 2D may seal the boundary between the main body 2A and the container 2B. The waterproof member 2D may prevent water from permeating into the charging terminal 255, which is located at the insertion portion 202, though the boundary between the main body 2A and the container 2B.

In the state in which the main body 2A is coupled to the container 2B, the boundary between the main body 2A and the container 2B may define an edge that is smaller than the upper edge of the main body 2A and the lower edge of the container 2B.

The side surface of the exposed portion 201 of the main body 2A may be an inclined surface that becomes gradually closer to the central axis X in the downward direction, and the side surface of the outer portion 205 of the container 2B may be an inclined surface that becomes gradually closer to the central axis X in the upward direction.

The upper edge of the main body 2A may be circular, and the lower edge of the container 2B may be circular. In the state in which the main body 2A is coupled to the container 2B, the boundary between the main body 2A and the container 2B may be formed in a circular shape smaller than the upper edge of the main body 2A and the lower edge of the container 2B.

In this case, the waterproof member 2D may include an elastic band covering between the upper edge of the main body 2A and the lower edge of the container 2B in the state in which the main body 2A is coupled to the container 2B. The elastic band may be detachably attached to the assembly of the main body 2A and the container 2B.

In some implementations, the waterproof member 2D may be caught between the upper edge of the main body 2A and the lower edge of the container 2B, whereby the waterproof member 2D is easily disposed. In some implementations, the upper end and the lower end of the waterproof member 2D tightly contact the side surface of the main body 2A and the side surface of the container 2B, respectively, thereby further improving waterproofing efficiency.

Use examples of the accessory 2 will be described with reference to FIGS. 11 to 16. Various kinds of information (e.g., vibration, acceleration, temperature, humidity, and infrared light), which will be sensed in the following description, may be transmitted through the communication module over the network. Necessary information may be automatically determined based on a signal transmitted over the network. A user may be notified of the information or the determination result through the terminal 6 or the hub 1. Alternatively, the information or the determination result may be used to control other apparatuses.

Referring to FIG. 11, an accessory 2 having an acceleration sensor 257 may be attached to a laundry treatment apparatus 30 to sense vibration generated during the operation of the laundry treatment apparatus 30. The accessory 2 may be attached to a cabinet 31 or a door 33 of the laundry treatment apparatus 30. The accessory 2 may sense a vibration cycle or a vibration period to determine whether or not the laundry treatment apparatus 30 is being operated and the kind of operation performed by the laundry treatment apparatus 30 over the network.

In some implementations, in the case in which the accessory 2 having the acceleration sensor 257 is attached to the door 33 of the laundry treatment apparatus 30, it is possible to sense acceleration based on opening and closing motions of the door 33. As a result, it is possible to determine, over the network, whether the door 33 is opened or closed.

In some implementations, the accessory 2 having the acceleration sensor 257 may be placed in a washing hub for receiving laundry in the laundry treatment apparatus 30 in the state in which the waterproof member 2D is attached to the accessory 2 having the acceleration sensor 257. In this case, vibration or acceleration may be sensed by the acceleration sensor 257, whereby it is possible to determine, over the network, whether or not the laundry treatment apparatus 30 is being operated.

In some implementations, an accessory 2 having a temperature and humidity sensor 245 may be placed in the washing hub for receiving laundry in the laundry treatment apparatus 30. In this case, the humidity in the laundry treatment apparatus 30 during a drying operation may be sensed, whereby it is possible to determine, over the network, whether or not the drying of the laundry has been completed.

Referring to FIG. 12, in the case in which an example accessory 2 having an acceleration sensor 257 is attached to a door 43 of a refrigerator 40, it is possible to sense acceleration based on opening and closing motions of the door 43. As a result, it is possible to determine, over the network, whether the door 43 is opened or closed.

In the case in which the refrigerator 40 includes a plurality of doors 43, accessories 2-1, 2-2, 203, and 2-4 may be attached respectively to doors 43a, 43b, 43c, and 43d in order to determine, over the network, whether the doors 43a, 43b, 43c, and 43d are opened or closed.

In some implementations, an accessory 2 having a remote control module 25 may be attached to a remote-controllable laundry treatment apparatus 30 or refrigerator 40 in order to emit an optical signal to the laundry treatment apparatus 30 or the refrigerator 40 based on a control signal over the network.

Referring to FIG. 13, an example accessory 2 having a temperature and humidity sensor 245 may be placed in an indoor space 50 in which an air conditioner 51 is installed to sense the temperature and humidity in the indoor space 50.

In some implementations, a necessary control signal may be transmitted to the accessory 2 based on information about temperature and humidity sensed in the indoor space 50 over the network, and an accessory 2 having a remote control module 25 may emit an optical signal to the air conditioner 51 in order to control whether or not to operate the air conditioner 51 and how to operate the air conditioner 51.

In the indoor space 50, an accessory 2-1 may be attached to the surface of the air conditioner 51. An accessory 2-2 may be attached to a wall 55 or the ceiling.

Referring to FIG. 14, in a robot cleaner system 60, an example accessory 2 having a proximity sensor 244 may be attached to a robot cleaner 61 (2-1 in FIG. 14) or may be attached to a charging cradle 63 of the robot cleaner (2-2 in FIG. 14). An accessory 2 (2A and 2B) having a proximity sensor 244 may be attached to one selected from between the robot cleaner 61 and the charging cradle 63, and a reflector 2C may be attached to the other selected from between the robot cleaner 61 and the charging cradle 63, in order to sense whether the robot cleaner 61 is separated from the charging cradle 63.

In some implementations, an accessory 2 having an acceleration sensor 257 may be attached to the robot cleaner 61 in order to sense acceleration based on the movement of the robot cleaner 61 and to determine, over the network, whether the robot cleaner 61 is operating.

In some implementations, an accessory 2 having a remote control module 25 may be attached to a remote-controllable robot cleaner 61 in order to emit an optical signal to the robot cleaner 61 based on a control signal over the network.

Referring to FIG. 15, in a door 71 or window system 70 of a building, an example accessory 2 having an acceleration sensor 257 may be attached to the door 71 or the window in order to sense acceleration based on opening and closing motions of the door 71 or the window. As a result, it is possible to determine, over the network, whether the door 71 or the window is opened or closed.

In some implementations, an accessory 2 (2A and 2B) having a proximity sensor 244 may be attached to one selected from between the door 71 and a wall 75 adjacent to the door 71, and a reflector 2C may be attached to the other selected from between the door 71 and the wall 75 adjacent to the door 71. For example, the accessory 2 (2A, 2B, and 2C) may be disposed such that an optical signal emitted by the proximity sensor 244 is reflected by the reflector 2C in the case in which the door 71 is closed. In this case, when the door 71 is opened, the reflector 2C disposed so as to be adjacent thereto in a specific direction in which the proximity sensor 244 emits the optical signal may disappear or move away to enable sensing of whether or not the door 71 is open. Whether or not the window is open may be sensed in the same manner.

In some implementations, in the case in which the opening and closing motions of a main door 71 of a building or a main door 43 of a refrigerator are not sensed for a long time, a resident may have had a mishap. In this case, this information may be forwarded to the terminal 6.

Referring to FIG. 16, an example TV 80 may include a cabinet 81, such as a display panel. The TV 80 may include a control signal light-receiving unit 83 for receiving a remote control signal. An accessory 2 having a remote control module 25 may be attached to the cabinet 81 of the TV 80 or an object adjacent to the TV 80. The accessory 2 may be disposed such that a specific direction in which an optical signal is emitted is directed to the control signal light-receiving unit 83. An optical signal may be emitted to the TV 80 based on a control signal over the network.

However, the present disclosure is not limited to the above implementations. The accessory 2 may be attached to the other apparatuses or may be disposed in other places.

In each of the above implementations, a signal transmitted by the accessory 2 over the network may be received by the terminal 6. An application installed in the terminal 6 may analyze the received signal to acquire information about the operating state of an electric home appliance (e.g., imbalance of a washing machine) or information about opening and closing of a door. The information or the results derived as the result of processing the information (e.g., a warning indicating abnormal operation of a washing machine and a notice requesting that the state of a resident be checked when a door is not opened and closed for a long time) may be displayed through the display or speaker of the terminal 6 or the hub 1.

Referring to FIG. 17, a plurality of containers 2B may be attached to respective external objects located at different positions. The number of containers 2B may be greater than the number of main bodies 2A. In this case, a user may select some of the containers 2B as needed and may couple the main bodies 2A to the selected containers 2B. In this way, it is possible to easily change the positions of the main bodies 2A. In the case in which the containers 2B are attached to the external objects at optimal positions and in optimal directions, the main bodies 2A may be easily coupled to the containers 2B. Consequently, dual effort to dispose the main bodies 2A at optimal positions and in optimal directions is not necessary.

For example, in the state in which a container 2B-1 is attached to a position 30 and another container 2B-2 is attached to another position 40, a main body 2A-1 may be coupled to the container 2B-1 and afterward may be coupled to the container 2B-2 as needed.

A plurality of containers 2B-1, 2B-2, 2B-3, 2B-4, 2B-5, and 2B-6 are attached respectively at a plurality of positions 30, 40, 50, 60, 70, and 80, and a smaller number of main bodies 2A than the number of containers may be coupled to one or more containers 2B as needed. In order to realize the above implementations, the main bodies 2A may be disposed at all the positions. Alternatively, a smaller number of main bodies 2A may be used, and the positions of the main bodies 2A may be easily changed.

The controller 23 may perform control such that the kind of a target transmitted over the network can be changed based on the change in position of the main body 2A. The kind of a target transmitted over the network may be changed by user input through the terminal 6 or the input unit 27. Alternatively, the kind of a target transmitted over the network may be changed in response to automatically changing position information.

The controller 23 may perform control so as to change whether or not to transmit the information about the surrounding circumstances over the network and whether or not to operate the remote control module 25. Whether or not to transmit the information about the surrounding circumstances and whether or not to operate the remote control module 25 may be changed by user input through the terminal 6 or the input unit 27. Alternatively, whether or not to transmit the information about the surrounding circumstances and whether or not to operate the remote control module 25 may be changed in response to automatically changed position information.

The Internet of Things environment required by the user may be changed depending on the change in position of the main body 2A. As a result, information about a target to be transmitted over the network may be changed, or whether or not to transmit the information about the surrounding circumstances and whether or not to operate the remote control module 25 may be changed.

Referring to FIG. 17, a plurality of example accessories 2 may be used to constitute a network system. For example, a main body 2A-1 and another main body 2A-2 may be disposed at two positions selected from among various positions 30, 40, 50, 60, 70, and 80 within the network environment N.

The network system includes a server 8 for receiving information about the surrounding circumstances of one of the two main bodies 2A-1 and 2A-2, e.g., the main body 2A-1, from the main body 2A-1. The server 8 transmits a signal for controlling an apparatus placed around the other main body 2A-2 to the main body 2A-2 based on the sensed information. The transmission and reception of information between the server 8 and the main body 2A means that information is transmitted and received via the gateway 4, the access point 7, and/or the hub 1.

For example, when a main body 2A-1 disposed at the door system 70 senses that the door 71 has been opened through the network system, a main body 2A-2 disposed at the robot cleaner system 60 may emit a remote control optical signal to the robot cleaner 61 such that the robot cleaner 61 cleans two opposite spaces partitioned by the door 71.

In another example, a main body 2A-1 disposed at a certain point in the indoor space 50 senses temperature and humidity at the point through the network system, and a main body 2A-2 disposed at the air conditioner 51 may emit a remote control optical signal for controlling whether or not to operate the air conditioner 51 and the operation level of the air conditioner 51 to the air conditioner 51.

In another example, a main body 2A-1 disposed at a certain point senses information about completion of operation of the washing machine, opening of the door of the refrigerator, opening of the outdoor entrance, or opening of the window at the point through the network system, and a main body 2A-2 disposed at the TV 80 may emit a remote control optical signal for controlling the operation of the TV 80 to the control signal light-receiving unit 83. As a result, a user may be informed of a specific notice or warning through the TV 80.

In a further example, a main body 2A-1 introduced into the laundry treatment apparatus 30 together with laundry senses temperature and humidity in the laundry treatment apparatus 30 through the network system, and a main body 2A-2 disposed outside the laundry treatment apparatus 30 may emit a remote control optical signal for controlling the operation of the laundry treatment apparatus 30 to the laundry treatment apparatus 30.

The network system may further include a third main body 2A. In this case, the server 8 may receive information about the surrounding circumstances of the third main body 2A and the main body 2A-1. The server 8 may emit a signal for controlling an apparatus place around the main body 2A-2 to the main body 2A-2 based on the sensed information.

In the case in which three main bodies 2A are used, for example, the third main body disposed at the door system 70 may sense the opening of the door 71, the main body 2A-1, which is disposed in one, in which the air conditioner 51 is not installed, of two opposite spaces connected to each other as the result of opening of the door 71 may sense the temperature or humidity in the space, and the main body 2A-2 disposed at the air conditioner 51 may emit a remote control optical signal for controlling whether or not to operate the air conditioner 51 and the operation level of the air conditioner 51 to the air conditioner 51, through the network system. In the case in which the third main body senses that the door 71 is closed, setting may be performed such that the air conditioner 51, at which the main body 2A-2 is disposed, is not controlled based on the temperature or humidity sensed by the main body 2A-1.

The respective components of the main body 2A will be described in detail with reference to FIGS. 18 to 39.

Referring to FIGS. 18 and 19, the main body 2A includes an example switch panel 210, which is elastically deformed when pushed downward by a user to push the main switch 242, a switch operation unit 220, which is elastically deformed to generate restoring force when the switch panel 210 is elastically deformed while supporting the switch panel 210, cases 230 and 270 for supporting the switch operation unit 220 and defining the external appearance of the main body 2A, printed circuit boards (PCBs) 240 and 250 received in the cases 230 and 270, and a transmission member 260 disposed in the cases 230 and 270 for transmitting an optical signal.

In this implementation, the switch panel 210 defines at least a portion of the upper surface of the main body 2A. The cases 230 and 270 include a side case 230 defining at least a portion of the external shape of the main body 2A in the direction XO outward from the axis. The side case 230 is disposed at the lower side of the switch panel 210. The cases 230 and 270 include a bottom case 270 defining the bottom surface of the external shape of the main body 2A. The bottom case 270 is connected to the lower end of the side case 230. The switch operation unit 220 is located on the upper side of the side case 2320. The switch operation unit 220 is disposed at the lower side of the switch panel 210. The switch operation unit 220 contacts the switch panel 210. When the switch panel 210 is elastically deformed, the switch operation unit 220 is also elastically deformed. The PCBs 240 and 250 include an upper PCB 240 and a lower PCB 250. The lower PCB 250 is disposed under the upper PCB 240. The lower PCB 250 is connected to the upper PCB 240. The upper PCB 240 is located in the side case 230. The lower PCB is located in the side case 230 and the bottom case 270.

Referring to FIGS. 20 and 21, the switch panel 210 is dome-shaped. The switch panel 210 is formed of a dome-shaped plate that is convex upward. The switch panel 210 is formed in a convex shape such that the center of the switch panel 210 is the highest. The switch panel 210 is formed such that the edge of the switch panel 210 is the lowest. When pushed downward, the dome-shaped switch panel 210 is deformed while generating upward restoring force.

The switch panel 210 defines the upper surface of the main body 2A. The switch panel 210 may be made of synthetic resin. The switch panel 210 is attached to the switch operation unit 220. The switch panel 210 may be attached to the switch operation unit 220 using a double-sided adhesive. When the switch panel 210 is pushed downward and deformed downward, an elastic operation portion 225, a description of which will follow, is pushed downward.

The switch panel 210 may include a plate having a predetermined thickness. The switch panel 210 includes an upper surface 211, defining the external appearance of the main body 2A, and a lower surface 213 for defining the interior of the main body 2A.

The outer circumference of the switch panel 210 contacts the inner surface of the side case 230. For example, the outer circumference of the switch panel 210 contacts the inner surface of a side member 231, a description of which will follow (the side surface of the side member 231 in the direction XI inward toward the axis). In this case, the upper surface of the outer circumference of the switch panel 210 substantially coincides with the upper end surface of the side member 231. When the dome-shaped switch panel 210 is pushed downward, the inner surface of the side member 231 prevents the switch panel 210 from extending in the direction XO outward from the axis. As a result, on the assumption that the other conditions of the dome-shaped switch panel 210 are not changed, greater restoring force is generated when the switch panel 210 is elastically deformed downward.

When viewed from above, the switch panel 210 is generally dome-shaped. The switch panel 210 may be provided in the edge thereof with a switch panel recess 210a. When the switch panel 210 is located on the side case 230, a positioning protrusion 232 of the side case 230, a description of which will follow, is engaged into the switch panel recess 210a. As a result, the switch panel 210 may be located on the side case 230 and the switch operation unit 220 in the designed direction.

The switch panel 210 includes a light transmission unit 215 made of a material that transmits light. The light transmission unit 215 is made of a transparent or semitransparent material that transmits light in the upward and downward direction of the switch panel 210. The light transmission unit 215 is formed at a portion of the switch panel 210 that is spaced apart from the central axis X in the direction XO outward from the axis. In the state in which the main body 2A is assembled, a display LED 249 is disposed at the lower side of the light transmission unit 215. Light emitted by the display LED 249 may pass upward through the light transmission unit 215. The positioning protrusion 232 and the switch panel recess 210a are disposed such that the display LED 249 is disposed at the lower side of the light transmission unit 215 in the case in which the positioning protrusion 232 is engaged into the switch panel recess 210a.

Referring to FIGS. 22 to 24, the switch operation unit 220 includes an example support frame 221 located in the case (the side case) 230 and an elastic operation portion 225 connected to the support frame 221 such that the elastic operation portion 225 can contact the switch panel 210.

The support frame 221 is fixed to the case (the side case) 230. The support frame 221 is located on the upper side of the side case 230. The support frame 221 is disposed in the side case 230. The support frame 221 supports the elastic operation portion 225.

The support frame 221 may be provided in the edge thereof with a support frame recess 221a. When the support frame 221 is disposed in the side case 230, a positioning protrusion 232 of the side case 230, a description of which will follow, is engaged into the support frame recess 221a. As a result, the switch operation unit 220 is located I the side case 230 in the designed direction.

In the case in which the positioning protrusion 232 is engaged into the support frame recess 221a, the temperature and humidity sensor 245 and the transmission member 260 may be disposed in a gap between a plurality of separate insertion ribs 223a and 223b, a description of which will follow. In some implementations, in the case in which the positioning protrusion 232 is engaged into the support frame recess 221a, interference is prevented when other parts are disposed between the light transmission unit 215 and the display LED 249.

The support frame 221 includes an edge member 222 extending along the circumference thereof about the central axis X. The edge member 222 may be generally formed in a ring shape. The edge member 222 may be made of a plate having a predetermined vertical thickness. The edge member 222 extends along the inner circumference of the side case 230. The side of the edge member 222 in the direction XO outward from the axis contacts the inner surface of the side case 230. The upper surface of the edge member 222 contacts the lower surface of the switch panel 210. The switch panel 210 may be attached to the edge member 222. The lower surface of the edge part of the switch panel 210 is disposed on the upper surface of the edge member 222.

The edge member 222 may be provided with an opening (a recess or a hole) for avoiding interference with other parts when PCBs 240 and 250 are coupled to the side case 230. For example, an opening 222b for securing a space occupied by the temperature and humidity sensor 245 may be formed in the edge member 222. An opening 222c for securing a space occupied by the proximity sensor 244 may be formed in the edge member 222. An opening 222d for securing a space occupied by the remote control module 25 may be formed in the edge member 222. The recesses 222b, 222c, and 222d for securing spaces occupied by the other parts may be formed in the edge member 222 in the direction XI inward toward the axis.

The elastic operation portion 225 is connected to the edge member 222. The elastic operation portion 225 crosses the center of the edge member 222. The edge member 222 has elastic operation portion fixing ends 222a, to which the elastic operation portion 225 is connected. The vertical thickness of each of the elastic operation portion fixing ends 222a is greater than the vertical thickness of the elastic operation portion 225.

The support frame 221 includes an insertion rib 223 protruding downward from the edge member 222 and extending along the edge member 222. The insertion rib 223 may extend in the circumferential direction. A single long insertion rib 223 may be provided. In this implementation, a plurality of separate insertion ribs 223 is provided.

The insertion ribs 223 are inserted into the case. The insertion ribs 223 are inserted into the side case 230. The insertion ribs 223 are inserted into holding recesses 236c formed in holding ribs 236 of the side case 230. The support frame 221 is more stably located in the side case 230 by the insertion ribs 223.

The insertion ribs 223 are separated from each other about a portion at which the temperature and humidity sensor 245 is disposed. The insertion ribs 223 are also separated from each other about another portion at which the humidity sensor 244 or the remote control module 25 is disposed. The insertion ribs 223 may include a first insertion rib 223a and a second insertion rib 223b, which are separated from each other. The first insertion rib 223a and the second insertion rib 223b extend from the portion at which the temperature and humidity sensor 245 is disposed to the portion at which the humidity sensor 244 or the remote control module 25 is disposed.

The support frame 221 includes a case-coupling portion 224 coupled to the side case 230. The case-coupling portion 224 may be formed in the shape of a hook or a recess. A plurality of case-coupling portions 224 may be arranged along the circumference of the support frame 221 at intervals. The case-coupling portions 224 are formed at the lower surface of the edge member 222. The case-coupling portions 224 are formed at the sides of the insertion ribs 223 in the direction XO outward from the axis. The upper surfaces of the case-coupling portions 224 are connected to the lower surface of the edge member 222, and the ends of the case-coupling portions 224 in the direction XI inward toward the axis are connected to the insertion ribs 223. The case-coupling portions 224 may be coupled to the inner wall of the side case 230 in the direction XO outward from the axis.

In this implementation, a coupling recess 224a is formed in each of the case-coupling portions 224. The coupling recess 224a may be formed so as to be depressed in the direction XI inward toward the axis. The circumferential length of the coupling recess 224a may be greater than the vertical length of the coupling recess 224a. The coupling recesses 224a may be arranged along the circumference of the support frame 221 at intervals.

The circumferentially opposed sides and the lower side of each of the coupling recesses 224a are defined by a corresponding one of the case-coupling portions 224. The upper side of each of the coupling recesses 224a may be defined by the lower surface of the edge member 222.

The case-coupling portions 224 are coupled to support frame-coupling portions 2331 of the side case 230. Coupling recesses are formed in one selected from the case-coupling portions 224 and the support frame-coupling portions 2331, and protrusions, which are engaged into the coupling recesses, are formed in the other selected from the case-coupling portions 224 and the support frame-coupling portions 2331. In this implementation, the coupling recesses 224a are formed in the case-coupling portions 224, and protrusions, which are engaged into the coupling recesses, are formed in the support frame-coupling portions 2331.

The elastic operation portion 225 is disposed at the lower side of the switch panel 210. When the switch panel 210 is elastically deformed downward, the elastic operation portion 225 is also elastically deformed downward to generate restoring force. When the switch operation portion 220 is elastically deformed downward, the main switch 242 is pushed. When the main switch 242 is pushed, control information is input to the controller 23.

The elastic operation portion 225 is disposed at the upper side of the main switch 242. The main switch 242 is disposed in the cases 230 and 270. The main switch 242 is pushed downward such that a command is input to the controller 23. When the elastic operation portion 225 is elastically deformed downward, the main switch 242 is pushed. The elastic operation portion 225 is spaced apart from the upper end of the main switch 242 by a predetermined distance in the state of not being elastically deformed.

The elastic operation portion 225 is disposed between the switch panel 210 and the main switch 242.

The elastic operation portion 225 is formed at the support frame 221 in a bridge shape. The elastic operation portion 225 may be generally formed of a bar type plate. The elastic operation portion 225 may cross the central axis X. The elastic operation portion 225 horizontally traverses the upper side of the main switch 242. When the elastic operation portion 225 is viewed from above, a first connection part 226a, a first bent part 227a, a middle part 228, a second bent part 227b, and a second connection part 226b, a description of which will follow, are sequentially arranged.

The elastic operation portion 225 is generally convex upward. The middle part of the elastic operation portion 225 is the highest. Referring to FIG. 24, the middle part 228 of the elastic operation portion 225 is higher by a predetermined length hs than the end of the edge member 222 in the direction XO outward from the axis.

The elastic operation portion 225 may be connected to opposite sides of the edge member 222. The elastic operation portion 225 may cross the center of the edge member 222. When the elastic operation portion 225 is pushed downward, therefore, the edge member 222 restricts the opposite ends of the elastic operation portion 225 to prevent the elastic operation portion 225 from extending in the opposite directions such that the elastic deformation is concentrated on the bent parts 227, a description of which will follow.

The elastic operation portion 225 includes connection parts 226 connected to the support frame 221, bent parts 227 formed so as to be convex downward, and a middle part 228 connected to the bent parts 227a and 227b. The middle part 228 includes a horizontal plate 228a having opposite ends connected to the bent parts 227a and 227b and a push protrusion 228b for pushing the main switch 242 downward.

The bent parts 227 are convex downward. When the elastic operation portion 225 is pushed, the bent parts 227 are much more elastically deformed than the other parts.

The bent parts 227 connect the connection parts 226 to the middle part 228. One end a1 of each of the bent parts 227 is connected to a corresponding one of the connection parts 226, and the other end a2 of each of the bent parts 227 is connected to the middle part 228. The bent parts 227 include a first bent part 227a for connecting the first connection part 226a to the middle part 228 and a second bent part 227b for connecting the second connection part 226b to the middle part 228.

The bent parts 227 are connected to the opposite ends of the middle part 228. The bent parts 227 include a first bent part 227a connected to one end of the middle part 228 and a second bent part 227b connected to the other end of the middle part 228.

The first bent part 227a is configured such that the end a2 of the first bent part 227a adjacent to the middle part 228 is higher than the end a1 of the first bent part 227a distant from the middle part 228. The second bent part 227b is configured such that the end a2 of the second bent part 227b adjacent to the middle part 228 is higher than the end a1 of the second bent part 227b distant from the middle part 228.

When the elastic operation portion 225 is pushed downward in the state in which the elastic operation portion 225 is convex upward without the bent parts 227, buckling may occur in an undesired portion of the elastic operation portion 225, and excessive force may be required in order to push the elastic operation portion 225.

In the present disclosure, the bent parts 227 are provided. When the elastic operation portion 225 is pushed downward, the bent parts 227 are further bent, with the result that the curvature of the bent parts 227 is increased and the distance between the opposite ends a1 and a2 of each of the bent parts 227 is decreased. As the bent parts 227 are elastically deformed when bent, restoring force is generated.

For example, the first bent part 227a has a curvature that is convex downward. When the middle part 228 is pushed downward, the first bent part 227a is further bent, with the result that the curvature of the first bent part 227a is increased and the distance between the opposite ends a1 and a2 of the first bent part 227a is decreased. In some implementations, the second bent part 227b has a curvature that is convex downward. When the middle part 228 is pushed downward, the second bent part 227b is further bent, with the result that the curvature of the second bent part 227b is increased and the distance between the opposite ends a1 and a2 of the second bent part 227b is decreased.

As a result, deformation of the elastic operation portion 225 is concentrated on the bent parts 227 without buckling, which is advantageous in inducing deformation desired by a designer and in predetermining the magnitude of the restoring force.

The connection parts 226 include a first connection part 226a defining one end of the elastic operation portion 225 and connected to one side of the support frame 221 and a second connection part 226b defining the other end of the elastic operation portion 225 and connected to the other side of the support frame 221. The first connection part 226a and the second connection part 226b may be disposed about the central axis X in opposite directions. The first connection part 226a and the second connection part 226b are connected to the elastic operation portion fixing ends 222a.

One end of each of the connection parts 226 is connected to the support frame 221, and the other end of each of the connection parts 226 is connected to a corresponding one of the bent parts 227. The first connection part 226a connects the first bent part 227a to the support frame 221. The second connection part 226b connects the second bent part 227b to the support frame 221.

Each of the connection parts 226 may be formed of a bar type plate. Each of the connection parts 226 may be a member having a predetermined vertical thickness. Each of the connection parts 226 is disposed to have the inclination in which the height is gradually increased from the end a0 of the support frame 221 to the end a1 of each of the bent parts 227. The first connection part 226a is disposed to have the inclination in which the height is gradually increased from the end a0 of the support frame 221 to the end a1 of the first bent part 227a. The second connection part 226b is disposed to have the inclination in which the height is gradually increased from the end a0 of the support frame 221 to the end a1 of the second bent part 227b. As a result, the elastic operation portion 225 may be generally formed so as to be convex upward.

The middle part 228 is disposed between the middle part of the switch panel 210 and the main switch 242.

The middle part 228 is disposed at the lower side of the middle part of the switch panel 210. The upper surface of the middle part 228 may contact the lower surface of the switch panel 210 or may be spaced apart from the lower surface of the switch panel 210. In the state in which the middle part 228 and the switch panel 210 are not elastically deformed, the upper surface of the middle part 228 may be spaced apart from the lower surface of the switch panel 210. When the switch panel 210 is elastically deformed downward, the lower surface of the switch panel 210 contacts the upper surface of the middle part 228, with the result that the middle part 228 is pushed downward.

The middle part 228 is disposed at the upper side of the main switch 242. When moved downward, the middle part 228 pushes the main switch 242. In the state in which the middle part 228 is not elastically deformed, the middle part 228 is spaced apart from the upper end of the main switch 242 by a predetermined distance.

The middle part 228 interconnects the bent parts 227. One end of the middle part 228 is connected to the first bent part 227a, and the other end of the middle part 228 is connected to the second bent part 227b. The upper surface of the middle part 228 is disposed higher than the other parts of the elastic operation portion 225. As a result, the elastic operation portion 225 may be generally formed so as to be convex upward.

The middle part 228 includes a horizontal plate 228a defining the upper surface of the middle part 228.

The connection parts 226a and 226b and the bent parts 227a and 227b are each formed of a plate. The first connection part 226a, the second connection part 226b, the first bent part 227a, and the second bent part 227b are each formed of a plate.

The horizontal plate 228a is thicker than the first bent part 227a and the second bent part 227b. The horizontal plate 228a may be thicker than the first connection part 226a and the second connection part 226b. As a result, the rigidity of the horizontal plate 228a is increased. When the elastic operation portion 225 is pushed downward, therefore, the elastic deformation may be easily concentrated on the bent parts 227. Consequently, it is possible for a designer to more easily set the elastic force of the elastic operation portion 225. In some implementations, the rigidity of the horizontal plate 228a is sufficiently secured even if the largest bending moment is applied to the horizontal plate 228a, thereby improving the durability of the elastic operation portion 225.

The horizontal plate 228a interconnects the bent parts 227. One end of the horizontal plate 228a is connected to the first bent part 227a, and the other end of the horizontal plate 228a is connected to the second bent part 227b.

The middle part 228 includes a push protrusion 228b protruding downward from the lower surface of the horizontal plate 228a. The push protrusion 228b may be disposed at the middle of the horizontal plate 228a. The push protrusion 228b may have various shapes. In this implementation, the push protrusion 228b is formed in a hollow cylindrical shape.

In the state in which the upper end b2 of the middle part 228 is not pushed, the lower end b1 of the push protrusion 228b is spaced apart from the upper end of the main switch 242 by a first predetermined length. When the middle part 228 is pushed downward, the lower end b1 of the push protrusion 228b contacts the upper end of the main switch 242, with the result that the main switch 242 is pushed downward. The main switch 242 is set to be pushed by a second predetermined length. The sum of the first predetermined length and the second predetermined length is defined as a stroke length d1.

The depth of the downwardly concave surface of each of the bent parts 227 is defined as a bending depth d2. For example, the bending depth d2 may be defined as the distance from a plane interconnecting the opposite ends a1 and a2 of each of the bent parts 227 to the upper surface of each of the bent parts 227.

The elastic operation portion 225 may be configured such that the bending depth d2 is greater than the stroke length d1. As a result, the elastic deformation of the elastic operation portion 225 may be concentrated on the bent parts 227 under the condition that the stroke length d1 is uniform. The bending depth d2 may be about 1.5 times the stroke length d1. For example, the stroke length d1 may be preset to about 0.5 mm, and the bending depth d2 may be preset to about 0.75 mm.

The structure of the side case 230 will be described in detail with reference to FIGS. 25 to 27.

The side case 230 includes a side member 231 defining the external appearance of the circumference thereof about the central axis X. The side member 231 may extend in the circumferential direction. The side member 231 may be constituted by a wall having a predetermined vertical height. Referring to FIG. 36, an inclined surface S of the side member 231 is formed so as to become increasingly distant from the central axis X in the upward direction. The upper end of the side member 231 defines the thickness of the side member 231 in the direction XI inward toward the axis and in the direction XO outward from the axis. The corner of the upper end of the side member 231 in the direction XI inward toward the axis defines the inner edge of the side member 231. The corner of the upper end of the side member 231 in the direction XO outward from the axis defines the upper edge E1 of the main body 2A.

The side member 231 is provided with a transmission member location hole 231a, in which the transmission member 260 is located. The circumferential length of the transmission member location hole 231a is greater than the vertical length of the transmission member location hole 231a. The transmission member location hole 231a is formed in the inclined surface S of the side member 231. Circumferentially opposed ends of the transmission member location hole 231a are rounded.

The side member 231 is provided with a sensor hole 231b, through which air, which is sensed by the temperature and humidity sensor 245, passes. The sensor hole 231b may be circular. The sensor hole 231b is formed opposite the transmission member location hole 231a about the central axis X. A space in which the temperature and humidity sensor 245 is disposed is defined in the sensor hole 231b in the direction XI inward toward the axis.

The side member 231 is provided with a charging terminal recess 231c, through which a plug is inserted into the charging terminal 255. The end of the charging terminal 255 is held in the charging terminal recess 231c. The charging terminal recess 231c is formed in the lower part of the side member 231. The end of the charging terminal 255 is located in the charging terminal recess 231c such that the circumferentially opposed side surfaces and the upper surface of the end of the charging terminal 255 contact the side member 231 and the lower surface of the end of the charging terminal 255 contacts the bottom case 270. The charging terminal recess 231c may be formed in the insertion portion 202 of the main body 2A, which is not exposed when the main body 2A is coupled to the container 2B.

The attachment-detachment groove 231d is formed in the outer circumference of the side member 231. The attachment-detachment groove 231d may extend in the circumferential direction. The attachment-detachment groove 231d may be interrupted by the charging terminal recess 231c.

The side member 231 is provided with a button hole 231d, through which an inner button may be pushed. An external object may be inserted through the button hole 231d to push an inner button, such as a reset button 252. The button hole 231d may be formed in the surface that defines the attachment-detachment groove 231d such that the button hole 231d is not easily visible. The button hole 231d may be formed in the insertion portion 202 of the main body 2A, which is not exposed when the main body 2A is coupled to the container 2B. A space in which the reset button 252 is disposed is defined in the button hole 231d in the direction XI inward toward the axis.

The side member 231 is provided with a positioning protrusion 232. The positioning protrusion 232 may be engaged into the switch panel recess 210a. The positioning protrusion 232 may be engaged into the support frame recess 221a. The positioning protrusion 232 protrudes from the inner surface of the side member 231.

The positioning protrusion 232 extends vertically along the inner surface of the side member 231. In this case, the upper part of the positioning protrusion 232 is located in the switch panel recess 210a, and the lower part of the positioning protrusion 232 is located in the support frame recess 221a.

The side member 231 is provided with support frame-coupling portions 2331, which are coupled to the support frame 221. The support frame-coupling portions 2331 may be hook-shaped or dome-shaped. The support frame-coupling portions 2331 may be arranged along the circumference of the side member 231 at intervals. The support frame-coupling portions 2331 are formed on the inner surface of the side member 231. The support frame-coupling portions 2331 are formed on the upper part of the side member 231. The support frame-coupling portions 2331 may be hooks protruding from the inner surface of the side member 231 in the direction XI inward toward the axis. Each of the hooks 2331 may be formed in a shape having a circumferential length greater than a vertical length. The hooks 2331 are inserted into the coupling recesses 224a of the support frame 221.

The side case 230 includes holding ribs 236 for guiding the support frame 221 such that the support frame 221 is located in the side case 230. Holding recesses 236c are formed in the holding ribs 236. The insertion ribs 223 of the support frame 221 are inserted into the holding recesses 236c. The holding ribs 236 are arranged along the circumference of the side case 230 at intervals. The holding ribs 236 are disposed inside the side case 230. The holding ribs 236 protrude upward from the upper surface of a main rib 235, a description of which will follow, and extend in the direction XI inward toward the axis and the direction XO outward from the axis.

Each of the holding ribs 236 may include a first holding rib 236a and a second holding rib 236b, which are separated from each other. A gap between the first holding rib 236a and the second holding rib 236b defines a holding recess 236c. One end of the first holding rib 236a may be connected to the inner surface of the side member 231. One end of the second holding rib 236b may be connected to a connection rib 239, a description of which will follow.

The side member 231 is provided with a bottom case-coupling portion 2332, which is coupled to the bottom case 270. The bottom case-coupling portion 2332 may be hook-shaped or dome-shaped. A plurality of bottom case-coupling portions 2332 may be arranged along the circumference of the side member 231 at intervals. The bottom case-coupling portions 2332 are formed on the inner surface of the side member 231. The bottom case-coupling portions 2332 are formed on the lower part of the side member 231. The bottom case-coupling portions 2332 may be hooks protruding from the inner surface of the side member 231 in the direction XI inward toward the axis. Each of the hooks 2332 may be formed in a shape having a circumferential length greater than a vertical length. The hooks 2332 are inserted into coupling recesses 273a formed in the bottom case 270.

The side case 230 includes a lower guide 237 for guiding the disposition of the lower PCB 250. The lower guide 237 may be a bar type member protruding downward. Alternatively, the lower guide 237 may be a rib type member protruding downward. The lower guide 237 extends upward and downward. The lower end of the lower guide 237 is a free end. The upper end of the lower guide 237 may be connected to the lower surface of the main rib 235. The lower guide 237 is disposed at the inner edge of the side case 230. A plurality of lower guides 237 may be arranged along the circumference of the main rib 235 at intervals. Referring to FIG. 35, the lower PCB 250 is provided with guide recesses 250a, into which the lower guides 237 are engaged. When the lower PCB 250 is placed such that the lower guides 237 are inserted into the guide recesses 250a, the lower PCB 250 may be placed at a predetermined position.

The side case 230 includes a PCB disposition member 238, which is horizontally formed in the side member 231. When viewed from above, the PCB disposition member 238 is disposed at the central part of the side case 230.

The side case 230 includes a PCB disposition member connection portion 234 for connecting the PCB disposition member 238 to the side member 231. The PCB disposition member connection portion 234 is supported by the side member 231, and the PCB disposition member 238 is supported by the PCB disposition member connection portion 234. The PCB disposition member connection portion 234 is disposed at the edge of the PCB disposition member 238. In some implementations, the PCB disposition member connection portion 234 is disposed between the PCB disposition member 238 and the side member 231.

The PCB disposition member connection portion 234 includes a main rib 235 protruding from the inner surface of the side member 231 in the direction XI inward toward the axis and extending along the circumference of the side member 231. The main rib 235 has a predetermined vertical thickness. The main rib 235 may be ring-shaped. The main rib 235 provides a support point for supporting the PCB disposition member 238.

The PCB disposition member connection portion 234 includes a connection rib 239 protruding from the main rib 235 so as to be connected to the PCB disposition member 238. The connection rib 239 may protrude downward from the lower surface of the main rib 235. In this implementation, the connection rib 239 protrudes upward from the upper surface of the main rib 235. The lower end of the connection rib 239 may be connected to the end of the main rib 235 in the direction XI inward toward the axis. The upper end of the connection rib 239 may be connected to the end of the PCB disposition member 238 in the direction XO outward from the axis.

The connection rib 239 may extend in the circumferential direction. A plurality of connection ribs 239 may be arranged in the circumferential direction at intervals. Holes 239a may be defined between the respective connection ribs 239. The holes 239a are defined by the connection ribs 239 at opposite sides of the respective holes 239a in the circumferential direction and are defined by the PCB disposition member 238 and the main rib 235 in the vertical direction.

The PCB disposition member 238 is a plate member that is disposed horizontally. When viewed from above, the PCB disposition member 238 may be generally circular. The PCB disposition member 238 may be disposed horizontally.

The PCB disposition member 238 is provided with a vertical through hole 238a. Referring to FIGS. 29 to 31, the PCB disposition member 238 is provided with a PCB through hole 238a1. The PCB may be disposed so as to extend through the PCB through hole 238a1. Referring to FIGS. 32 and 34, the PCB disposition member 238 is provided with an element through hole 238a2. A predetermined element or part may be disposed so as to extend through the element through hole 238a2. In this implementation, the upper PCB 240 extends through the PCB through hole 238a1, and a connector 2547 of the power supply device 254 extends through the element through hole 238a2. The PCB through hole 238a1 and the element through hole 238a2 may be formed separately. In this implementation, the PCB through hole 238a1 and the element through hole 238a2 are integrally formed into a single through hole 238a.

Referring to FIGS. 25 to 31, the PCB disposition member 238 includes PCB contact portions 2381 and 2385, which define a PCB location surface. For example, the upper surface of the PCB disposition member 238 includes an upper contact portion 2381, which contacts the lower surface of the upper PCB 240. The lower surface of the PCB disposition member 238 includes a lower contact portion 2385, which contacts the upper surface of the upper PCB 240. The upper PCB 240 may extend through the through hole 238a so as to be disposed at both the upper side and the lower side of the PCB disposition member 238. In this case, the upper PCB 240 may contact both the upper contact portion 2381 and the lower contact portion 2385.

The upper contact portion 2381 of the PCB disposition member 238 is disposed higher than the other portions. The upper contact portion 2381 may extend in the forward and rearward direction. The front end of the upper contact portion 2381 may extend to the front end of the PCB disposition member 238, and the rear end of the upper contact portion 2381 may extend to the rear end of the PCB disposition member 238.

The PCB disposition member 238 includes fixing portions 2382 and 2383 for fixing the PCB to the PCB disposition member 238. For example, the PCB disposition member 238 may include an upper fixing protrusion 2382 protruding upward and a lower fixing protrusion 2386 protruding downward. The upper fixing protrusion 2382 may be disposed at the upper contact portion 2381, and the lower fixing protrusion 2386 may be disposed at the lower contact portion 2385. The upper fixing protrusion 2382 may be inserted into a fixing hole 240a formed in the upper PCB 240, and the lower fixing protrusion 2386 may be inserted into a fixing hole 240b formed in the upper PCB 240.

The inner space of the side case 230 may be defined by the PCB disposition member 238. The inner space of the side case 230 may be partitioned into an upper inner space defined at the upper side of the PCB disposition member 238 and a lower inner space defined at the lower side of the PCB disposition member 238. The upper inner space of the side case 230 extends along the inner circumference of the side member 231 so as to have a larger vertical depth. The sensor module, including the temperature and humidity sensor 245 and the proximity sensor 244, may be disposed in the upper inner space of the side case 230. The remote control module 25 may be disposed in the upper inner space of the side case 230.

The main body 2A includes PCBs 240 and 250. The PCBs 240 and 250 are disposed in the main body 2A. Two or more PCBs 240 and 250 may be disposed so as to realize a layered structure. In this implementation, the upper PCB 240 is disposed above the lower PCB 250.

Referring to FIGS. 29 to 31, the upper PCB 240 includes an upper plate portion 2401 contacting the upper contact portion 2381, a lower plate portion 2405 contacting the lower contact portion 2385, and a connection plate portion 2403 for connecting the upper plate portion 2401 and the lower plate portion 2405 to each other. The upper plate portion 2401 is disposed in the upper inner space of the side case 230, and the lower plate portion 2405 is disposed in the lower inner space of the side case 230. The connection plate portion 2403 vertically extends through the through hole 238a.

When viewed from above, the upper plate portion 2401 extends to the main rib 235 in the forward and rearward direction. The upper plate portion 2401 is provided with a fixing hole 240a. The upper fixing protrusion 2382 is inserted into the fixing hole 240a such that the upper plate portion 2401 is fixed.

The front part of the upper plate portion 2401 may be bent downward along the front corner of the PCB disposition member 238. The rear part of the upper plate portion 2401 may be bent downward along the rear corner of the PCB disposition member 238. The control signal light-emitting unit 243 or the proximity sensor 244 may be disposed at the forward-facing surface of the bent front part of the upper plate portion 2401. The temperature and humidity sensor 245 may be disposed at the rearward-facing surface of the bent rear part of the upper plate portion 2401.

The control signal light-emitting unit 243 is disposed at the front part of the upper plate portion 2401. The control signal light-emitting unit 243 may include an LED for emitting infrared light to the front. The transmission member 260 is disposed in front of the control signal light-emitting unit 243. The control signal light-emitting unit 243 is located at the upper side of the main rib 235 on the front side of the side case. The control signal light-emitting unit 243 is electrically connected to the upper PCB 240.

The proximity sensor 244 is disposed at the front part of the upper plate portion 2401. The proximity sensor 244 includes a proximity signal light-emitting unit 2441 for emitting infrared light to the front and a proximity signal light-receiving unit 2442 for receiving a reflected component of the emitted infrared light. The transmission member 260 is disposed in front of the proximity sensor 244. The proximity sensor 244 is located at the upper side of the main rib 235 on the front side of the side case 230. The proximity sensor 244 is electrically connected to the upper PCB 240.

The control signal light-emitting unit 243 and the proximity sensor 244 are disposed at the left and right sides of the front part of the side case 230. Infrared light emitted by the control signal light-emitting unit 243 and infrared light emitted by the proximity sensor 244 may pass through the transmission member 260. The control signal light-emitting unit 243 and the proximity sensor 244 are disposed at the rear of the transmission member 260.

The temperature and humidity sensor 245 may be disposed at the rear part of the upper plate portion 2401. The temperature and humidity sensor 245 senses the temperature and/or humidity of air passing through the sensor hole 231b. The sensor hole 231b is disposed at the rear of the temperature and humidity sensor 245. The proximity sensor 244 is located at the upper side of the main rib 235 on the rear side of the side case 230. The proximity sensor 244 is electrically connected to the upper PCB 240.

The main switch 242 may be disposed at the central part of the upper plate portion 2401. The main switch 242 may be pushed downward. The push protrusion 228b is disposed at the upper side of the main switch 242 so as to be space apart from the main switch 242 by a predetermined distance.

The upper plate portion 2401 is formed in a shape that can be connected to all of the control signal light-emitting unit 243, the proximity sensor 244, the temperature and humidity sensor 245, and the main switch 242.

The display LED 249 may be disposed at the upper plate portion 2401. The display LED 249 may include a plurality of LEDs having different colors. The display LED 249 may inform a user of charging/discharging of the battery 2541 or whether the accessory has been paired with the network. The region in which the display LED 249 is disposed is shown in FIG. 29. The display LED 249 is disposed at the lower side of the light transmission unit 215 of the switch panel 210. Light emitted by the display LED 249 may pass through the light transmission unit 215. In this implementation, the display LED 249 is disposed between the main switch 242 and the temperature and humidity sensor 245.

The upper plate portion 2401 of the PCB is bent downward and extends to define the upper end of the connection plate portion 2403. The lower plate portion 2405 of the PCB is bent upward and extends to define the lower end of the connection plate portion 2403. The connection plate portion 2403 is disposed at the right side of the main switch 242. The connection plate portion 2403 electrically connects the upper plate portion 2401 and the lower plate portion 2405 to each other.

The lower plate portion 2405 extends from the lower end of the connection plate portion 2403 in the direction XO outward from the axis. When viewed from below, one end of the lower plate portion 2405 extends to the main rib 235. The lower plate portion 2405 is provided with a fixing hole 240b. The lower fixing protrusion 2386 is inserted into the fixing hole 240b such that the lower plate portion 2405 is fixed.

A lower PCB connection terminal 248 is disposed at the lower plate portion 2405. The lower PCB connection terminal 248 provides an electrical connection point with the lower PCB 250. The lower PCB connection terminal 248 is connected to an upper PCB connection terminal 258 disposed on the lower PCB 250. The region in which the lower PCB connection terminal 248 is disposed is shown in FIG. 30. The lower PCB connection terminal 248 is disposed at the lower surface of the lower plate portion 2405.

Referring to FIGS. 32 to 35, the lower PCB 250 includes a main board 2501. The main board 2501 is a plate member that is disposed horizontally. The guide recesses 250a are formed in the main board 2501. The guide recesses 250a are arranged along the circumference of the main board 2501 at intervals. The guide recesses 250a are formed from the edge of the main board 2501 toward the central axis X.

The upper PCB connection terminal 258 is disposed at the main board 2501. The upper PCB connection terminal 258 is disposed at the upper surface of the main board 2501. The upper PCB connection terminal 258 provides an electrical connection point with the upper PCB 240. The upper PCB connection terminal 258 is connected to the lower PCB connection terminal 248, which is disposed on the upper PCB 240. The region in which the upper PCB connection terminal 258 is disposed is shown in FIG. 32.

The communication module 26 is disposed at the main board 2501. The communication module 26 may be disposed at the upper surface of the main board 2501. The communication module 26 includes an antenna 253 for transmitting and receiving a signal over the network. Referring to FIG. 32, the antenna 253 may be patterned on the main board 2501. In another example, an additional antenna 253 may be disposed at a place other than the main board 2501.

The acceleration sensor 257 may be disposed at the main board 2501. The acceleration sensor 257 may be disposed at the upper surface of the main board 2501. The region in which the acceleration sensor 257 is disposed is shown in FIG. 32.

The lower PCB 250 includes an element protection cover 259 for protecting elements disposed on the main board 2501. The element protection cover 259 may be disposed at the upper surface of the main board 2501. The element protection cover 259 covers the elements disposed on the main board 2501.

The power supply device 254 may be disposed at the main board 2501. The power supply device 254 includes a rechargeable battery 2541 for supplying power. The power supply device 254 may include an abnormal current interruption unit 2542 for interrupting power when abnormal current is supplied from the battery 2541. The power supply device 254 may include a battery connection line 2543 for electrically connecting the battery 2541 to the abnormal current interruption unit 2542. The power supply device 254 includes a board-side connector 2548 disposed at the main board 2501 for supplying current from the battery 2541 to the main board 2501. The power supply device 254 includes a conductor-side connector 2547 connected to the board-side connector 2548. One of the board-side connector 2548 and the conductor-side connector 2547 is a socket, and the other of the board-side connector 2548 and the conductor-side connector 2547 is a plug. The power supply device 254 includes a connector connection line 2545 for electrically connecting the conductor-side connector 2547 to the abnormal current interruption unit 2542.

The power supply device 254 includes a replacement module 254a that is replaceable when needed. The replacement module 254a includes the battery 2541, the abnormal current interruption unit 2542, the battery connection line 2543, the conductor-side connector 2547, and the connector connection line 2545. The power supply device 254 includes the replacement module 254a and the board-side connector 2548.

The battery 2541 is disposed at the lower surface of the main board 2501. When viewed from below, the battery 2541 is circular, and is disposed such that the center of the battery 2541 is located at a point spaced apart from the central axis X. The battery 2541 may be electrically connected to the charging terminal 255.

The abnormal current interruption unit 2542 is disposed at the lower surface of the main board 2501. The abnormal current interruption unit 2542 may be a plate member that is perpendicular to the main board 2501.

The board-side connector 2548 is disposed at the upper surface of the main board 2501. The conductor-side connector 2547 is disposed at the upper side of the main board 2501. The connector connection line 2545 connects the abnormal current interruption unit 2542, which is disposed at the lower surface of the main board 2501, and the conductor-side connector 2547, which is disposed at the upper side of the main board 2501, to each other. A conductor through hole 250b is formed in the main board 2501, and the connector connection line 2545 extends through the conductor through hole 250b.

Referring to FIG. 34, the board-side connector 2548 and the conductor-side connector 2547 extend through the element through hole 238a2.

The charging terminal 255 is disposed at the lower surface of the main board 2501. The charging terminal 255 is located in the charging terminal recess 231c. When discharged, the battery 2541 may be charged through the charging terminal 255.

The reset button 252 is disposed at the lower surface of the main board 2501. The reset button 252 is disposed in the button hole 231d in the direction XI inward toward the axis. In the case in which the lower guides 237 are inserted into the guide recesses 250a, the disposition between the reset button 252 and the sensor hole 231b and the disposition between the upper PCB connection terminal 258 and the lower PCB connection terminal 248 are achieved as desired.

Referring to FIGS. 36 to 38, the transmission member 260 is located in the transmission member location hole 231a of the side case 230. The transmission member 260 includes a front window 261 exposed to the outside, a catching portion 263 for enabling the transmission member 260 to be caught by the side member 231, and a disposition guide 264 for guiding the disposition of elements at the rear of the transmission member 260.

The side member 231 includes an inclined surface S having different distances from the central axis X in the vertical direction. The inclined surface S forms an acute angle with the central axis X in an imaginary vertical section including the central axis X. In this implementation, the side member 231 includes an inclined surface S that is gradually distant from the central axis X in the upward direction.

The transmission member location hole 231a is formed in the inclined surface S of the side member 231. When the window 261 is viewed from the front, the edge of the window 261 protrudes so as to correspond to the inclined surface S of the side member 231. Referring to FIG. 36, in an arbitrary horizontal section, the extent to which the surface of the edge of the window 261 protrudes in the direction XO outward from the axis is substantially proportional to the extent to which the surface of the side member adjacent to the window 261 protrudes in the direction XO outward from the axis. The protruding surface of the edge of the window 261 may have substantially the same inclination as the inclined surface S.

When the window 261 is viewed from the front, the central part of the window 261 defines a surface 261a formed so as to be parallel to the central axis X in an imaginary vertical section including the central axis X.

In the case in which the inclined surface S has an inclination gradually distant from the central axis X in the upward direction, the window 261 includes a vertical portion 261a formed at the central part and the lower part of the window 261. The vertical portion 261a defines a surface 261a formed so as to be parallel to the central axis X in an imaginary vertical section including the central axis X. The vertical portion 261a is perpendicular to an imaginary horizontal plane (a plane perpendicular to the central axis X).

The lower end of the vertical portion 261a defines the lower end of the window 261. The lower end of the vertical portion 261a is connected to the side member 231 at the lower side of the transmission member location hole 231a. In an imaginary vertical section, the surface of the vertical portion 261a is disposed on substantially the same vertical line as the surface of the side member 231 at the lower side of the transmission member location hole 231a. When infrared light is emitted from the rear of the vertical portion 261a to the front of the vertical portion 261a, therefore, the infrared light travels straight, without being refracted.

The side member 231 may extend in the circumferential direction. The inclined surface S may be curved in the circumferential direction. The vertical portion 261a may be curved in the circumferential direction. The circumferential curvature of the vertical portion 261a is substantially the same as the circumferential curvature of the side member 231 at the lower side of the transmission member location hole 231a.

The window 261 includes circumferential portions 261b and 261c protruding from the upper edge and the left and right edges of the window 261 in the direction XO outward from the axis. The circumferential portions 261b and 261c may be formed along the inclined surface S of the side member 231 so as to be gradually distant from the central axis X in the upward direction. The circumferential portions 261b and 261c may be formed in a convex shape.

The circumferential portions 261b and 261c include an upper circumferential portion 261b protruding forward from the upper part of the window 261 and side circumferential portions 261c protruding forward from the left and right parts of the window 261. The side circumferential portions 261c are formed so as to gradually protrude in the upward direction.

When the window 261 is viewed from the front, the region defined by the circumferential portions 261b and 261c and the vertical portion 261a is concave.

In some implementations, the catching portion 263 may protrude from the rear edge of the window 261 upward, downward, leftward, or rightward. The catching portion 263 is formed at the rear side of the transmission member location hole 231a. The catching portion 263 extends upward, downward, leftward, or rightward such that the transmission member 260 cannot escape from the transmission member location hole 231a. The catching portion 263 contacts the inner wall of the side member 231 such that the transmission member 260 cannot escape from the transmission member location hole 231a.

The catching portion 263 may protrude upward or downward. In this implementation, two catching portions 263 protrude from circumferentially opposed sides of the window 261. The catching portions 263 may include a first catching portion 263a disposed at one side of the window 261 and a second catching portion 263b disposed at the other side of the window 261. The catching portions 263 are caught by the side member 231 adjacent to the transmission member location hole 231a.

The main body 2A includes an optical signal light-emitting unit for emitting a predetermined optical signal in a specific direction. The optical signal light-emitting unit may be constituted by the proximity sensor 244 and/or the control signal light-emitting unit 243. That is, the optical signal light-emitting unit includes at least one of the proximity sensor 244 and the control signal light-emitting unit 243. In this implementation, the optical signal light-emitting unit includes both the proximity sensor 244 and the control signal light-emitting unit 243.

The optical signal light-emitting unit is disposed at the rear of the window 261. The optical signal light-emitting unit is disposed such that the optical signal passes perpendicularly through the central part of the window 261. The optical signal light-emitting unit is disposed such that the optical signal passes perpendicularly through the vertical portion 261a.

The disposition guide 264 protrudes rearward from the rear surface of the window 261. The disposition guide 264 may include a rib that extends vertically. The disposition guide 264 may partition a space defined at the rear of the window 261 into left and right spaces. A plurality of disposition guides 264 may be arranged side by side. The disposition guides 264 may include a disposition guide 264a for defining the left space 260a of the window 261. The disposition guides 264 may include a disposition guide 264b for defining the right space 260b of the window 261.

The disposition guide 264b guides the position of the optical signal light-emitting unit relative to the transmission member 260. The disposition guide 264b guides the position of the optical signal light-emitting unit relative to the window 261. The optical signal light-emitting units 243 and 244 are disposed respectively in the spaces 260a and 260b defined at the rear of the window 261, which are partitioned by the disposition guides 264.

The control signal light-emitting unit 243 and the proximity sensor 244 are disposed respectively in the spaces 260a and 260b defined at the rear of the window 261, which are partitioned by the disposition guide 264b. In this implementation, the control signal light-emitting unit 243 is disposed in the left space 260a, and the proximity sensor 244 is disposed in the right space 260b. The disposition guide 264b guides the positions of the proximity sensor 244 and the control signal light-emitting unit 243 relative to the window 261. As a result, optical signals emitted by the proximity sensor 244 and the control signal light-emitting unit 243 may pass through the window 261 at predetermined angles and may reach predetermined positions. That is, the disposition guide 264b guides the relative disposition of the transmission member 260, the proximity sensor 244, and the control signal light-emitting unit 243 such that the optical signals pass perpendicularly through the vertical portions 261a.

The optical signal light-emitting units disposed in the spaces 260a and 260b defined at the rear of the window 261 push the rear surface of the window 261 forward such that the catching portions 263 come into tight contact with the inner surface of the side member 231. As a result, the transmission member 260 is fixed to the side member 231.

In some implementations, the optical signal light-emitting units may include module cases 2433 and 2443 for pushing the rear surface of the window 261. The module cases 2433 and 2443 define the front surfaces of the optical signal light-emitting units. The front surfaces of the module cases 2433 and 2443 contact the rear surface of the window 261.

The module cases 2433 and 2443 include a control module case 2433, in which the control signal light-emitting unit 243 is disposed, and a proximity module case 2443, in which the proximity signal light-emitting unit 2441 is disposed. The proximity signal light-receiving unit 2442 may be disposed in the proximity module case 2443.

The control module case 2433 may be provided in the front surface thereof with a recess, which is depressed rearward. The control signal light-emitting unit 243 may be disposed in the recess and may emit an optical signal forward. The proximity module case 2443 may be provided in the front surface thereof with a recess, which is depressed rearward. The proximity signal light-emitting unit 2441 may be disposed in the recess and may emit an optical signal forward. In some implementations, the proximity module case 2443 may be provided in the front surface thereof with an additional recess, which is depressed rearward. The proximity signal light-receiving unit 2442 may be disposed in the additional recess and may receive the optical signal returning from the front.

The front surface of the control module case 2433 and the front surface of the proximity module case 2443 may contact the rear surface of the window 261 to push the window 261 forward. The disposition of the control module case 2433 and the proximity module case 2443 is guided by the disposition guides 264.

Referring to FIG. 36, an optical signal emitted by the optical signal light-emitting unit forward from the rear of the transmission member 260 (in the direction XO outward from the axis) passes perpendicularly through the vertical portion 261a and travels straight without being refracted. An arrow IRc shown in FIG. 36 indicates an optical signal that travels straight without being refracted.

If the central part of the window 261, the part through which the optical signal passes, is disposed so as to be parallel to the inclined surface S, the optical signal passing through the window 261 is refracted downward. An arrow IRd shown in FIG. 36 indicates an optical signal that is refracted.

The optical signal emitted by the optical signal light-emitting unit may travel straight a greater distance through the vertical portion 261 of the present disclosure.

Referring to FIGS. 39 to 42, the bottom case 270 defines the lower surface of the main body 2A. The bottom case 270 may define the lower part of the side surface of the main body 2A. A space is defined in the bottom case 270 in the state in which the bottom case 270 is coupled to the side case 230.

The lower PCB 250 is disposed in the bottom case 270. The lower PCB 250 is coupled to the upper side of the bottom case 270.

The bottom case 270 is provided with a space 270b in which the battery 2541 is disposed. The bottom case 270 is provided with a space 270c in which the charging terminal is disposed. The bottom case 270 is provided with a recess 270d, in which the reset button is held.

The bottom case 270 includes an outer member 271 defining the external appearance thereof. The outer member 271 includes a lower surface. The outer member 271 includes a circumferential surface formed around the circumference thereof.

The direction-setting recess 270a is formed in the outer member 271. The direction-setting recess 270a is formed in the lower side of the outer member 271. When viewed from below, the direction-setting recess 270a is formed in the edge of the outer member 271. The direction-setting recess 270a is defined by the depression 2711 of the outer member 271.

The bottom case 270 includes a side case-coupling portion 273, which is coupled to the side case 230. A plurality of side case-coupling portions 273 may be arranged along the circumference of the bottom case 270 at intervals. The side case-coupling portions 273 protrude upward from the upper end of the outer member 271.

In this implementation, the side case-coupling portions 273 are provided with coupling recesses 273a. Each of the coupling recesses 273a may be depressed in the direction XI inward toward the axis. The circumferential length of each of the coupling recesses 273a may be greater than the vertical length of each of the coupling recesses 273a. The coupling recesses 273a may be arranged along the circumference of the support frame 221 at intervals.

The side case-coupling portions 273 are coupled to the bottom case-coupling portions 2332 of the side case 230. One selected from each of the side case-coupling portions 273 and each of the bottom case-coupling portions 2332 is provided with a coupling recess, and the other selected from each of the side case-coupling portions 273 and each of the bottom case-coupling portions 2332 is provided with a protrusion, which is engaged into the coupling recess. In this implementation, the side case-coupling portions 273 are provided with coupling recesses 273a, and the bottom case-coupling portions 2332 are provided with protrusions, which are engaged into the coupling recess 273a.

The upper end of the circumferential surface of the outer member 271 contacts the lower end of the side case 230. The bottom case 270 includes an edge insertion rib 272 protruding upward from the circumferential surface of the outer member 271 and extending along the circumference of the outer member 271. The edge insertion rib 272 extends along the upper edge of the outer member 271. The edge insertion rib 272 may be ring-shaped. The edge insertion rib 272 is formed at a point spaced apart from the edge of the upper end of the outer member 271 by a predetermined distance (a distance corresponding to the thickness of the lower end of the side case 230) toward the central axis X. The side surface of the edge insertion rib 272 in the direction XO outward from the axis contacts the inner surface of the side case 230.

The side case-coupling portions 273 protrude upward from the edge insertion rib 272. The reset button disposition recess 270d is formed in the edge insertion rib 272.

The bottom case 270 includes a charging terminal guide rib 277 for guiding the disposition of the charging terminal 255. The charging terminal guide rib 277 includes a bottom guide 277a for guiding the disposition of the lower surface of the charging terminal 255, an end guide 277b for guiding the end of the charging terminal 255 in the direction XO outward from the axis, and side guides 277c for guiding circumferentially opposed surfaces of the charging terminal 255.

The charging terminal disposition space 270c is provided at the upper side of the bottom guide 277a and the end guide 277b. The charging terminal disposition space 270c is provided between the two side guides 277c.

The bottom guide 277a includes a rib protruding upward from the outer member 271. The bottom guide 277a includes a rib extending in the leftward and rightward direction. The upper end of the bottom guide 277a supports the lower surface of the charging terminal 255.

The end guide 277b is formed at the upper end of the outer member 271. The edge insertion rib 272 is not disposed at the position at which the end guide 277b is formed. The end guide 277b may be formed so as to be depressed such that the end of the charging terminal 255 is engaged into the upper end of the outer member 271.

In some implementations, the two side guides 277c may be disposed at the left and right side surfaces of the charging terminal 255. The side guides 277c include ribs protruding upward from the outer member 271. The side guides 277c extend along the side surfaces of the charging terminal 255. The height of the upper end of each of the side guides 277c is substantially equal to the height of the upper end of the edge insertion rib 272.

The bottom case 270 includes a battery guide rib 275 for guiding the disposition of the battery 2541. The battery guide rib 275 contacts the side surface of the battery 2541. The battery guide rib 275 extends along the side surface of the battery 2541.

The lower surface of the battery 2541 may be supported by the bottom surface of the outer member 271. When viewed from above, the battery 2541 is circular, and is disposed such that the center of the battery 2541 is located at a point spaced apart from the central axis X. The battery 2541 is eccentrically disposed in the bottom case 270. The battery 2541 has a diameter less than the diameter of the bottom case 270. The battery 2541 may be disposed such that the side surface of the battery 2541 in the direction XO outward from the axis contacts the inner surface of the bottom case 270.

The battery guide rib 275 is formed so as to surround the side surface of the battery 2541 in the direction opposite to the direction in which the battery 2541 is eccentric.

The battery guide rib 275 includes ribs 275a and 275c, formed at positions at which the ribs 275a and 275c do not interfere with the charging terminal 255, the reset button 252, and the abnormal current interruption unit 2542 such that the ribs 275a and 275c protrude to predetermined heights. The ribs 275a and 275c include a rib 275a extending from one side of the charging terminal 255 and a rib 275c extending from the other side of the charging terminal 255.

The battery guide rib 275 includes a rib 275b protruding to a height less than the heights of the ribs 275a and 275c so as to prevent interference with the charging terminal 255. One side surface of the rib 275b guides the side surface of the battery 2541, and the charging terminal 255 is disposed at the upper side of the rib 275b.

The battery guide rib 275 includes a rib 275d protruding to a height less than the heights of the ribs 275a and 275c so as to prevent interference with the abnormal current interruption unit 2542. One side surface of the rib 275d guides the side surface of the battery 2541, and the other components of the power supply device 254 excluding the battery 2541 may be disposed at the upper side of the rib 275d. A cylindrical battery disposition space 270b is defined between the concave surface of the battery guide rib 275 and the inner surface of the outer member 271.

Referring to FIGS. 43 to 47, the container 2B includes a container body 280, which has therein an external coupling portion 283 and at least a portion of the inner portion 206, and a container side member 290 defining the outer portion 205 with respect to the container body 280 in the direction XO outward from the axis. The container 2B includes a container body 280, which defines a bottom portion 281a and an inclined portion 281b, and a container side member, which defines an outward surface 291.

The container 2B includes a main body-coupling portion 280a, formed by depressing the central part of the container 2B downward.

When viewed from above, the container body 280 is circular. The central part of the container body 280 is concave downward. The side surface of the container body 280 protrudes upward so as to have a predetermined height.

The container body 280 includes an inner surface 281, which contacts the main body 2A when the main body 2A is coupled to the container 2B. The inner surface 281 includes a bottom portion 281a, which is disposed at the central part thereof, and an inclined portion 281b, which defines an inclined surface formed from the edge of the bottom portion 281a to the upper end of the container body 280. The inclined portion 281b may be formed so as to be gradually inclined in the direction XO outward from the axis. The inclined portion 281b is generally formed so as to be concave.

The inclined portion 281b is formed in the circumferential direction. The inclined portion 281b extends in the circumferential direction.

The direction-setting protrusion 285 is formed on the inclined portion 281b. The direction-setting protrusion 285 may be formed on the bottom portion 281a.

The container body 280 includes a contact surface 282 configured to contact the container side member 290 in the direction XO radially outward from the central axis. The contact surface 282 contacts an inward surface 292. The contact surface 282 includes an inclined surface formed so as to become close to the central axis X in the upward direction.

The contact surface 282 is provided with a catching recess 280b, which is depressed in the direction XI inward toward the axis. The catching recess 280b may be formed in the lower part of the contact surface 282. A catching recess depressed in the direction XI radially inward toward the central axis may be formed in the lower part of the contact surface 282. The contact surface 282 may be provided with a catching recess 280b, which is depressed toward the inclined portion 281b in the direction XI inward toward the axis. The catching recess 280b may be provided in substantially the same horizontal plane as the inclined portion 281b.

The catching recess 280b may extend in the circumferential direction. The catching recess 280b may be hidden by the container side member 290. A coupling hook 295 formed at the container side member 290 is inserted into the catching recess 280b in order to couple the container body 280 to the container side member 290.

If the catching recess 280b is not provided, the thickness between the lower part of the inclined portion 281b and the lower part of the contact surface 282 may be greater than the thicknesses of the other portions due to the inclination of the inclined portion 281b and the inclination of the contact surface 282. In the case in which the catching recess 280b is provided, the thickness of the lower part of the container body 280 may be reduced, which is advantageous in injection-molding.

A direction-setting protrusion space 280d, which is concave toward the direction-setting protrusion 285, is defined at the lower side of the contact surface 282. The direction-setting protrusion space 280d may be connected to the catching recess 280b. The direction-setting protrusion space 280d is hidden by the container side member 290.

Referring to FIGS. 46C and 46D, an example container 2B' according to a modification may include only a container body 280' without the container side member 290. The following description will be given based on the difference between the modification and this implementation. In some examples, an example catching recess 280b' is exposed to the outside. In this case, an attachment-detachment protrusion 298' protrudes from a container body 280'. The container body 280' is provided at the upper side thereof with a main body-coupling portion 280a', to which the main body 2A is detachably attached. The container body 280' includes an inner portion 281', which is depressed downward to define the main body-coupling portion 280a'. The inner portion 281' includes a bottom portion 281a, which defines the bottom thereof, and an inclined portion 281b', which is gradually inclined upward from the bottom portion 281a in the direction XO outward from the axis. The container body 280' includes outer portions 291' and 283', which are exposed to the outside when the main body 2A is coupled to the container body 280'. The outer portions 291' and 283' include an outward surface 291' in the direction XO outward from the axis. The outward surface 291' is provided with a catching recess 280b', which is depressed toward the inclined portion 281b' in the direction XI inward toward the axis. The outward surface 291' defines an inclined surface that is formed so as to become close to the central axis X in the upward direction. The catching recess 280b', which is depressed in the direction XI inward toward the axis, is formed in the outer part of the outward surface 291'. The remainder of the structure related to the modification is obvious from the structure of the container body 280, and therefore a detailed description thereof will be omitted.

The contact surface 282 is provided with a guide recess 280c for guiding the insertion of the container body 280 into a central opening 290c formed in the container side member 290. The guide recess 280c is formed in the contact surface 292 so as to be concave in the direction XI inward toward the axis. The guide recess 280c extends along the inclined surface of the contact surface 282. The guide recess 280c extends vertically. The depth of the guide recess 280c may be gradually increased from the upper side to the lower side. The guide recess 280c is formed in the upper side of the catching recess 280b. The lower end of the guide recess 280c may be connected to the catching recess 280b.

A guide protrusion 296 formed on the container side member 290 may be inserted into the guide recess 280c to limit the vertical movement of the container side member 290 for assembly. The guide protrusion 296 may be inserted into the guide recess 280c from above so as to slide downward along the guide recess 280c.

The container body 280 includes the external coupling portion 283, which is located at the lower surface of the container body 280. When the container body 280 is viewed from below, the external coupling portion 283 is disposed at the central part of the container body 280. The external coupling portion 283 may be circular.

The edge of the lower surface of the container body 280 defines an edge portion 283a inclined relative to the horizontal plane. The edge portion 283a includes an inclined surface, the inclination of which gradually increases in the direction XO outward from the axis. The edge portion 283a is ring-shaped. The edge portion 283a is connected to the external coupling portion 283 in the direction XI inward toward the axis and is connected to the lower end of the container side member 290 in the direction XO outward from the axis.

The container 2B is made of a material that can be injection-molded. For example, the container 2B may be made of synthetic resin. The container body 280 is made of a material that can be injection-molded. The container side member 290 is also made of a material that can be injection-molded.

Referring to FIG. 47, the container body 280 is an example injection-molded using an injection-molding machine 300 (mold). The container body 280 is injection-molded in the state in which the container body 280 is overturned, for example, the lower part of the container body 280 faces upward, such that a gas discharge mark 283b is formed on the lower surface of the container body 280.

The injection-molding machine 300 includes a first injection-molding unit 301 for injection-molding the inner surface 281 of the container body 280, a second injection-molding unit 302 for injection-molding the contact surface 282 and the guide recess 280c of the container body 280, a third injection-molding unit 303 for injection-molding the catching recess 280b and the direction-setting protrusion space 280d of the container body 280, a fourth injection-molding unit 304 for injection-molding the edge of the lower surface of the container body 280, and a fifth injection-molding unit 305 for injection-molding the central part of the lower surface of the container body 280. In the above description, the terms "first injection-molding unit," "second injection-molding unit," "third injection-molding unit," "fourth injection-molding unit," and "fifth injection-molding unit" are used only to avoid confusion between designated objects, and do not indicate the sequence or importance of the injection-molding units.

The third injection-molding unit 303 includes a protrusion 304a for forming the catching recess 280b and a protrusion 304b for forming the direction-setting protrusion space 280d.

When the container body 280 is injection-molded, the gas discharge mark 283b is formed on the container body 280. The gas discharge mark 283b is formed on the lower surface of the container body 280. The gas discharge mark 283b is formed on the surface of the container body 280 on which the external coupling portion 283 is formed. The gas discharge mark 283b is formed on the container body 280 in a circular shape. The gas discharge mark 283b is formed on the container body 280 in a concentrically circular shape. The injection-molding machine 300 may have a gas discharge port in order to form the gas discharge mark 283b. For example, the fifth injection-molding unit 305 may have a gas discharge port in order to form the gas discharge mark 283b.

The container side member 290 is ring-shaped. The container side member 290 is provided in the center thereof with a central opening 290a. The container body 280 is inserted through the central opening 290a so as to be coupled to the container side member 290.

The container side member 290 includes a side surface of the outer portion 205 in the direction XO outward from the axis. The container side member 290 includes an outward surface 291, which defines the side surface of the container side member 290 in the direction XO outward from the axis, and an inward surface 292, which defines the side surface of the container side member 290 in the direction XI inward toward the axis. The container side member 290 is configured such that the thickness of the container side member 290 between the outward surface 291 and the inward surface 292 is substantially uniform. The inward surface may be oriented radially inward toward the central axis, and the outward surface may be oriented radially outward from the central axis.

The outward surface 291 includes an inclined surface formed so as to become close to the central axis X in the upward direction. The outward surface 291 extends in the circumferential direction. The outward surface 291 defines a portion of the outer portion 205 of the container.

The inward surface 292 includes an inclined surface formed so as to become close to the central axis X in the upward direction. The inward surface 292 extends in the circumferential direction. The contact surface 282 contacts the inward surface 292. The lower part of the inward surface 292 contacts the contact surface 282 of the container body 280. The inward surface 292 includes an inwardly exposed surface 292*a*, which is exposed to the upper side of the container body 280. The inwardly exposed surface 292*a* is disposed at the upper part of the inward surface 292. The inwardly exposed surface 292*a* defines the upper part of the inner portion 206 of the container. The inwardly exposed surface 292*a* is exposed to the upper side of the inclined portion 281*b*.

The inwardly exposed surface 292*a* is provided with a coupling hook 295, which is inserted into the catching recess 280*b*. A plurality of coupling hooks 295 may be arranged in the circumferential direction at intervals.

The coupling hook 295 protrudes from the inward surface 292. The circumferential length of the coupling hook 295 may be greater than the vertical length of the coupling hook 295. The lower surface of the coupling hook 295 may be gradually inclined upward in the direction XI inward toward the axis. The upper surface of the coupling hook 295 may be horizontally formed so as to be caught by the lower surface of the catching recess 280*b*.

The inward surface 292 is provided with a guide protrusion 296, which is inserted into the guide recess 280*c*. A plurality of guide protrusions 296 may be arranged in the circumferential direction at intervals. The guide protrusion 296 is formed so as to correspond to the guide recess 280*c*.

The guide protrusion 296 protrudes from the inward surface 292. The guide protrusion 296 protrudes in the direction XI inward toward the axis. The vertical length of the guide protrusion 296 may be greater than the circumferential length of the guide protrusion 296.

The attachment-detachment protrusion 298 is formed on the inwardly exposed surface 292*a*. The attachment-detachment protrusion 298 protrudes from the inwardly exposed surface 292*a* in the direction XI inward toward the axis.

The inclined portion 281*b* of the container 2B is a portion that slides when the main body 2A is coupled to the container 2B. The inclined portion 281*b* has an inclination formed so as to become close to the central axis X in the downward direction such that the lower corner 279 of the main body 2A can slide smoothly. As a result, it is possible for a user to smoothly attach and detach the main body 2A to and from the container 2B. In some implementations, it is possible to minimize wear of the lower corner 279 of the main body 2A.

The outward surface 291 of the container 2B has an inclination formed so as to become distant from the central axis X in the downward direction.

Since the outward surface 291 of the container 2B becomes gradually distant from the central axis X in the downward direction and the inclined portion 281*b* of the inner surface 281 becomes gradually close to the central axis X in the downward direction, the distance between the outward surface 291 and the inner surface 281 gradually increases in the downward direction. Consequently, the catching recess 280*b* is formed in the contact surface 282, which is hidden by the container side member 290, whereby it is possible to provide a recess, into which the coupling hook 295 can be inserted, while reducing injection defects, such as burrs, which may occur due to the increase of the injection thickness.

The structure and function of the main body 2A will be described in detail with reference to FIGS. 48 to 55B.

An upper edge E1 of the main body 2A, a lower edge E2 of the main body 2A, a lower edge E3 of the container 2B, and an upper edge E4 of the container 2B, descriptions of which will follow, may extend along the circumference of a predetermined figure. Here, "figure" means an imaginary planar figure disposed on a plane perpendicular to the central axis X. The figure may be a circle, an oval, a polygon, a chamfered polygon, etc. The figure may be an irregularly shaped figure. The figure may be a circle, an oval, or a chamfered polygon. The figure may be a circle, an oval, or a chamfered polygon even if a depression or a protrusion is formed at the circumference of the figure. In the above description, the terms "first figure," "second figure," "third figure," and "fourth figure" are used only to avoid confusion between designated objects, and do not indicate the sequence or importance of the figures.

Referring to FIGS. 48 and 49, on the assumption that a first figure is disposed perpendicular to the central axis X, the main body 2A includes an upper edge E1 extending along the circumference of the first figure. Referring to FIG. 48, the upper edge E1 may be disposed in an imaginary plane H1.

The first figure may be a circle having a predetermined diameter r1. On the assumption that an imaginary circle having a predetermined diameter r1 is disposed perpendicular to the central axis X, the main body 2A includes an upper edge E1 extending along the circumference of the imaginary circle having the diameter r1. Referring to FIG. 48, the upper edge E1 may be disposed in the imaginary plane H1.

The upper edge E1 may be circular or arc-shaped. In the case in which a recess or a protrusion is formed at the main body 2A on the circumference of the imaginary circle having the diameter r1, the recess or the protrusion is not included in the upper edge E1, and the upper edge E1 is arc-shaped. Even in the case in which the upper edge E1 is arc-shaped, the upper edge E1 may be approximately circular.

The side surface of the main body 2A in the direction XO outward from the axis is formed further inward in the direction XI inward toward the axis than one of the upper edge E1 and the lower edge E2. The side surface of the main body 2A is formed at a position closer to the central axis X than one of the upper edge E1 and the lower edge E2. In the following description, the side surface of the main body 2A is formed at a position closer to the central axis X than the upper edge E1. However, the present disclosure is not limited thereto. The structure in which the side surface of the main body 2A is formed at a position closer to the central axis X than the lower edge E2 is obvious from the structure in which the side surface of the main body 2A is formed at a position closer to the central axis X than the upper edge E1, and therefore a description thereof will be omitted.

The side surface of the main body 2A in the direction XO outward from the axis may be formed further inward in the direction XI inward toward the axis than the upper edge E1. The side surface of the main body 2A may be formed at a position closer to the central axis X than the upper edge E1. In the case in which the main body 2A perpendicularly approaches an external horizontal plane G (in the state in which the central axis X is parallel to the horizontal plane G), the upper edge E1 of the main body 2A contacts the external plane G first.

Referring to FIG. 50, in the case in which the upper edge E1 perpendicularly contacts the external horizontal plane G in the state in which the main body 2A is separated from the container 2B, the main body 2A may tilt toward the lower surface 278 of the main body 2A (e.g., in a direction T1). The reason for this is that the upper edge E1 of the main body 2A is supported by the horizontal plane G, whereas the lower edge E2 of the main body 2A is not supported by the horizontal plane G.

In the case in which the main body 2A is manufactured so as to have approximately circular edges E1 and E2, therefore, the main body 2A may be overturned within a short time in the direction T1 (e.g., toward the lower surface 278 of the main body 2A) when the main body 2A is separated from the ground or rolls along the ground. Consequently, the possibility of losing the main body 2A may be minimized, and the user's excessive movement to hold the main body 2A so as to prevent it from rolling far away may be reduced.

On the assumption that a second figure is disposed perpendicular to the central axis X, the main body 2A includes a lower edge E2 extending along the circumference of the second figure. Referring to FIG. 48, the lower edge E2 may be disposed in an imaginary plane H2.

In some implementations, the second figure may be a circle having a predetermined diameter r2. On the assumption that an imaginary circle having a predetermined diameter r2 is disposed perpendicular to the central axis X, the main body 2A may include a lower edge E2 extending along the circumference of the imaginary circle having the diameter r2. The diameter r2 is different from the diameter r1. The diameter r2 may be smaller from the diameter r1.

Referring to FIG. 48, the lower edge E1 may be constituted by a set of points contacting a horizontal plane G such that at least one of the upper edge E1 and the side of the main body 2A contacts the horizontal plane G at the same time. (FIG. 48 shows that the lower edge E2 and the side of the main body 2A contact the horizontal plane G at the same time, and FIG. 51 shows that the lower edge E2, the upper edge E1 and the side of the main body 2A contact the horizontal plane G at the same time.) Particularly, in the case in which the border of the lower surface 278 of the main body 2A is curved, as shown in FIG. 48, it may be defined as the lower edge E2, as described above.

Referring to FIG. 48, a point q on the side surface of the main body 2A and the lower edge E2 simultaneously contact the horizontal plane G. Referring to FIG. 48, the lower edge E2 may be disposed in the imaginary plane H2.

The lower edge E2 may be circular or arc-shaped. In the case in which a recess or a protrusion is formed at the main body 2A on the circumference of the imaginary circle having the diameter r2, the recess or the protrusion is not included in the lower edge E2, and the lower edge E2 is arc-shaped. Even in the case in which the lower edge E2 is arc-shaped, the lower edge E2 may be approximately circular.

Referring to FIGS. 51 and 53, when the main body 2A is overturned toward the lower surface 278 (in the direction T1) while rolling on the horizontal plane G, the lower edge E2 contacts the horizontal plane G. In this case, the center of gravity of the main body 2A is further biased further toward the lower surface 278 (in the direction T1) due to the tilting of the main body 2A. Since the diameter r2 is smaller than that the diameter r1, the main body 2A rolls while turning toward the lower surface 278 (in the direction T1). Afterwards, the main body 2A rolls while turning in the state in which only the lower edge E2 contacts the horizontal plane G. When the main body 2A completely tilts to the extent that the lower surface 278 contacts the horizontal plane G, the rolling motion of the main body 2A is stopped.

FIG. 53 is a conceptual view showing imaginary tracks formed by the upper edge E1 and the lower edge E2 of the main body on the horizontal plane when the main body 2A is overturned while rolling along the horizontal plane. In FIG. 53, a track 11 is formed by the upper edge E1, and a track 12 or 13 is formed by the lower edge E2. The main body rolls while traveling straight or turning somewhat from a point p1 to a point p2 in the state in which the upper edge E1 contacts the horizontal plane G. The main body 2A tilts toward the lower surface 278 (in the direction T1), and the lower edge E2 contacts the horizontal plane G from a point p3. Afterwards, the upper edge E1 is separated from the horizontal plane G, and the main body 2A turns in the state in which the lower edge E2 contacts the horizontal plane G. Track 12 indicates a relatively small degree of turning, and track 13 indicates a relatively large degree of turning. The degree of turning may gradually increase as the main body 2a moves while turning. As the result of turning, the main body 2A may return to the initial position thereof. Afterwards, the main body 2A is completely overturned, and the lower surface 278 contacts the horizontal plane G. As a result, the movement of the main body 2A is stopped. When the main body 2A rolls on the horizontal plane G, it is possible to prevent the main body 2A from rolling far away as the result of overturning, turning, and stopping of the main body 2A.

The side surface of the main body 2A may include an inclined surface formed so as to become close to the central axis X in the downward direction. The side surface of the main body 2A may include a plurality of inclined surfaces formed so as to become close to the central axis X in the downward direction. In this case, the inclined surfaces may have different inclinations. In some implementations, the inclination of the inclined surface of the side surface of the main body 2A may be gradually changed in the downward direction. A recess or a hole may be formed in the inclined surface of the side surface of the main body 2A.

The height h of the main body 2A may be smaller than the diameter r2. In the case in which the height of the main body 2A is smaller, a side-standing state, in which the lower edge E2 and at least one of the upper edge E1 and the side surface of the main body 2A simultaneously contact the horizontal plane G, may become more unstable. As a result, complete overturning of the main body 2A (e.g., the lower surface 278 contacting the horizontal plane G) may be more smoothly and rapidly achieved.

The main body 2A includes a lower corner 279 connected to the lower side of the lower edge E2. The lower corner 279 is chamfered. The lower corner 279 is rounded. The upper end of the lower corner 279 is connected to the lower edge E2, and the lower end of the lower corner 279 is connected to the lower surface 278. The lower corner 279 defines a surface closer to the central axis X than the lower edge E2. The lower corner 279 may define a surface at a position higher than the lower surface 278.

Referring to FIG. 53, during overturning of the main body 2A, the main body 2A tilts further toward the lower surface 278 (in the direction T1) even after the lower edge E2 contacts the horizontal plane G. At this time, the lower corner 279 smoothly contacts the horizontal plane G, and then the lower surface 279 smoothly contacts the horizontal plane G. As a result, it is possible to reduce impact that is applied to the lower surface 278 during overturning of the main body 2A. That is, impact applied to the main body 2A is reduced during overturning of the main body 2A, thereby reducing the possibility that apparatuses will be broken or damaged.

Furthermore, the lower corner 279 defines a surface that becomes gradually closer to the central axis X in the downward direction. During overturning of the main body 2A, the main body 2A tilts further toward the lower surface 278 (in the direction T1). At this time, the contact point of the lower corner 279 that contacts the horizontal plane G becomes gradually closer to the central axis X of the main body 2A. Consequently, the main body 2A is more rapidly turned. As a result, it is possible to minimize the movement distance of the main body 2A depending on the turning of the main body 2A.

Referring to FIGS. 48 and 52, the battery 2541 may be disposed in the lower part of the main body 2A. The case of the main body 2A may be made of a material exhibiting relatively low specific gravity, such as synthetic resin. For example, the switch panel 210, the switch operation unit 220, the side case 230, and the bottom case 270 are made of a material exhibiting low specific gravity, such as synthetic resin. In some implementations, parts are disposed in the inner space of the main body 2A at relatively low density, except for the space in which the battery 2541 is disposed. The battery 2541 is disposed in the inner space of the main body 2A at relatively high density. In some implementations, the battery is made of a metal material. Consequently, the battery 2541 may exhibit high specific gravity. The battery 2541 may be disposed in the lower part of the main body 2A such that the center of gravity M of the main body 2A is located at the lower side of the main body 2A.

The battery 2541 may be disposed lower than an imaginary plane Hm that divides the height of the main body 2A into two halves. The battery 2541 may be generally cylindrical. The height of the battery 2541 may be less than half of the height h of the main body 2A.

Referring to FIG. 52, in the case in which the center of gravity M of the main body 2A is located at the lower side of the main body 2A, the main body 2A may be more rapidly overturned toward the lower surface 278 (in the direction T1) when the main body 2A rolls along the horizontal plane G. Referring to FIG. 53, in the case in which the center of gravity M of the main body 2A is located at the lower side of the main body 2A, the degree of turning of the main body 2A is increased, with the result that a relatively rapidly turning track 13 is formed, which is advantageous in more rapid stopping of the main body 2A.

Referring to FIG. 54, when viewed from below the main body 2A, the battery 2541 may be disposed at an eccentric position. The eccentric position of the battery 2541 means that a vertical axis Mb passing through the center of gravity of the battery 2541 is spaced apart from the central axis X of the main body 2A by a predetermined distance in a predetermined direction ec. In the case in which the battery 2541, the specific gravity of which is relatively high, is disposed eccentrically, the center of gravity M of the main body 2A is eccentric in the direction ec in which the battery 2541 is eccentric. The center of gravity M of the main body 2A is intentionally spaced apart from the central axis X.

When viewed from below, the battery 2541 is formed to have a circular shape having a diameter less than the diameter r1 and the diameter r2. The battery 2541, the diameter of which is relatively small, may be disposed in the eccentric direction ec so as to contact the inner surface of the side member 231. In this case, the side surface of the battery 2541 is spaced apart from the inner surface of the side member 231 in the direction opposite to the eccentric direction ec. The diameter of the battery 2541 may be less than 0.8 times the diameter r2.

The battery guide rib 272 fixes the battery 2541 such that the battery 2541 is disposed at the eccentric position.

Referring to FIGS. 55A and 55B, in the case in which the center of gravity M of the main body 2A moves upward from the horizontal plane G when the main body 2A (or an assembly of the main body 2A and the container 2B) rolls along the horizontal plane G, torque is applied to the main body 2A in a direction T2 in which the center of gravity M of the main body 2A moves downward. FIG. 55A shows that the center of gravity M is located at the right side of the main body 2A, whereby torque is applied to the main body 2A in a rightward direction T2, and FIG. 55B shows that the center of gravity M is located at the left side of the main body 2A, whereby torque is applied to the main body 2A in a leftward direction T3.

When the kinetic energy of the rolling motion of the main body 2A is less than a predetermined value, therefore, the kinetic energy may be completely converted into the potential energy, with the result that the main body 2A moves no farther away. The predetermined value of the kinetic energy means the minimum kinetic energy at which the motion direction is maintained even when the center of gravity M moves to the highest position. When the main body 2A rolls, therefore, the main body may not move far away. In some implementations, overturning of the main body 2A is more smoothly performed during the rolling of the main body 2A due to the eccentric position of the center of gravity M. The reason for this is that torque is applied in the direction opposite to the motion direction, with the result that the motion speed and the centrifugal force (in the direction opposite to the direction in which the main body 2A tilts) are reduced, which is more advantageous in overturning of the main body 2A.

Figure 56:
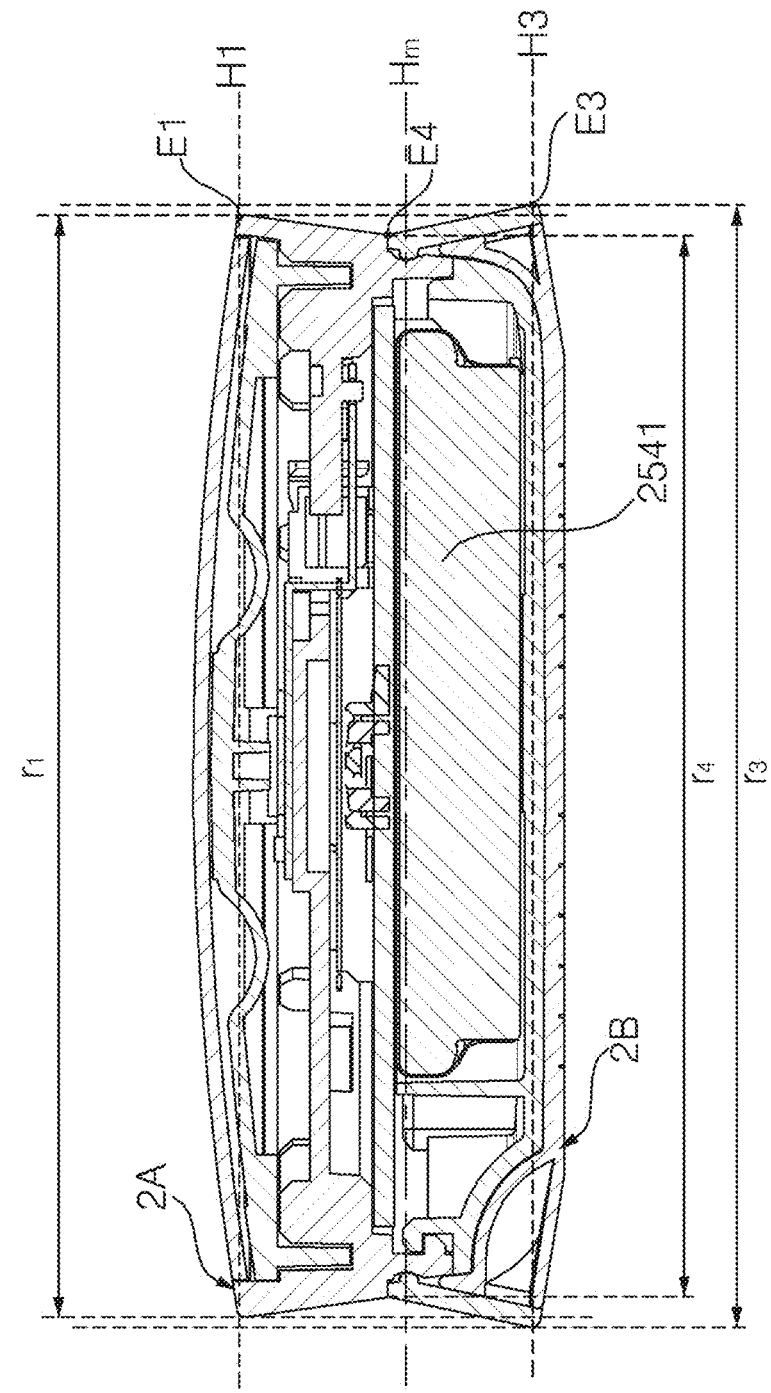
FIG. 56 is a view showing example diameters and dimensions of the accessories of FIG. 6.

Referring to FIGS. 56 and 57, on the assumption that a third figure is disposed perpendicular to the central axis X, the container 2B includes a lower edge E3 extending along the circumference of the third figure. Referring to FIG. 56, the lower edge E3 may be disposed in an imaginary plane H3.

The third figure may be a circle having a predetermined diameter r3. On the assumption that an imaginary circle having a predetermined diameter r3 is disposed perpendicular to the central axis X, the container 2B includes a lower edge E3 extending along the circumference of the imaginary circle having the diameter r3. Referring to FIG. 56, the lower edge E3 may be disposed in the imaginary plane H3.

The lower edge E3 may be circular or arc-shaped. In the case in which a recess or a protrusion is formed at the container 2B on the circumference of the imaginary circle having the diameter r3, the recess or the protrusion is not included in the lower edge E3, and the lower edge E3 is arc-shaped. Even in the case in which the lower edge E3 is arc-shaped, the lower edge E3 may be approximately circular.

The side surface of the container 2B in the direction XO outward from the axis is formed further inward in the direction XI inward toward the axis than one of the lower edge E3 and the upper edge E4 of the container 2B, a description of which will follow. The side surface of the container 2B is formed at a position closer to the central axis X than one of the lower edge E3 and the upper edge E4. In the following description, the side surface of the container 2B is formed at a position closer to the central axis X than the lower edge E3 of the container 2B. However, the present disclosure is not limited thereto. The structure in which the side surface of the container 2B is formed at a position closer to the central axis X than the upper edge E4 of the container 2B is obvious from the structure in which the side surface of the container 2B is formed at a position closer to the central axis X than the lower edge E3 of the container 2B, and therefore a description thereof will be omitted.

The side surface (the outward surface 291) of the container 2B in the direction XO outward from the axis may be formed further inward in the direction XI inward toward the axis than the lower edge E3 of the container 2B. The side surface (the outward surface 291) of the container 2B in the direction XO outward from the axis may be formed at a position closer to the central axis X than the lower edge E3 of the container 2B. In the case in which the container 2B perpendicularly approaches an external horizontal plane G (in the state in which the central axis X is parallel to the horizontal plane G), the lower edge E3 of the container 2B contacts the external plane G first.

In the state in which the main body 2A is coupled to the container 2B, one of the upper edge E1 and the lower edge E3 is formed at a position closer to the central axis X than the other. In this implementation, the upper edge E1 is formed at a position closer to the central axis X than the lower edge E3 in the state in which the main body 2A is coupled to the container 2B.

The diameter r3 is different from the diameter r1. In this implementation, the diameter r3 is greater than the diameter r1.

The accessory 2A and 2B is configured such that the upper edge E1 of the main body 2A and the lower edge E3 of the container 2B can simultaneously contact the horizontal plane G in the state in which the main body 2A is vertically coupled to the container 2B.

Referring to FIGS. 58 and 59, when the accessory 2A and 2B rolls in the state in which the upper edge E1 of the main body 2A and the lower edge E3 of the container 2B contact the horizontal plane G, the accessory 2A and 2B turns to one side, since the diameter r1 and the diameter r3 are different from each other. Referring to FIG. 58, the diameter r1 is smaller than the diameter r3, and therefore the accessory 2A and 2B turns to the upper edge E1 (in a direction T4). FIG. 59 shows a track 14 formed by the upper edge E1 and a track 15 formed by the lower edge E3. When the accessory 2A and 2B rolls in the state in which the upper edge E1 and the lower edge E3 contact a point p4 and a point p5, respectively, the accessory 2A and 2B turns to the edge having the smaller diameter (in the direction T4). As the result of turning of the accessory 2A and 2B, the accessory 2A and 2B may return to the initial position thereof.

Referring to FIGS. 56 and 57, on the assumption that a fourth figure is disposed perpendicular to the central axis X, the container 2B includes an upper edge E4 extending along the circumference of the fourth figure. Referring to FIG. 56, the upper edge E4 may be disposed in an imaginary plane H4. The upper edge E4 may be disposed on the outer border between the main body 2A and the container 2B.

The fourth figure may be a circle having a predetermined diameter r4. On the assumption that an imaginary circle having a predetermined diameter r4 is disposed perpendicular to the central axis X, the container 2B includes an upper edge E4 extending along the circumference of the imaginary circle having the diameter r4. Referring to FIG. 56, the upper edge E4 may be disposed in the imaginary plane H3.

The diameter r4 is different from the diameter r3. The diameter r4 may be smaller from the diameter r3.

When the container 2B is separated from the ground or rolls along the ground, the container 2B may be overturned toward the upper edge E4 within a short time. The principle by which the container 2B is overturned is identical to the principle by which the main body 2A is overturned, and therefore a description thereof will be omitted. The possibility of losing the container 2B may be minimized, and then user's excessive movement to hold the container 2B so as to prevent it from rolling far away may be reduced.

The upper edge E4 may be circular or arc-shaped. In the case in which a recess or a protrusion is formed at the container 2B on the circumference of the imaginary circle having the diameter r4, the recess or the protrusion is not included in the upper edge E4, and the upper edge E4 is arc-shaped. Even in the case in which the upper edge E4 is arc-shaped, the upper edge E4 may be approximately circular.

The side surface of the container 2B in the direction XO outward from the axis is formed further inward in the direction XI inward toward the axis than one of the lower edge E3 and the upper edge E4 of the container 2B. The side surface of the container 2B is formed at a position closer to the central axis X than one of the lower edge E3 and the upper edge E4. In the following description, the side surface of the container 2B is formed at a position closer to the central axis X than the lower edge E3 of the container 2B. However, the present disclosure is not limited thereto. The structure in which the side surface of the container 2B is formed at a position closer to the central axis X than the upper edge E4 of the container 2B is obvious from the structure in which the side surface of the container 2B is formed at a position closer to the central axis X than the lower edge E3 of the container 2B, and therefore a description thereof will be omitted.

The upper edge E4 of the container 2B may be constituted by a set of points contacting a horizontal plane G such that at least one of the lower edge E3 and the side of the container 2B contacts the horizontal plane G at the same time. (FIG. 56 shows that the upper edge E4 of the container 2B, the lower edge E3 of the container 2B and the side of the container 2B contact the horizontal plane G at the same time.)

The side surface (the outward surface 291) of the container 2B may include an inclined surface formed so as to become close to the central axis X in the upward direction. The side surface (the outward surface 291) of the container 2B may include a plurality of inclined surfaces formed so as to become close to the central axis X in the upward direction. In this case, the inclined surfaces may have different inclinations. In some implementations, the inclination of the inclined surface of the side surface (the outward surface 291) of the container 2B may be gradually changed in the upward direction. A recess or a hole may be formed in the inclined surface of the side surface (the outward surface 291) of the container 2B.

The height of the container 2B may be smaller than the diameter r4. In the case in which the height of the container 2B is smaller, a container side-standing state, in which the upper edge E4 of the container 2B and at least one of the lower edge E3 and the side of the container 2B simultaneously contact the horizontal plane G, may become more unstable. As a result, complete overturning of the container 2B may be more smoothly and rapidly achieved.

Hereinafter, an apparatus and method for manufacturing the accessory 2 will be described with reference to FIGS. 60A to 63.

As previously described, the container 2B includes a main body-coupling portion, to which the main body 2A is separably coupled, and the main body 2A includes an exposed portion 201, which is exposed in the state in which the main body 2A is coupled to the container 2B. The exposed portion 201 is formed in the upper part of the main body 2A. The main body 2A includes a side member 231, which defines the side surface of the exposed portion 201. The corner of the upper end of the side member 231 in the direction XO outward from the axis defines the upper edge E1 of the main body 2A.

In order to separate the main body 2A from the container 2B of the accessory 2 having the above-stated structure, a user holds the side member 231, which corresponds to the exposed portion 201 of the main body 2A, using his/her hand. In this case, the user's hand contacts the upper edge E1. Particularly, when the user separates the main body 2A from the container 2B, the user firmly holds the side member 231, and the upper edge E1 applies pressure to the user's hand.

The upper edge E1 has a curved corner. Consequently, the pressure that the upper edge E1 applies to the user's hand may be distributed, and the user's sensation of gripping the main body 2A may be improved.

In some implementations, as previously described, the main body 2A includes a side member 231, which defines the external appearance of the circumference thereof about the central axis X. The side surface of the side member 231 defines an inclined surface that is formed so as to be gradually distant from the central axis X in the upward direction. The corner of the upper end of the side member 231 in the direction XO outward from the axis defines the upper edge E1 of the main body 2A.

In this case, the upper edge E1 may define a corner having an acute angle in an imaginary vertical section including the central axis X. When the user holds the main body 2A using his/her hand, therefore, the upper edge E1 may be more intensively applied to the use's hand. For this reason, the upper edge E1 may have a curved corner.

The corner of the upper end of the side member in the direction XI inward toward the axis may define an inner edge, and the inner edge may have an angled corner. Since the use's hand does not contact the inner edge, the user's sensation of gripping the main body 2A is not affected by the inner edge.

In some implementations, the top surface of the inner edge is substantially aligned with the top surface of the edge of the switch panel 210, which is adjacent thereto, and the end of the edge of the switch panel 210 contacts the inner surface of the side member 231. The inner edge has an angled corner such that the upper surface, which connects the switch panel 210 to the upper end of the side member 231, may extend smoothly.

In some implementations, when the dome-shaped switch panel 210 is pushed downward, elastic deformation of the switch panel 210, by which the switch panel 210 is extended toward the edge, is prevented by the inner wall of the upper end of the side member 231. The inner edge has an angled corner such that the end of the edge of the switch panel 210 can be more stably located on the inner wall of the upper end of the side member 231.

In some implementations, the main body 2A is made of a material that can be injection-molded. The side case 230 is made of a material that can be injection-molded. The side member 231 is made of a material that can be injection-molded. An example of the material that can be injection-molded may be synthetic resin.

Hereinafter, an apparatus for manufacturing the accessory including the upper edge E1 having the curved corner will be described with reference to FIGS. 28 and 60A to 63. In FIG. 29, part Z indicates the section of the side member 231. FIGS. 60A and 60B are sectional views showing injection-molding machines 310a and 310b used in a process in which the side case 231 is injection-molded, showing the section Z of the side member 231. FIGS. 61 to 63 show a plurality of injection-molding units 311b, 312b, and 313b constituting the injection-molding machine 310b. The structure of a fastening device for maintaining coupling force between the injection-molding units 311b, 312b, and 313b and the structure for supplying a material to be injection-molded are omitted from FIGS. 61 to 63. However, various implementations may be realized by those skilled in the art.

The accessory manufacturing apparatus includes an injection-molding machine 310b for injection-molding the side case 230, which is one of the parts constituting the accessory 2. For example, the accessory manufacturing apparatus includes an injection-molding machine 310b for injection-molding the side member 231.

Referring to FIG. 60B, the injection-molding machine 310b includes an example injection-molding unit 312b in which surfaces defining the upper end of the side member 231, the upper edge E1, and the upper part of the side surface of the side member 231 are integrally connected to each other.

The injection-molding unit 312b may be configured such that the corner defining the upper edge E1 is concave. The upper edge E1 may have a curved corner.

In some implementations, the injection-molding machine 310b may form a parting line PLb on only the inner edge of the side member 231, among the upper end of the side member 231, the upper edge E1, and the inner edge of the side member 231. The parting line may leave a trace during injection molding. Particularly, in the case in which the parting line is formed on the corner, the corner of the injection-molded product may be angled.

For example, in the injection-molding machine 310a of FIG. 60A, two injection-molding units 311a and 312a form a parting line PLa on the upper edge E1. In this case, the upper edge E1 has an angled corner.

In some implementations, in the injection-molding machine 310b of FIG. 60B, two example injection-molding units 311b and 312b form a parting line PLb on the inner edge. In this case, the inner edge may have an angled corner, and the upper edge E1 may have a curved corner.

The injection-molding machine 310b will be described in more detail with reference to FIGS. 61 to 63. The injection-molding machine 310b includes an upper injection-molding unit 311b for defining a molding line of the upper part of the side case 230, a side injection-molding unit 312b for defining a molding line of the side of the side case 230 (the side of the side member 231), and a lower injection-molding unit 313b for defining a molding line of the lower part of the side case 230.

A plurality of upper injection-molding units 311b, a plurality of side injection-molding units 312b, and a plurality of lower injection-molding units 313b may be provided. For example, two lower injection-molding units 313b may be provided to form a parting line between the central part and the edge part of the side case 230.

The accessory manufacturing apparatus includes a fastening device for maintaining coupling force between the injection-molding units 311b, 312b, and 313b. The fastening device enables the injection-molding units 311b, 312b, and 313b to be coupled to and separated from each other. In some implementations, the accessory manufacturing apparatus includes a structure for supplying a material to be injection-molded into the injection-molding machine 310b.

The side injection-molding unit 312b defines a molding line of the upper end of the side member 231 and, at the same time, a molding line of the side surface of the side member 231 (the inclined surface that becomes gradually distant from the central axis X in the upward direction). The side injection-molding unit 312b includes a first side injection-molding unit 312b1 and a second side injection-molding unit 312b2, which are separable from each other in the horizontal direction (e.g., in the forward and rearward direction or in the leftward and rightward direction). Parting lines of the first side injection-molding unit 312b1 and the second side injection-molding unit 312b2 are formed vertically on the side surface of the side member 231.

In some implementations, the upper injection-molding unit 311b is removed upward after the injection-molded product is manufactured. Consequently, the parting lines PLb of the upper injection-molding unit 311b and the side injection-molding unit 312b are formed on the inner edge. As a result, the side injection-molding unit 312b may be removed. At the same time, the inner edge may have an angled corner, and the upper edge E1 may have a curved corner.

In some implementations, the accessory manufacturing method includes a step of injection-molding the side case 230. For example, the accessory manufacturing method includes an injection-molding step of injection-molding the side member 231.

The injection-molding step includes a step of supplying a material to be injection-molded into an injection-molding machine in which surfaces defining the upper end of the side member 231, the upper edge E1, and the upper part of the side surface of the side member 231 are integrally connected to each other.

At the injection-molding step, a parting line PLb is formed on only the inner edge of the side member 231, among the upper end of the side member 231, the upper edge E1, and the inner edge of the side member 231.

The injection-molding step includes a step of removing the injection-molding machine, in which the surfaces defining the upper end of the side member 231, the upper edge E1, and the upper part of the side surface of the side member 231 are integrally connected to each other, from the injection-molded product.

The remaining steps of the accessory manufacturing method are obvious from the functions of the accessory manufacturing apparatus described above, and therefore a description thereof will be omitted.

As is apparent from the described above, the accessory may be attached to an apparatus or may be placed in an environment so as to realize IoT functions without replacing the apparatus or reconfiguring the environment.

In some implementations, it may be possible to realize desired IoT environments even in the case in which various kinds of products having different standards are provided as the result of the example accessory being attached to an apparatus or being placed in an environment.

In some implementations, the accessory may include a container having an external coupling portion. In the case in which the optimal disposition of the main body is preset, therefore, the main body may be easily separated from the container and may then be coupled to the container again without additional effects.

In some implementations, the present disclosure may have the effect of enabling the user to smoothly couple or separate the main body to or from the container.

In some implementations, the present disclosure may have the effect of preventing an excessive increase in the thickness of a material to be injection-molded, thereby greatly reducing the likelihood of the occurrence of injection defects.

In some implementations, the present disclosure may have the effect of covering the recessed portion of the material to be injection-molded, thereby providing a smooth appearance thereof.

In some implementations, the present disclosure may have the effect of coupling the container body to the container side member using the recessed portion of the material to be injection-molded, thereby improving structural efficiency.

What is claimed is:

1. An accessory comprising:
   a main body that includes a communication module that is configured to communicate with a predetermined network; and
   a container including a main body-coupling portion that is located at an upper portion of the container and configured to separably couple to the main body, the container being made of a material that is able to be injection-molded,
   wherein the container includes:
      an outer portion that is exposed to an outside of the container based on the main body being coupled to the container, and
      an inner portion that is recessed downward to thereby define the main body-coupling portion, the inner portion including a bottom portion that defines a bottom surface of the inner portion and an inclined portion that extends upward from a circumference of the bottom surface and outward with respect to a central axis passing through the container in a vertical direction.

2. The accessory of claim 1, wherein the outer portion includes an outward surface that is located radially outward from the central axis, the outward surface defining a catching recess that is located at a lower portion of the outward surface and depressed radially inward toward the central axis.

3. The accessory of claim 2, wherein the outward surface includes an inclined surface that slopes with respect to the central axis, the outward surface becoming closer to the central axis in an upward direction.

4. The accessory of claim 1, wherein the inclined portion of the inner portion has a first section connected to the bottom surface and a second section extending radially outward from the first section, and
   wherein an inclination angle of the second section with respect to the bottom surface is greater than an inclination angle of the first section.

5. The accessory of claim 1, wherein the container further includes:
   a container body that defines the bottom portion and the inclined portion; and
   a container side member that defines an outward surface,
   wherein the container body includes a contact surface that is oriented radially outward and contacts the container side member.

6. The accessory of claim 5, wherein the contact surface defines a catching recess that is depressed radially inward toward the inclined portion.

7. The accessory of claim 6, wherein both of the catching recess and the inclined portion are disposed in a horizontal imaginary plane parallel with the bottom surface.

8. The accessory of claim 6, wherein the outward surface includes an inclined surface that slopes with respect to the central axis, the outward surface becoming closer to the central axis in an upward direction.

9. The accessory of claim 8, wherein the container side member includes an inward surface opposite the outward surface, the inward surface being oriented radially inward toward the central axis, and
wherein the container side member has a uniform thickness between the outward surface and the inward surface.

10. The accessory of claim 6, wherein the container side member includes an inward surface opposite the outward surface, the inward surface being oriented radially inward toward the central axis, and
wherein the inward surface includes an inclined surface that slopes with respect to the central axis, the inward surface becoming closer to the central axis in an upward direction.

11. The accessory of claim 10, wherein the contact surface of the container body contacts the inward surface of the container side member, and
wherein the catching recess is defined at a lower part of the contact surface.

12. The accessory of claim 6, wherein the container side member includes an inward surface opposite the outward surface, the inward surface being oriented radially inward toward the central axis, and
wherein the container side member includes a couple hook located on the inward surface, the couple hook being configured to be inserted into the catching recess of the container body.

13. The accessory of claim 6, wherein the inclined portion extends in a circumferential direction, and the catching recess extends in the circumferential direction.

14. The accessory of claim 5, wherein the main body includes an attachment-detachment groove,
wherein the container side member includes an inward surface opposite the outward surface, the inward surface being oriented radially inward toward the central axis,
wherein the inner portion of the container further includes an attachment-detachment protrusion that protrudes from the inward surface and that is located vertically above the inclined portion, the attachment-detachment protrusion being configured to be inserted into the attachment-detachment groove based on the main body being coupled to the container.

15. The accessory of claim 14, wherein the container side member has a central opening that receives the container body based on the container body coupling to the container side member.

16. The accessory of claim 15, wherein the contact surface of the container body defines a guide recess that extends vertically, and
wherein the container side member includes a guide protrusion that protrudes from the inward surface, the guide protrusion being configured to be inserted into the guide recess.

17. An accessory comprising:
a main body that includes a communication module that is configured to communicate with a predetermined network; and
a container including a main body-coupling portion that is located at an upper portion of the container and configured to separably couple to the main body, the container being made of a material that is able to be injection-molded,
wherein the container includes:
an inner portion that is depressed downward, the inner portion defining the main body-coupling portion and a bottom portion thereof, and
an outer portion that is exposed outward based on the main body being coupled to the container, the outer portion including an outward surface that is oriented radially outward from a central axis passing through the container in a vertical direction and that includes an inclined surface that slopes with respect to the central axis, the inclined surface becoming closer to the central axis in an upward direction, and
wherein the container further includes:
a container body that defines the bottom portion of the inner portion, the container body including a contact surface facing radially outward and a catching recess depressed radially inward from a lower portion of the contact surface, and
a container side member that defines the outward surface, the contact surface of the container body contacting the container side member.

18. The accessory of claim 17, wherein the container side member includes an inward surface opposite the outward surface, the inward surface being oriented inward toward the central axis and contacting the contact surface of the container body.

19. The accessory of claim 18, wherein the container side member has a uniform thickness between the outward surface and the inward surface.

* * * * *